United States Patent
Fukatani et al.

(10) Patent No.: US 8,041,914 B2
(45) Date of Patent: Oct. 18, 2011

(54) STORAGE SYSTEM COMPRISING FUNCTION FOR REDUCING POWER CONSUMPTION

(75) Inventors: Takayuki Fukatani, Yokohama (JP); Yasutomo Yamamoto, Sagamihara (JP); Tomohiro Kawaguchi, Cupertino, CA (US); Masanori Takada, Yokohama (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 890 days.

(21) Appl. No.: 11/968,797

(22) Filed: Jan. 3, 2008

(65) Prior Publication Data
US 2009/0006876 A1 Jan. 1, 2009

(30) Foreign Application Priority Data
Jun. 26, 2007 (JP) .................. 2007-167325

(51) Int. Cl.
*G06F 12/02* (2006.01)
(52) U.S. Cl. ....................... 711/165; 713/324
(58) Field of Classification Search ............ 711/165; 713/324
See application file for complete search history.

(56) References Cited

U.S. PATENT DOCUMENTS

| 6,859,882 B2 * | 2/2005 | Fung .............................. 713/300 |
| 2006/0193073 A1 | 8/2006 | Hakamata et al. |
| 2007/0094357 A1 * | 4/2007 | Sugitani et al. ............... 709/219 |
| 2007/0130424 A1 | 6/2007 | Hashimoto et al. |
| 2007/0143542 A1 | 6/2007 | Watanabe et al. |
| 2008/0052456 A1 * | 2/2008 | Ash et al. ...................... 711/113 |

FOREIGN PATENT DOCUMENTS

| JP | 2000-293314 | 10/2000 |
| JP | 2003-296153 | 10/2003 |
| JP | 2007-156667 | 6/2007 |
| JP | 2007-164650 | 6/2007 |

* cited by examiner

*Primary Examiner* — Jared Rutz
(74) *Attorney, Agent, or Firm* — Brundidge & Stanger, P.C.

(57) ABSTRACT

For at least one of storage unit, processor and cache memory which are I/O process-participating devices related to I/O command process, when a load of one or more I/O process-participating devices or a part thereof is a low load equal to or less than a predetermined threshold value, a processing related to a state of one or more of the I/O process-participating devices or a part thereof is redirected to another one or more I/O process-participating devices or a part thereof, and the state of the one or more I/O process-participating devices or a part thereof is shifted to a power-saving state.

22 Claims, 41 Drawing Sheets

FIG. 9

| 1321a | 1321b | 1321c | 1321d | 1321e | 1321f | 1321g |
|---|---|---|---|---|---|---|
| PROCESSOR MODULE NO. | PROCESSOR NO. | MANAGED LDEV | INITIAL MANAGED LDEV | LOW (CPU) LOAD THRESHOLD | HIGH (CPU) LOAD THRESHOLD | POWER SUPPLY |
| 1 | 1,2 | 1 | 1 | 10% | 80% | 1 |
| 2 | 3,4 | 2,3 | 2 | 10% | 80% | 1 |
| 3 | 5,6 | - | 3 | 10% | 80% | 2 |
| ⋮ | ⋮ | ⋮ | ⋮ | ⋮ | ⋮ | ⋮ |

FIG. 10

| 1322a | 1322b | 1322c | 1322d | 1322e |

| PROCESSOR MODULE NO. | PERFORMANCE (IOPS) | PERFORMANCE REQUIREMENT | LOAD | PROCESSOR MODULE STATE |
|---|---|---|---|---|
| 1 | 20000 | 700 | 60% | ACTIVE |
| 2 | 0 | - | 0% | SLEEP |
| 3 | 30000 | - | 50% | ACTIVE |
| ⋮ | ⋮ | ⋮ | ⋮ | ⋮ |

FIG. 11

| 1324a | 1324b | 1324c | 1324d | 1324e |
|---|---|---|---|---|
| PROCESSOR NO. | CORE PERFORMANCE (IOPS) | NUMBER OF ACTIVE CORES | NUMBER OF I/O COMMANDS | PROCESSOR STATE |
| 1 | 5000 | 2 | 2000 | ACTIVE |
| 2 | 5000 | 0 | 0 | SLEEP |
| 3 | 5000 | 1 | 2000 | CORE SLEEP |
| 4 | 5000 | 0 | 0 | SLEEP |
| 5 | 5000 | 0 | 0 | SLEEP |
| 6 | 5000 | 0 | 0 | SLEEP |
| ⋮ | ⋮ | ⋮ | ⋮ | ⋮ |

FIG. 12

| LDEV NO. (1325a) | RAID GROUP NO. (1325b) | INITIAL ADDRESS (1325c) | REGION SIZE (MB) (1325d) | PORT IDENTIFIER-LUN (1325e) | PERFORMANCE REQUIREMENT (IOPS) (1325f) |
|---|---|---|---|---|---|
| 1 | 1 | 00000000 | 1000 | 1-1 | 150 |
| 2 | 1 | 40000000 | 1000 | 1-2 | 200 |
| 3 | 2 | 00000000 | 10000 | 2-1 | 200 |
| ⋮ | ⋮ | ⋮ | ⋮ | ⋮ | ⋮ |

| LDEV NO. (1327a) | LOGICAL ADDRESS (1327b) | STORED DATA LENGTH (MB) (1327c) | CACHE ADDRESS (1327d) | WRITE FLAG (1327e) |
|---|---|---|---|---|
| 1 | 10000000h | 128 | 00000000h | WRITTEN |
| 1 | 20000000h | 128 | 08000000h | UNWRITTEN |
| 3 | 20000000h | 128 | 10000000h | WRITTEN |
| ⋮ | ⋮ | ⋮ | ⋮ | ⋮ |

FIG. 15

| PORT IDENTIFIER-LUN (1231a) | MANAGING PROCESSOR MODULE (1231b) |
|---|---|
| 1-1 | 1 |
| 1-2 | 2 |
| 2-1 | 3 |
| ⋮ | ⋮ |

FIG. 24

| 1328a | 1328b | 1328c | 1328d | 1328e | 1328f | 1328g | 1328h |
|---|---|---|---|---|---|---|---|
| CACHE HIT PERFORMANCE (IOPS) | CACHE MISS PERFORMANCE (IOPS) | CACHE HIT RATE | NUMBER OF I/O COMMANDS | ACTIVE MEMORY SIZE (MB) | LOW ACCESS THRESHOLD (I/O COMMAND/ MB) | HIGH ACCESS THRESHOLD (I/O COMMAND/ MB) | PERFORMANCE REQUIREMENT |
| 10000 | 1000 | 90% | 10000 | 61440 | 20 | 100 | 10000 |

FIG. 25

| 1329a | 1329b | 1329c | 1329d | 1329e |
|---|---|---|---|---|
| MEMORY BLOCK NO. | INITIAL ADDRESS | REGION SIZE (MB) | NUMBER OF CACHE HITS | STATE |
| 1 | 00000000 | 256 | 500 | ACTIVE |
| 2 | 10000000 | 256 | 250 | ACTIVE |
| 3 | 30000000 | 512 | 0 | SLEEP |
| ⋮ | ⋮ | ⋮ | ⋮ | ⋮ |

FIG. 31

| LDEV NO. (1330a) | NUMBER OF I/O COMMANDS (IOPS) (1330b) |
|---|---|
| 1 | 1234 |
| 2 | 4534 |
| 3 | 2763 |
| 4 | 4123 |
| 5 | 1543 |
| 6 | 2312 |
| ⋮ | ⋮ |

FIG. 32

| 1331a | 1331b | 1331c | 1331d | 1331e | 1331f | 1331g | 1331h | 1331i | 1331j |
|---|---|---|---|---|---|---|---|---|---|
| RAID GROUP NO. | PERFORMANCE | PERFORMANCE REQUIREMENT | LDEV | INITIAL LDEV | NUMBER OF DISK ACCESSES (IOPS) | FREE CAPACITY (MB) | LOW (CPU) LOAD THRESHOLD | HIGH (CPU) LOAD THRESHOLD | STATE |
| 1 | 5000 | 2500 | 1,5 | 1 | 3700 | 5000 | 10% | 80% | ACTIVE |
| 2 | 5000 | 3500 | 2,6 | 2 | 1250 | 3000 | 10% | 80% | ACTIVE |
| 3 | 3000 | 1500 | 3 | 3 | 3000 | 3000 | 10% | 80% | ACTIVE |
| 4 | 3000 | 1000 | 4 | 4 | 1200 | 5000 | 10% | 80% | ACTIVE |
| 5 | 5000 | 0 | - | 5 | 0 | 10000 | 10% | 80% | SLEEP |
| 6 | 5000 | 0 | - | 6 | 0 | 10000 | 10% | 80% | SLEEP |
| ……… | ……… | ……… | ……… | ……… | ……… | ……… | ……… | ……… | ……… |

FIG. 33

| SLEEP ENABLE RAID GROUP | WARNING SETTING |
|---|---|
| 1,2,3,4,5 | ENABLE |

1326b — SLEEP ENABLE RAID GROUP
1326c — WARNING SETTING

FIG. 43

POLICY MANAGEMENT TABLE 331

| POLICY VALUE | PROCESSOR | | CACHE | | DISK | | |
|---|---|---|---|---|---|---|---|
| | ENERGY-SAVING LEVEL | HIGH (CPU) LOAD THRESHOLD / LOW (CPU) LOAD THRESHOLD | HIGH ACCESS THRESHOLD / LOW ACCESS THRESHOLD | SLEEP ENABLE RAID GROUP | HIGH (CPU) LOAD THRESHOLD / LOW (CPU) LOAD THRESHOLD | WARNING SETTING |
| A | 4 | 80% / 30% | 80% / 30% | 1,2,3,4,5 | 80% / 30% | ENABLE |
| B | 3 | 75% / 25% | 75% / 25% | 1,2,3 | 75% / 25% | ENABLE |
| C | 2 | 70% / 20% | 70% / 20% | 1 | 70% / 20% | DISABLE |
| D | 1 | OFF | OFF | | OFF | DISABLE |

STORAGE SYSTEM COMPRISING FUNCTION FOR REDUCING POWER CONSUMPTION

CROSS-REFERENCE TO PRIOR APPLICATION

This application relates to and claims the benefit of priority from Japanese Patent Application number 2007-167325, filed on Jun. 26, 2007 the entire disclosure of which is incorporated herein by reference.

BACKGROUND

The present invention generally relates to reduction of the power consumed by a storage system.

Advancements in information technology in recent years have been accompanied by a dramatic increase in the volumes of data handled by business computer systems. The resultant increase in capacity and performance of the storage systems in which the data handled by a computer system is stored has led to increased storage system power consumption. Accordingly, reduction of the power consumed by a storage system is desired. Examples of technologies related to reduction of the power consumed by a storage system are disclosed in Japanese Unexamined Patent Application No. 2000-293314 and Japanese Unexamined Patent Application No. 2003-296153. According to the technology disclosed in Japanese Unexamined Patent Application No. 2000-293314, an unaccessed magnetic disk device is migrated to an energy-saving mode after a predetermined time has elapsed. According to the technology disclosed in Japanese Unexamined Patent Application No. 2003-296153, at times of low load, a data storage position control device for a plurality of storage units redirects processing to another processing device, and migrates the CPU to a power-saving mode.

Each of the aforementioned magnetic disk device and CPU are devices that participate in the processing of I/O commands received by a storage system (hereinafter I/O process-participating devices) from a host device. There is possibility that storage system performance will deteriorate as a result of an I/O process-participating device being migrated to a power-saving state.

SUMMARY

Accordingly, it is an object of the present invention to reduce the power consumed by a storage system while suppressing deterioration of the storage system performance.

Additional objects of the present invention will become apparent from the description given herein.

If a load on one or more I/O process-participating devices or a part thereof of at least one type of storage unit, processor or cache memory which are I/O command processing-related I/O command process-participating devices is a low load equal to or less than a predetermined threshold value, a state-related processing of the one or more of the I/O process-participating devices or a part thereof is redirected to another one or more I/O process-participating devices or a part thereof, and the state of the one or more I/O process-participating devices or a part thereof is shifted to a power-saving state.

BRIEF DESCRIPTION OF THE DRAWINGS

FIG. 9 is a diagram showing the configuration of processor module configuration information of the first embodiment of the present invention;

FIG. 10 is a diagram showing the configuration of processor module normal state information of the first embodiment of the present invention;

FIG. 11 is a diagram showing the configuration of processor information of the first embodiment of the present invention;

FIG. 12 is a diagram showing the configuration of LDEV configuration information of the first embodiment of the present invention;

FIG. 15 is a diagram showing the configuration of routing information of the first embodiment of the present invention;

FIG. 24 is a diagram showing the configuration of cache memory module information of the second embodiment of the present invention;

FIG. 25 is a diagram showing the configuration of memory block information of the second embodiment of the present invention;

FIG. 31 is a diagram showing the configuration of LDEV state information of the third embodiment of the present invention;

FIG. 32 is a diagram showing the configuration of RAID Group information of the third embodiment of the present invention;

FIG. 33 is a diagram showing the configuration of power management information of the third embodiment of the present invention;

FIG. 43 is a diagram showing the configuration of a policy management table of the seventh embodiment of the present invention.

DESCRIPTION OF THE PREFERRED EMBODIMENTS

Figure 1:
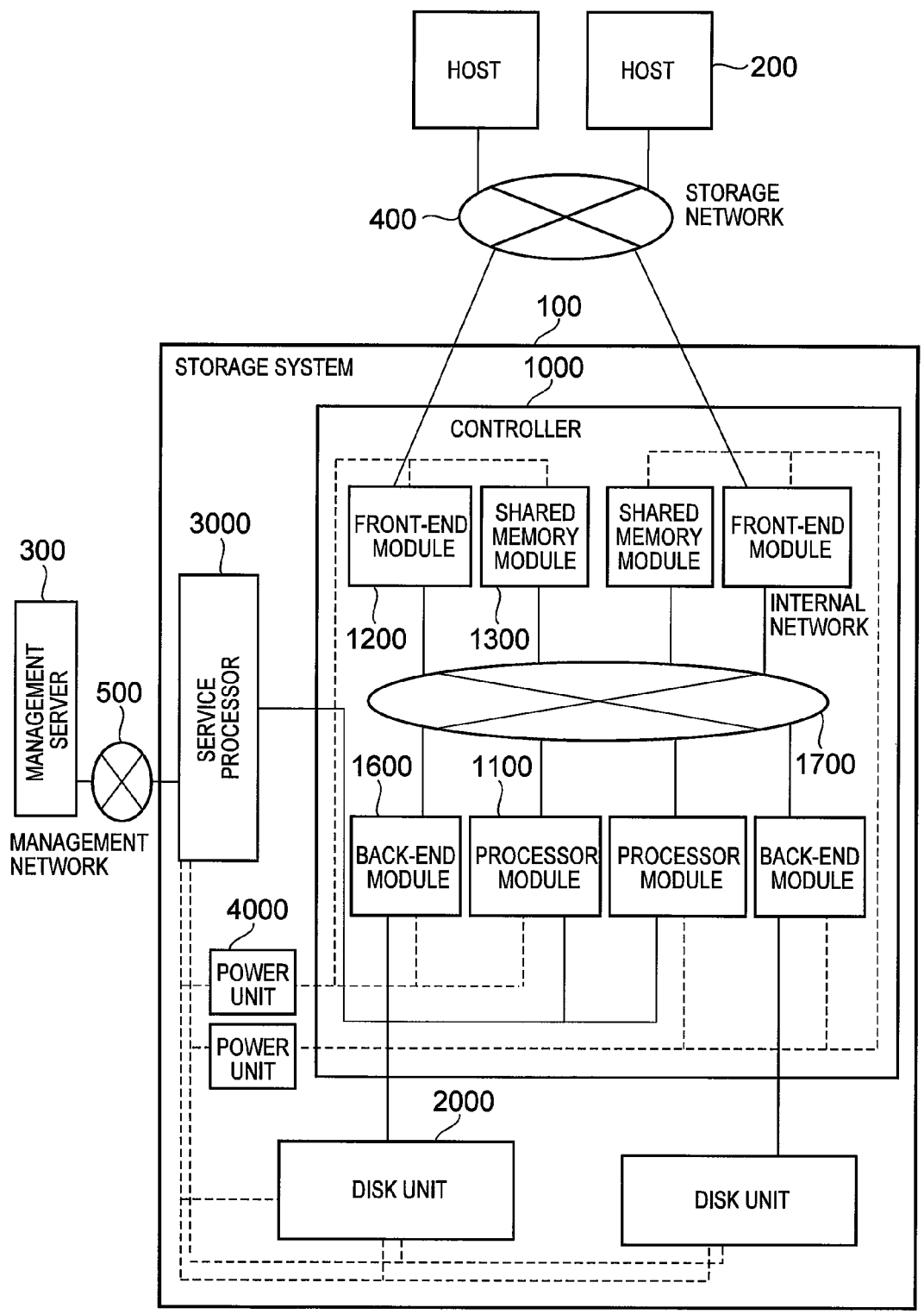
FIG. 1 is a computer system configuration diagram pertaining to a first embodiment of the present invention.

In embodiment mode 1, a storage system comprises a plurality of storage units on which a plurality of logical volumes are based, one or more processors for writing data to a logical volume, of a plurality of logical volumes, designated by an I/O command sent from a host device or reading data from this logical volume, and one or more cache memories for temporarily storing data to be written in the logical volume by the processor or data read from the logical volume by the processor. The storage system comprises a power-saving controller. A power-saving controller redirects processing related to a state of one or more I/O process-participating devices or a part thereof, for at least one of storage unit, processor and cache memory which are I/O process-participating devices related to I/O command processing, to another one or more I/O process-participating devices or a part thereof, and shifts the state of the one or more I/O process-participating devices or a part thereof to a power-saving state.

Here, the "power-saving state" refers to a state in which the power consumption of an I/O process-participating device or a part thereof is less than the power consumption thereof in its normal active state. More specifically, for example, a power supply OFF state constitutes a state in which the power source of an I/O process-participating device or a part thereof has been switched OFF. In addition, for example, if the I/O process-participating device is used to drive a disk-type storage media, the power-saving state is taken as being a state in which the rotation speed of this storage media is slower than the rotation speed thereof in its normal active state (state in which data read-write can occur).

In embodiment mode 2 according to embodiment mode 1, the processors exist in plurality. The processors are constituent elements of the plurality of processor modules. The processor modules are configured from one or more processors. The one or more I/O process-participating devices or a part thereof are processor modules or a part thereof. The part of the processor module is a processor, or at least one of a plurality of processor cores from which the processor is configured.

In embodiment mode 3 according to at least one of embodiment mode 1 or embodiment mode 2, the one or more logical volumes of the plurality of logical volumes each are assigned to the processor modules. This storage system further comprises a host interface part. The host interface part receives an I/O command sent from the host device and transfers this I/O command to a processor module to which a logical volume designated by this I/O command is assigned, of a plurality of processor modules. A power-saving controller assigns the logical volume assigned to the low load processor module of the plurality of processor modules to another processor module of the plurality of processor modules, thus shifting the state of this low load processor module to a power-saving state. In embodiment mode 4 according to embodiment mode 3, a power-saving controller, when the load placed on the low load processor module is placed on another processor module, judges whether or not the load placed on this other processor module exceeds a predetermined threshold value, and assigns the logical volume assigned to the low load processor module to the other processor module if the judged result thereof indicates that the load does not exceed the predetermined threshold value.

It embodiment mode 5 according to at least one of embodiment modes 3 and 4, a power-saving controller, if the load on the other processor module to which the logical volume has been assigned exceeds the predetermined threshold value, shifts the state of a power-saving state processor module to a non-power-saving state, the logical volume being assigned from the other processor module to this processor module.

In embodiment mode 6 according to at least one of embodiment modes 2 to 5, the plurality of processor modules are affiliated with two or more power supplies. A power-saving controller judges whether or not, upon conversion of a state of a low load processor module to a power-saving state, a non-power-saving state processor module will exist in single power supply alone, and shifts the state of the low load processor module to a power-saving state if the judged result thereof indicates that the non-power-saving state processor module will exist in two or more power supplies. In embodiment mode 7 according to at least one of embodiment modes 2 to 6, a power-saving controller judges whether or not, upon conversion of a state of a low load processor module to a power-saving state, only a single non-power-saving state processor module is formed, and shifts the low load processor module state to a power-saving state if the judged result thereof indicates that two or more non-power-saving state processor modules exist.

In embodiment mode 8 according to embodiment mode 3, the processor modules each comprise a storage region in which I/O process control information referenced by a processor during the I/O command process is stored. A power-saving controller stores the I/O process control information stored in the storage region of the low load processor module in the storage region of the other processor module, thus shifting the low load processor module state to a power-saving state.

In embodiment mode 9 according to at least one of embodiment modes 2 to 8, a power-saving controller, if a plurality of non-power-saving state processors exist in the low load processor module, shifts the state of a processor selected from these plurality of non-power-saving state processors or a processor core selected from a plurality of processor cores from which the processor is configured to a power-saving state while not shifting the state of the processor module itself. In embodiment mode 10 according to at least one of embodiment modes 2 to 9, a power-saving controller, if the result of the judgment indicates that the performance is less than a predetermined performance requirement upon conversion of a selected processor state to a power-saving state, shifts the state of a processor core selected from a plurality of processor cores from which the processor is configured to a power-saving state while not shifting the state of the aforementioned selected processor.

In embodiment mode 11 according to at least one of embodiment modes 2 to 10, the storage system further comprises a storage region for storing information expressing an energy-saving level desired by a storage administrator. In accordance with the energy-saving level indicated by this information, a power-saving controller selects one of the processor module, processor and processor core, as a target, for conversion to a power-saving state.

In embodiment mode 12 according to at least one of embodiment modes 1 to 11, the cache memory is configured from a plurality of cache memory regions. The one or more I/O process-participating devices or a part thereof are one or more cache memories, or at least one of the plurality of cache memory regions from which the cache memory is configured.

In embodiment mode 13 according to embodiment mode 12, a power-saving controller, prior to shifting the state of the cache memory region to a power-saving state, evacuates the data stored in the cache memory region to another non-power-saving state cache memory region or to at least one of the plurality of storage units.

In embodiment mode 14 according to embodiment mode 13, RAID Groups are configured from two or more of the plurality of storage units, a power-saving controller being configured to be able to migrate all logical volumes formed on the basis of a low load RAID Group to one or more other RAID Groups, thus shifting the state of the storage units from which the low load RAID Group is configured to a power-saving state. A power-saving controller, if evacuation of the data stored in the cache memory region to a storage unit or migration of all logical volumes formed on the basis of a low load RAID Group to one or more other RAID Groups is to occur simultaneously or substantially simultaneously, the power-saving controller implementing either the evacuation or migration processing first and initiating the other processing subsequent to the completion of the first processing.

In embodiment mode 15 according to at least one of embodiment modes 1 to 14, the RAID Groups are configured from two or more storage units of the plurality of storage units. A power-saving controller migrates all logical volumes from which a low load RAID Group is formed to one or more other low load RAID Groups, thus shifting the state of the storage units from which this low load RAID Group is configured to a power-saving state.

In embodiment mode 16 according to embodiment mode 15, a power-saving controller judges whether or not, upon a load on a migration-targeted logical volume being placed on another RAID Group, the load placed on the other RAID Group exceeds a predetermined threshold value and, if the judged result thereof indicates that the load does not exceed the predetermined threshold value, migrates the migration-targeted logical volume based on the low load RAID Group to another RAID Group.

In embodiment mode 17 according to at least one of embodiment modes 1 to 16, the storage system further comprises a storage region for storing information indicating a one or more I/O process-participating devices or a part thereof desired by a storage administrator. A power-saving controller maintains even at low load the non-power-saving state of the I/O process-participating devices or a part thereof other than the one or more I/O process-participating devices or a part thereof indicated by this information.

In embodiment mode 18 according to at least one of embodiment modes 1 to 17, the storage system further comprises a storage region for storing information indicating whether or not permission from a storage administrator is required prior to conversion to a power-saving state. If the information indicates that the permission from a storage administrator is required prior to conversion to a power-saving state, a power-saving controller outputs an inquiry as to whether a state of one or more I/O process-participating devices or a part thereof may be shifted to a power-saving state prior to the state of one or more I/O process-participating devices or a part thereof being shifted to a power-saving state, and if a reply to the effect that the state of one or more I/O process-participating devices or a part thereof may be shifted to a power-saving state is input in response to this inquiry, shifts the state of one or more I/O process-participating devices or a part thereof to a power-saving state.

In embodiment mode 19 according to at least one of embodiment modes 1 to 18, the I/O process-participating devices for which conversion to a power-saving state is possible are two or more types of processor, cache memory or storage unit. A threshold value that defines a low load of the various I/O process-participating devices constitutes a threshold value with which there is association with a policy value selected from a plurality of policy values.

In embodiment mode 20 according to at least one of embodiment modes 1 to 19, a power-saving controller, when a load on a storage system or a part thereof is a low load equal to or less than a predetermined threshold value, judges whether or not, upon conversion of the state of the one or more I/O process-participating devices or a part thereof to a power-saving state, performance will be below performance in predetermined requirements and, if the judged result thereof indicates that the performance will not be below the performance in predetermined requirements, shifts the state, at a low load, of one or more I/O process-participating devices or a part thereof to a power-saving state. In other words, if the judged result thereof indicates that the performance will be below the predetermined performance requirement, the state of the low load one or more I/O process-participating devices or a part thereof is not shifted to a power-saving state.

The processings executed by the aforementioned power-saving controller may be controlled by means of a management computer used to manage a storage system.

Two or more of the plurality of embodiments described above can be combined. In addition, each of the parts described above can be constructed from either hardware or a computer program, or by a combination thereof (for example, part is actualized using a computer program and the remainder is actualized using hardware). The computer program is written into and executed by a predetermined processor. In addition, a storage region existing in a hardware resource such as a memory may be used for information processing based on a computer program written into and executed by a processor. In addition, the computer program may be installed in the computer through a storage medium such as a CD-ROM, or it may be downloaded to a computer by way of a communication network.

Embodiments of the present invention will be hereinafter described in detail with reference to the diagrams.

First Embodiment

To begin with, the configuration of computer system pertaining to a first embodiment of the present invention will be described with reference to FIG. 1 to FIG. 6.

FIG. 1 is a diagram showing an exemplary configuration of a computer system.

The computer system is configured from a storage system 100, one or more hosts 200, one or more management servers 300, a storage network 400 and a management network 500. The host 200 and storage system 100 are connected by a Fibre Channel Interface with I/O command and data transmission and reception being performed employing FCP (Fiber Channel Protocol). In addition, the storage system 100 and management server 300 are connected by Ethernet (Registered Trademark) with data transmission and reception being performed using TCP/IP protocol.

There are no restrictions to the interface and protocol employed between the storage system 100 and host 200. While this embodiment cites the employment of Fibre Channel and FCP, Ethernet (Registered Trademark) and iSCSI or the like may also be used. Similarly, the Ethernet (Registered Trademark) and TCP/IP protocol used between the host 200 and the management server 300 is an illustrative example.

The host 200 is a computer in which data is stored in an LDEV (Logical DEVice) supplied by the storage system 100. The "LDEV" referred to here denotes a virtual storage region accessible by the host 200 using a Logical Address ("LDEV" can also be referred to as a "Logical Volume" or a "LU (Logical Unit)"). The host 200 transmits I/O commands containing LDEV identifying information to the storage system 100. As a result, data input/output commands are issued to the storage system 100. For example, when FCP is employed, the host 200 is able to specify the LDEV (the LDEV to serve as a data write destination or, alternatively, as a data read destination) on which data input/output is to be performed by appending to the I/O command, as LDEV identifier information, a number known as a LUN (Logical Unit Number). Examples of the information contained in an I/O command include information that indicates command type such as read or write, a Logical Address (for example, a LBA (Logical Block Address)) that denotes data storage position in the LDEV, and data transfer length.

The storage system 100 comprises a controller 1000, one or more disk units 2000, a service processor 3000, and one or more power units 4000. The controller 1000 and disk unit 2000 perform data transmission/reception employing Ultra SCSI Interface/Protocol. In addition, the controller 1000 and service processor 3000 are connected by Ethernet (Registered Trademark) and perform data transmission/reception using TCP/IP protocol. The power unit 4000 supplies power to the controller 1000, disk unit 2000 and service processor 3000. This interface and protocol are illustrative examples.

The controller 1000 comprises one or more front-end modules 1200, one or more processor modules 1100, one or more shared memory modules 1300, and one or more back-end modules 1600. The modules of the controller 1000 are interconnected by an internal network 1700. The internal network employs Fiber Channel and FCP as its interface and protocol. This interface and protocol are illustrative examples.

The processor module 1100 interprets the I/O command and issues a command to the front-end module 1200 based on the interpreted result. Data transfer between the host 200 and shared memory module 1300 is controlled by the content of this command. In addition, the processor module 1100 issues a command to the back-end module 1600 based on the interpreted result of the I/O command. Data transfer between the shared memory module 1300 and disk unit 2000 is controlled by the content of this command. In addition, the processor module 1100 interprets a later-described management command and, based on this interpreted result, controls the storage system 100 as a whole.

The front-end module 1200 receives an I/O command from the host 200 and transfers this I/O command to the processor module 1100. In addition, the front-end module 1200 performs data transfer between the host 200 and shared memory module 1300 in accordance with a command from the processor module 1100.

The back-end module 1600 performs data transfer between the shared memory module 1300 and the disk unit 2000 in accordance with a command from the processor module 1100.

The shared memory module 1300 stores cache data. The "cache data" referred to here denotes data temporarily stored in a high-speed storage medium. In addition, the shared memory module 1300 also stores later-described control information related to the storage system 100. The front-end module 1200, the back-end module 1600 and the processor module 1100 are accessible by the shared memory module 1300 by way of the internal network 1700.

The disk unit 2000 stores data to be written in the LDEV. The disk unit 2000 is connected to the back-end module 1600.

A storage administrator uses the service processor 3000 to execute various settings of the storage system 100. The service processor 3000 connected to the processor module 1100 sends a later-described management command to the processor module 1100. In addition, the storage administrator is able to operate the management server 300 to perform operations identical to the service processor 3000. For simplification of the description, the various settings performed using the management server 300 are hereinafter incorporated in the various settings performed using the service processor 3000.

The power unit 4000 supplies an externally-supplied power (for example, commercial power supply) to the devices of the storage system 100. Device groups to which power is supplied from the same power unit 4000 are hereinafter referred to as the "power supplies".

Figure 2:
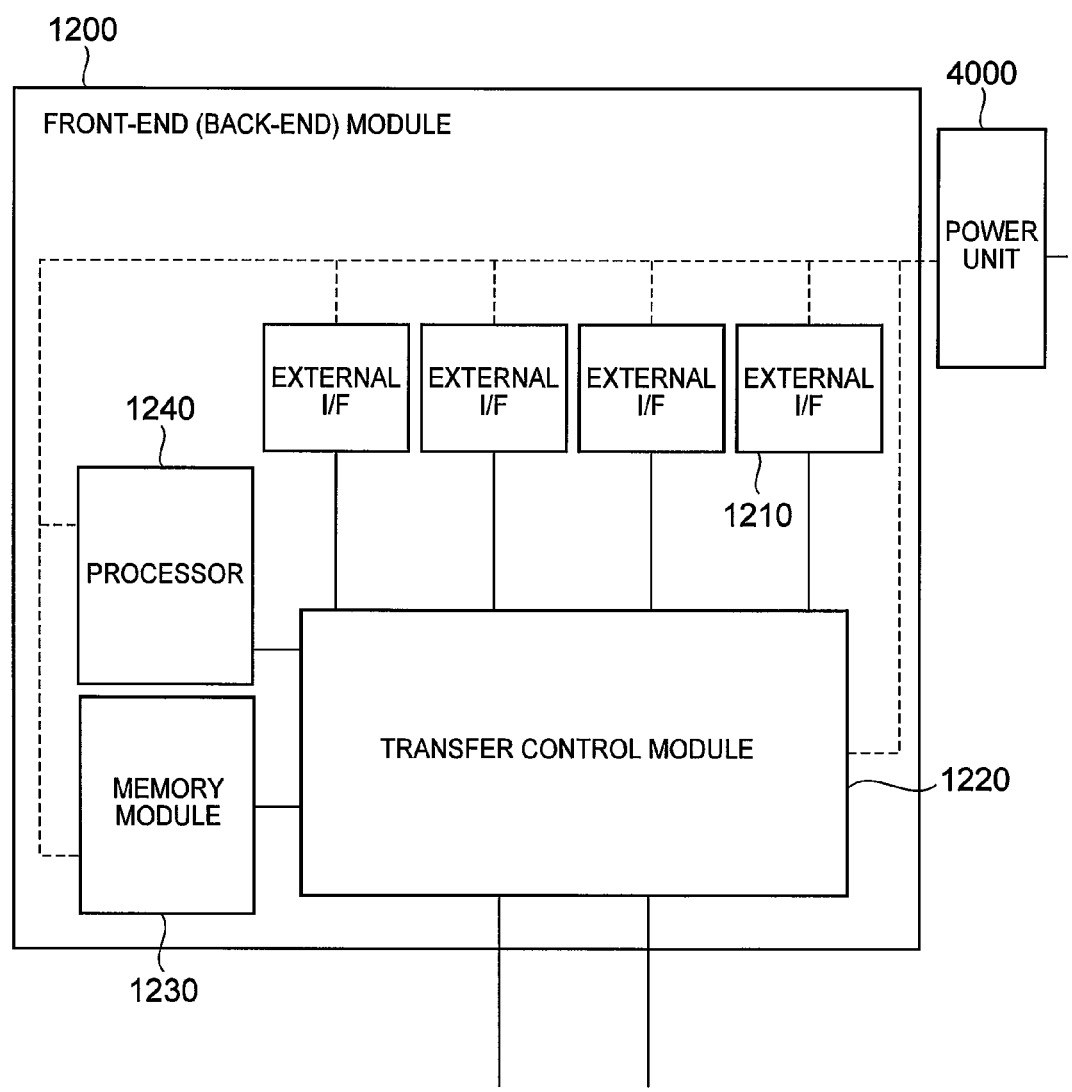
FIG. 2 is a hardware configuration diagram of a front-end (back-end) module of the first embodiment of the present invention.

FIG. 2 is a diagram showing an exemplary hardware configuration of the front-end module 1200 and back-end module 1600.

The front-end module 1200 is configured from at least one external I/F 1210, a transfer control module 1220, a memory module 1230 and a processor 1240. In addition, the exemplary hardware configuration of the back-end module 1600 is identical to that of the front-end module 1200.

First, the front-end module 1200 will be described. The processor 1240 executes various programs stored in the memory module 1230. The external I/F 1210 transfers an I/O command received from the host 200 and performs I/O data transmission/reception (data input/output accompanying the processing of I/O commands) in accordance with a command from the processor 1240. The transfer control module 1220 performs communication and data transfer between the processor module 1100 and the shared memory module 1300 in accordance with a command from the processor 1240. Later-described various programs and data are stored in the memory module 1230. The power unit 4000 supplies power to these modules.

Next, the back-end module 1600 will be described. The processor 1240 executes various programs stored in the memory module 1230. The external I/F 1210 performs data access to the disk unit 2000 in accordance with a command from the processor 1240. The transfer control module 1120 performs communication and data transfer between the processor module 1100 and the shared memory module 1300 in accordance with a command from the processor 1240. Later-described various programs and data are stored in the memory module 1230. The power unit 4000 supplies power to these modules.

Figure 3:
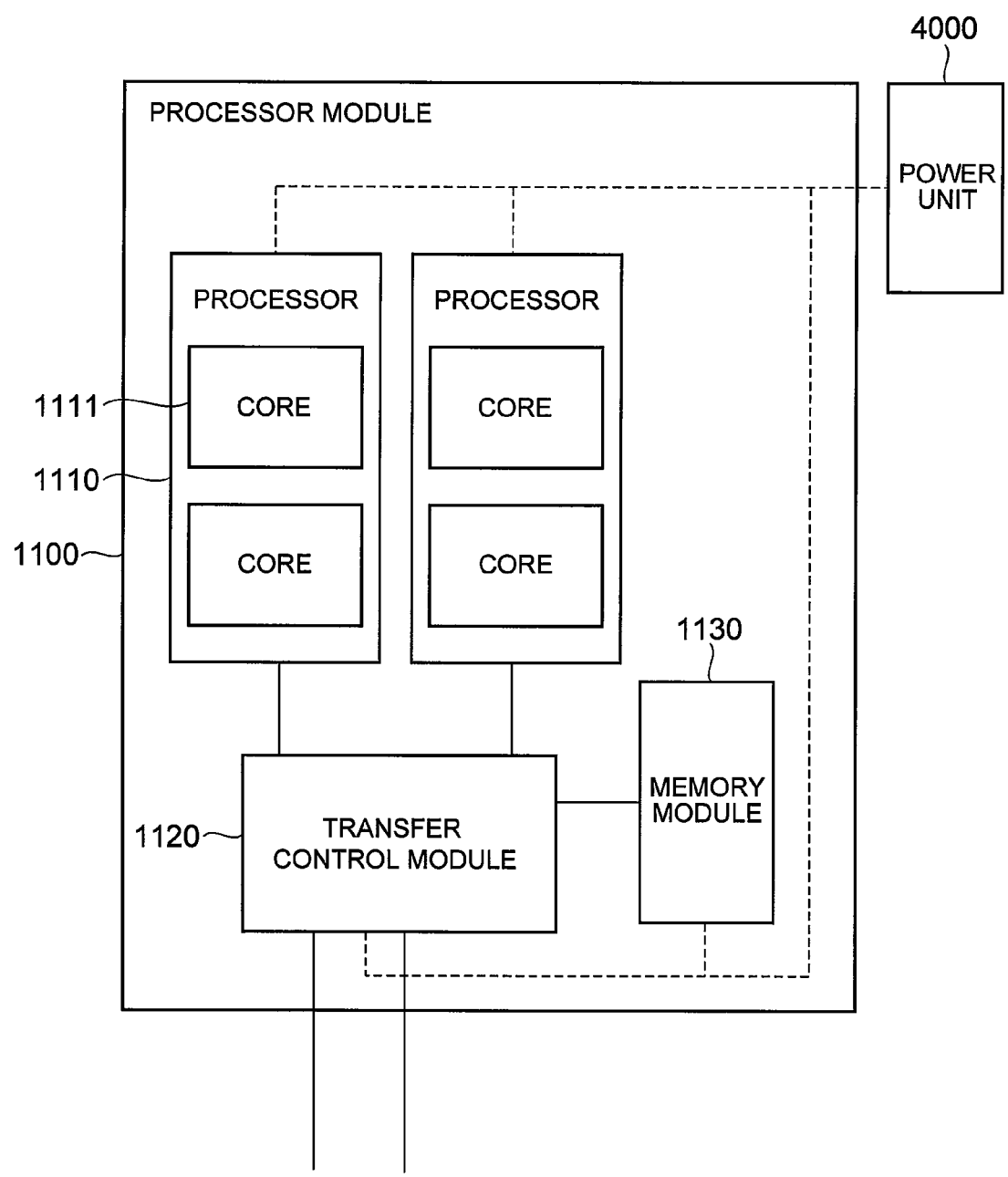
FIG. 3 is a hardware configuration diagram of a processor module of the first embodiment of the present invention.

FIG. 3 is a diagram showing an exemplary hardware configuration of the processor module 1100.

The processor module 1100 is configured from one or more processors 1110, a transfer control module 1120 and a memory module 1130.

The processor 1110 executes various programs stored in the memory module 1130. The transfer control module 1120 controls communication between another processor 1110, the front-end module 1200, the back-end module 1600, the shared memory module 1300 and the service processor 3000 in accordance with a command from the processor 1110. Later-described various programs and various data are stored in the memory module 1130. The power unit 4000 supplies power to these modules.

The processor 1110 comprises one or more internal cores 1111. The core 1111 constitutes a calculation circuit possessed by the processor 1110, the greater the number of cores the better the processing capacity of the processor 1110. The power supply to one core 1111 can be controlled independently of the power supply to another core 1111. In other words, a single core 1111 selected from among a plurality of cores 1111 can be put to sleep (migrated to a sleep state).

The processor module 1100 or processor 1110 comprises a function for being put to sleep based on either receipt of an external sleep command or a self-executed sleep command. In addition, the processor module 1100 or processor 1110 also comprises a function for being started based on receipt of an external start command while sleeping (for example, a configuration in which at least an element for receiving an external start command (for example, a circuit) is put to sleep with the power supply in the ON state).

The active processor module, active processor and active core described hereinafter refer to a state in which a processor module, a processor, or a core is "active" (the active processor also includes a "core sleep" state of a processor). On the other hand, the sleeping processor module, sleeping processor and sleeping core refer to a state in which the processor module, processor or core are in the "sleep" state.

Figure 4:
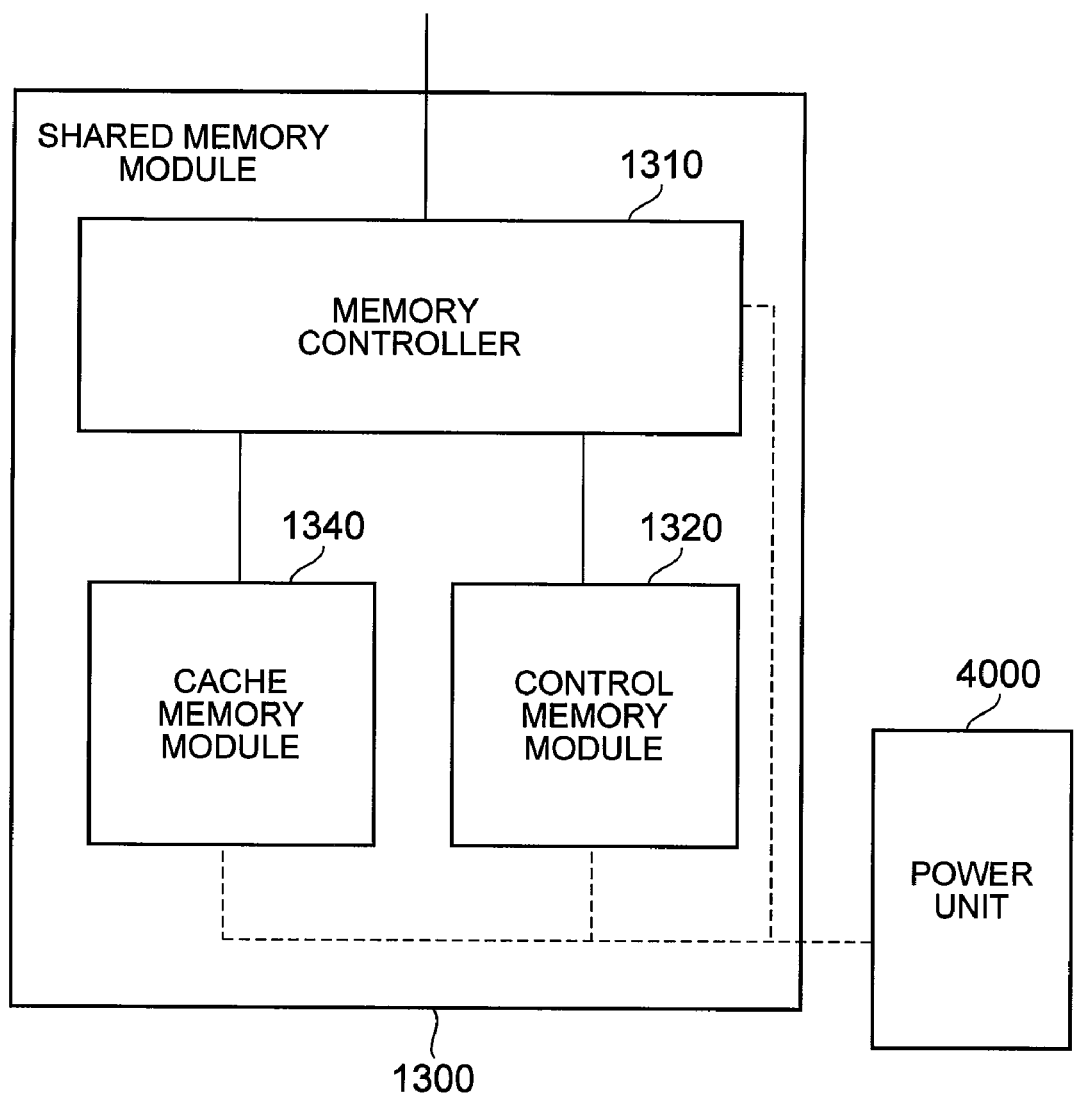
FIG. 4 is a hardware configuration diagram of a shared memory module of the first embodiment of the present invention.

FIG. 4 is a diagram showing an exemplary hardware configuration of the shared memory module 1300.

The shared memory module 1300 is configured from a cache memory module 1340, a control memory module 1320 and a memory controller 1310.

The cache memory module 1340 constitutes, for example, a volatile memory accessible at higher speed than a hard disk drive (HDD). A portion of the data stored in the disk unit 2000 is temporarily stored in the cache memory module 1340 as cache data. Later-described control information related to the storage system 100 is stored in the control memory module 1320. The memory controller 1310 performs data transmission/reception between these two memory modules and the front-end module 1200, the processor module 1100 and the disk unit 2000. The power unit 4000 supplies power to these modules.

In addition, the control memory module 1320 comprises a lock mechanism. The "lock mechanism" referred to here denotes a synchronizing mechanism by which access of one subject to a resource being used by another subject is restricted. In order for the processor 1110 to access the control memory module 1320 the lock must be acquired.

The cache memory module 1340 comprises a function for putting a part of the region of the cache memory module 1340 as a whole to sleep based on receipt of an external sleep command. In addition, the cache memory module 1340 also comprises a function by which it is restarted based on receipt of an external start command while sleeping (for example, a configuration in which at least an element for receiving an external start command (for example, a circuit) is put to sleep, for the entirety of the cache memory module 1340, with the power supply in the ON state).

Figure 5:
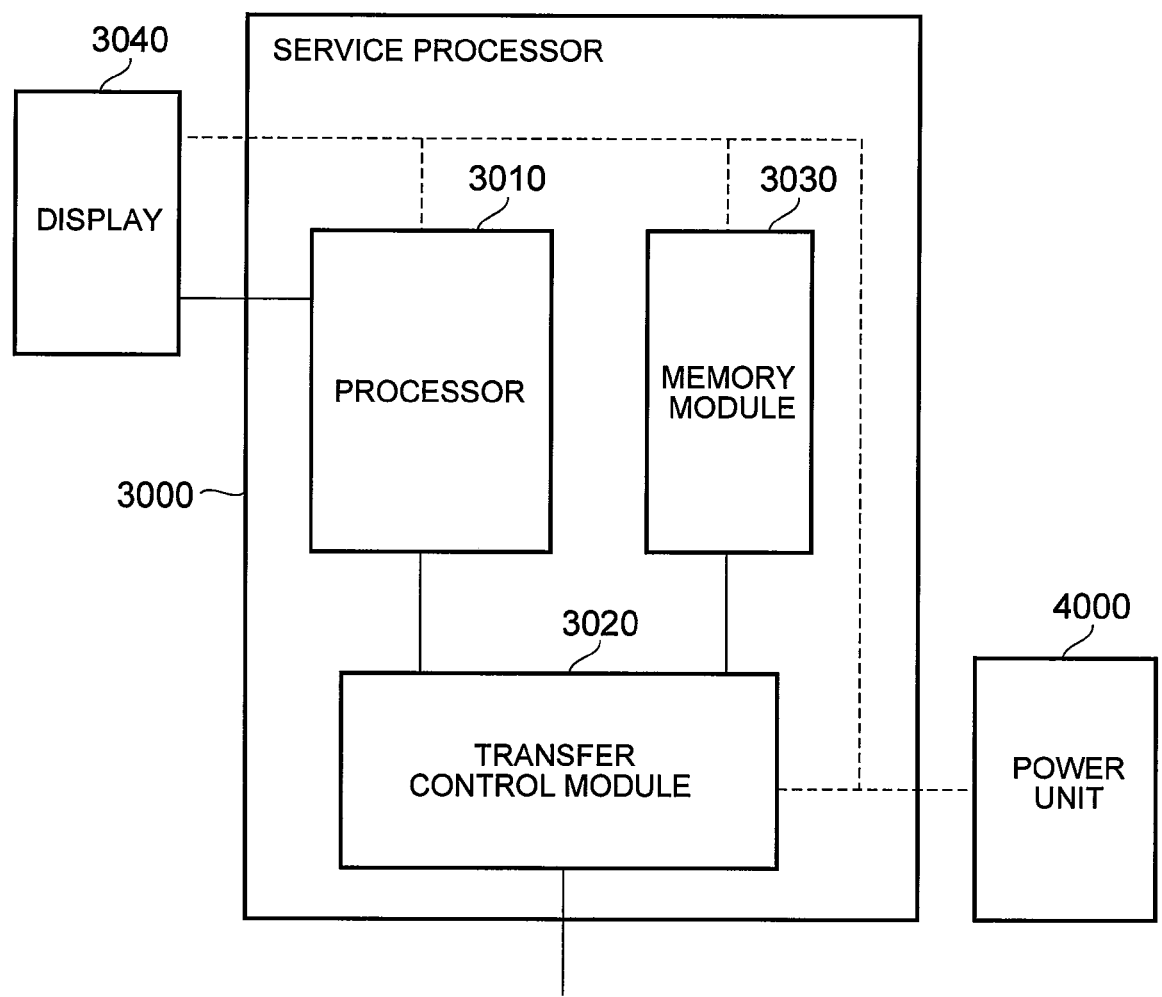
FIG. 5 is a hardware configuration diagram of a service processor of the first embodiment of the present invention.

FIG. 5 is a diagram showing an exemplary hardware configuration of the service processor 3000.

The service processor 3000 is configured from one or more processors 3010, a memory module 3030, a transfer control module 3020 and a display 3040. The processor 3010 executes a management I/F program stored in the memory module 3030. The management I/F program is stored in the memory module 3030. The transfer control module 3020 controls communication with the processor module 1100 in accordance with a command from the processor 3010. The power unit 4000 supplies power to these modules.

Figure 6:
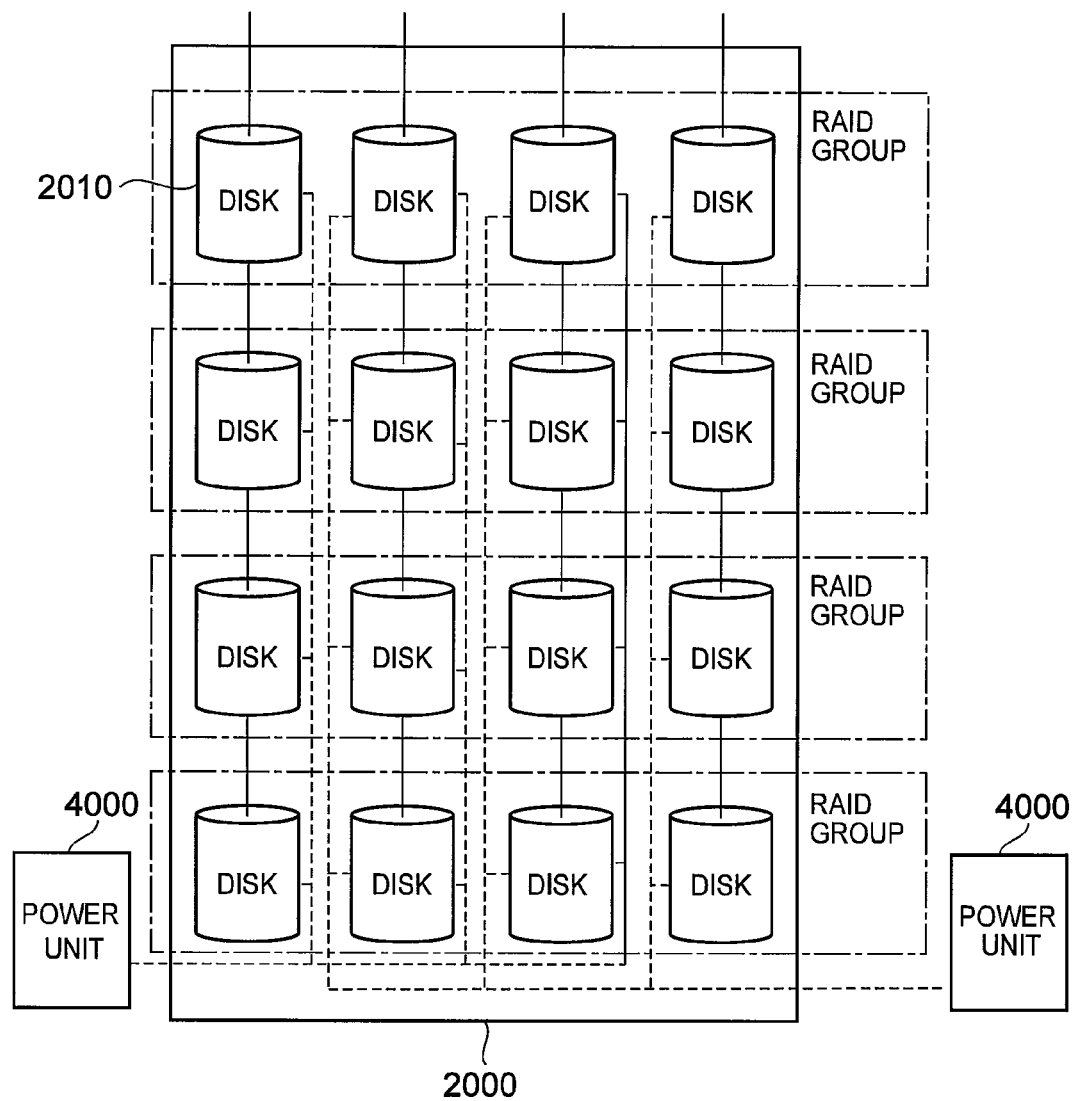
FIG. 6 is a hardware configuration diagram of a disk unit of the first embodiment of the present invention.

FIG. 6 is a diagram showing an exemplary hardware configuration of a disk unit 2000.

One or more disks 2010 are housed in the disk unit 2000. The disk unit 2000 is configured from a RAID (Redundant Array of Inexpensive Disks) based on the assembly of a plurality of disks 2010. RAID refers to a technology based on the assembly of a plurality of storage units that has application as a virtual single hard disk. An accumulation of disks 2010 from which a RAID is configured is known as a "RAID Group". In addition, a LDEV is formed in accordance with the storage space provided by a RAID Group and is defined on the basis of a RAID Group configuration. A plurality of LDEV can be formed in accordance with the storage space of a single RAID Group. The power unit 4000 supplies power to the disks 2010.

There are no restrictions to the method for configuring a LDEV. While this embodiment cites an example of a method for defining a plurality of LDEV with respect to a single RAID Group, a single LDEV may be defined with respect to a single RAID Group and a plurality of LDEV may be defined with respect to a plurality of RAID Groups.

In addition, while the disk 2010 constitutes, for example, a HDD (Hard Disk Drive), other types of disk drive (for example, optical disk drive) may also be used. In addition, instead of a disk drive, other types of storage units (for example, a semiconductor memory drive such as a flash memory) may be adopted.

Figure 7:
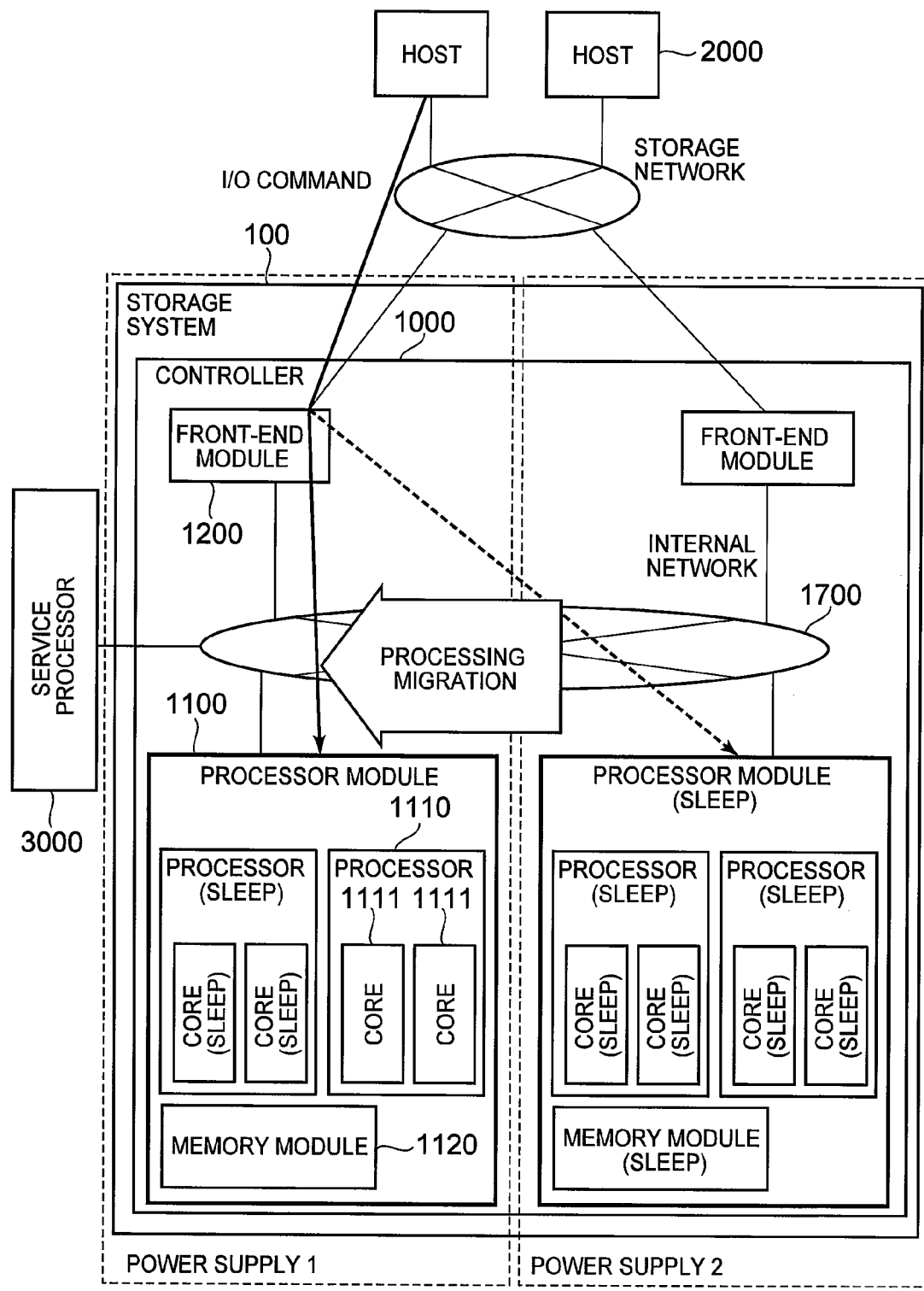
FIG. 7 is a schematic diagram of the first embodiment of the present invention.

Next, an overview of the first embodiment will be described with reference to FIG. 7.

In the first embodiment, the power consumption of the processor module 1100 is reduced.

The I/O command process executed by the processor module 1100 will be hereinafter briefly described. The following description assumes that the LDEV the plurality of LDEV that is to be managed has been assigned to the processor module 1100.

The front-end module 1200 receives an I/O command from the host 200 and transfers this I/O command to, of the one or more processor modules 1100, the managing processor module 1100 of the LDEV designated by the I/O command. The managing processor module 1100 interprets the I/O command received from the front-end module 1200 and, based on this interpreted result, executes write and read to the I/O data cache memory module 1340, as well as data write to the disk unit 2000 or data read from the disk unit 2000.

In this kind of I/O command process, the processor module 1100 executes a large number of processings including I/O command interpreting, I/O data writing, and logical to physical address conversion and, as a result, performance bottlenecks in the processor module 1100 are liable to occur. As a method for suppressing performance deterioration, a method based on increasing the number of processor modules 1100 mounted in the storage system 100 has been considered. However, increasing the number of processor modules 1100 results in increased power consumption by the processor modules 1100.

Thereupon, in this first embodiment, a low load processor module 1100 migrates the I/O command process to a redundant performance processor module (processor module in which, even though the load is increased to some extent, the load is not high) 1100, and then goes to sleep. As a result, the power consumption of the storage system 100 can be reduced.

More specifically, the power consumption is reduced as a result of, for example, the low load processor module 1100 putting the processor 1110 of this module 1100 or the core 1111 of the processor 1110 to sleep. In addition, even when a single active processor 1110 alone exists and the load state is even lower, the low load processor module 1100 migrates the I/O command process of the managed LDEV (LDEV which the low load processor module 1100 is managing) to a performance redundant processor module 1100 and itself goes to sleep. As an example of load evaluation criteria, the ratio of the maximum number of I/O command processings (maximum number of processable I/O commands) per unit time (for example, per second) to current number of I/O commands is employed in this embodiment. In addition to this, load can be evaluated on the basis of the number of I/O commands received per unit time, or on the basis of the load and temperature and so on of a processor 1110 indicated by monitored information.

Consideration of this process raises the additional problems 1 to 4 noted below.

(Problem 1) There is a concern that, as a result of the processor module 1100 going to sleep, the active processor module 1100 will exist in a single power supply alone. This being the case, a fault occurring in the power supply to the active processor module 1100 will result in the absence of a processor module 1100 capable of processing I/O commands and will lead in turn to a temporary system-down state.

(Problem 2) There is a concern that, subsequent to the processor module 1100 going to sleep, a drop in the processor processing capacity of the storage system 100 as a whole will occur and, in turn, the LDEV performance requirement will not be met. The "LDEV performance requirement" referred to here denotes the number of I/O commands with respect to the LDEV that the storage system 100 must process per unit time (for example, per second). The LVED performance requirement can be set by a storage administrator.

(Problem 3) There is a problem inherent to the I/O command process being migrated to a different processor module 1100 in that the memory module 1130 of the migration source processor module 1100 cannot be referred to at the migration destination. For example, the processor module 1100 utilizes a later-described LDEV configuration information copy 1135 or cache table copy 1136 of the memory module 1130 to increase the speed of the I/O command process. However, new information related to the LDEV being managed does not exist in the memory module 1130 of the processor module 1100 to which the I/O command has been migrated. Accordingly, upon receipt of the I/O command at the migrated LDEV, the migration destination processor module 1100 must examine this information by way of the control memory module 1320 and, accordingly, response speed drops.

(Problem 4) When a storage administrator wishes to emphasize performance over the amount of power reduction, a trade-off between power consumption reduction amount and performance and fault tolerance cannot be set.

The following means 1 to 4 are implemented in this first embodiment to resolve these problems.

(Means 1) The low load processor module 1100, prior to going to sleep, judges whether or not another processor module 1100 is being activated by two or more power supplies, and goes to sleep if the adjudged result thereof provides indication to that effect. As a result, in the storage system 100, the existence of processor modules 1100 activated by two or more power supplies is always guaranteed. Accordingly, a system-down state due to occurrence of power supply fault can be prevented. While the number of power supplies in which the active processor module 1100 exists is confirmed in this (Means 1), the number of active processor modules 1100 may instead be confirmed. That is, the low load processor module 1100, prior to going to sleep, judges whether or not two or more other active processor modules 1100 exist, and goes to sleep if the adjudged result thereof provides indication to that effect. As a result, if a fault occurs in any of the other active processor modules 1100, a system-down state can be prevented.

(Means 2) The low load processor module 1100 judges whether or not, when the load placed thereon is to be migrated to another processor module 1100, the LDEV performance requirement will be met, and whether the load on the other processor module 1100 will be high or not. If the LDEV performance requirement will be met and the load on the other processor module 1100 will not be high, the low load processor module 1100 assigns the managed LDEV assigned thereto to the other processor module 1100 and goes to sleep. As a result, when the managed LDEV assigned to the low load processor module 1100 is assigned to the migration destination processor module 1100, the LDEV performance requirement can be met.

(Means 3) The low load processor module 1110, prior to migration of the I/O command process, issues a command to the migration processor module 1100 to produce the LDEV configuration information copy 1135 and cache table copy 1136 in the memory module 1130. Accordingly, when the I/O command process is migrated between different processor modules 1100, a drop in response performance of the storage system 100 can prevented.

(Means 4) An energy-saving power level, low load threshold value and high load threshold value are received from the service processor 3000 by at least a processor module 1100 which writes the received energy-saving power level, low load threshold value and high load threshold value in the shared memory module 1300. The processor module 1110 executes processing on the basis of this energy-saving power level, low load threshold value and high load threshold value. As a result, a trade-off between power consumption amount reduction and performance and fault tolerance can be set.

The "energy-saving power level" referred to here denotes a sleep method by which processor sleep, processor module sleep and core sleep are enabled. In this embodiment, the energy-saving power level is settable from level 1 to level 4. When level 1 is set, the processor module 1100 does not execute power management. When level 2 is set, the processor module 1100 is able to execute core sleep. When level 3 is set, the processor module 1100 is able to execute core sleep and processor sleep. When level 4 is set, the processor module 1100 is able to execute processor sleep, processor module sleep and core sleep.

The "processor module sleep" referred to here denotes a state in which each of a processor 1110, memory module 1130 and transfer control module 1150 of the processor module 1100 are sleeping. The "processor sleep" denotes when a processor 1110 alone is sleeping. The "core sleep" denotes when a core 1111 is sleeping.

Each of the aforementioned problems 1 to 4 can be resolved by these means 1 to 4. The first embodiment will be hereinafter described in detail.

Figure 8:
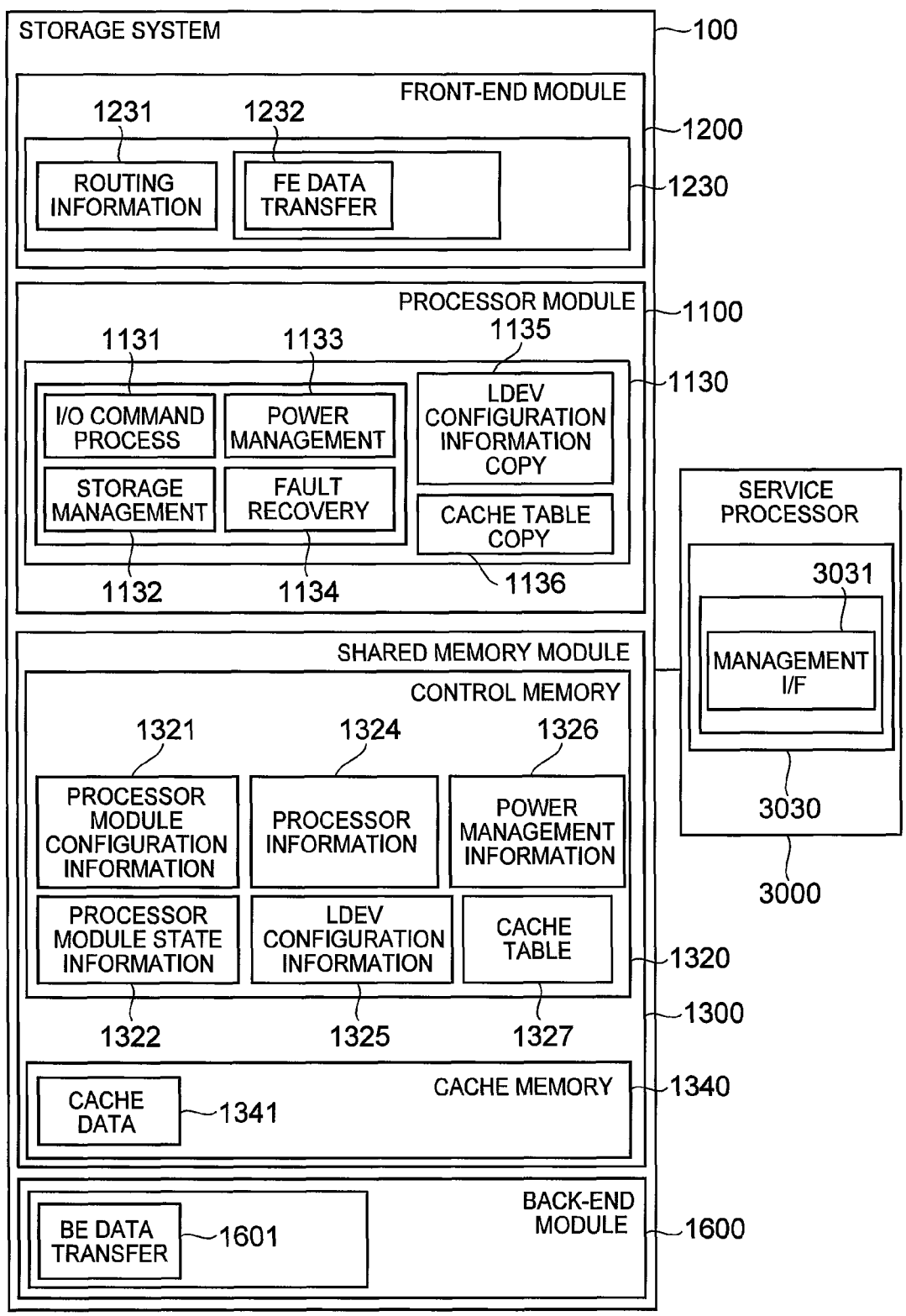
FIG. 8 is a diagram showing programs and various data of the first embodiment of the present invention.

The various programs and various data of the storage system 100 will be described with reference to FIG. 8.

The front-end module 1200 performs FE data transfer processing based on execution of an FE (Front End) data transfer program 1232 stored in the memory module 1230 by the processor 1240.

A processor module 1100 performs each of an I/O command process, a storage management processing, a power management processing and a fault recovery processing based on an I/O command process program 1131, storage management program 1132, power management program 1133 and fault recovery program 1134 stored in the memory module 1130 being executed by the processor 1110.

The back-end module 1600 performs BE data transfer processing based on execution of a BE data transfer program 1601 by the processor 1240.

The service processor 3000 performs management I/F processing based on a management interface (I/F) program 3031 stored in a memory module 3030 being executed by the processor 3010.

The processings performed on the basis of execution of each of the FE data transfer program 1232, I/O command process program 1131, storage management program 1132, power management program 1133, fault recovery program 1134, BE data transfer program 1601 and management I/F program 3031 by the respective processors (for example, microprocessors) may also be actualized using, for example, integrated circuit-based hardware. For the purpose of simplification of the description, the processings actualized as a result of execution of the programs by the processor 1110, processor 1240 and processor 3010 are referred to in the description as the subject.

The FE data transfer program 1232 transfers an I/O command received from a host 200 to a processor module 1100 correspondent to an LUN contained in this I/O command. In addition, the FE data transfer program 1232 controls data transfer between the host 200 and storage system 100 in accordance with a command from the processor module 1100. The routing information 1231 indicates the managing processor module 1100 of each LUN. The particulars of the routing information 1231 are described later with reference to FIG. 15.

The BE data transfer program 1601 controls data transfer between the controller 1000 and disk unit 2000 in accordance with a command from the processor module 1100.

The LDEV configuration information copy 1135 stored in the memory module 1120 of the processor module 1100 constitutes a copy of all or a portion of a later-described LDEV configuration information 1325. The processor module 1100 performs high-speed processing (for example, conversion from logical to physical address) based on reference to the LDEV configuration information copy 1135 and not the LDEV configuration information 1325 stored in the shared memory module 1300.

The cache table copy 1136 stored in the memory module 1120 of the processor module 1100 constitutes a copy of a portion of an LDEV managed by a later-described cache table 1327. By reference to the cache table copy 1136, the processor module 1100 can assess at high speed whether or not LDEV data exists in the cache data 1341.

The I/O command process program 1131 executed by the processor module 1100 interprets the I/O command transferred from the front-end module 1200 and performs a processing designated by a command code.

If data read is designated by the command code, the I/O command process program 1131 first reads the LUN, address and the transfer length of the I/O command. Next, the I/O command process program 1131, referring to the cache table copy 1136, examines whether or not the data in question (data that should be read in accordance with an I/O command) exists in the cache data 1341 of the cache memory module 1340. If cache data exists, the I/O command process program 1131 issues a command to the FE data transfer program 1232 to transfer this cache data 1341 to the host 200.

If this cache data does not exist, the I/O command process program 1131 issues a command to the BE data transfer program 1601 to perform a data transfer from the disk unit 2000 to the cache memory module 1230. If the cache data exists, the I/O command process program 1131 then issues a command to the FE data transfer program 1232 to transfer the cache data 1341 to the host 200. Finally, the I/O command process program 1131 updates the cache table 1327 and the cache table copy 1136.

If data write is designated by the command code, the I/O command process program 1131 first reads the LUN, the address and the transfer length of the I/O command. Next, the I/O command process program 1131 issues a command to the FE data transfer program 1232 to perform a transfer of data from the host 200 to the cache memory module 1340. Subsequent to the completion of this data transfer, the I/O command process program 1131 transmits an END message to the host 200. The I/O command process program 1131 then updates the cache table 1327 and the cache table copy 1136.

In addition, the I/O command process program 1131 regularly (or irregularly) confirms the contents of the cache table 1327 and examines the volume of unwritten data in the disk unit 2000. When the unwritten data exceeds a fixed volume, the I/O command process program 1131 issues a command to the back-end module 1600 to destage the cache data 1341. The "destage" referred to here denotes writing of unwritten cache data in the disk unit 2000. The I/O command process program 1131 then accesses the cache table 1327 and updates a write flag correspondent to a memory block (constituent element of the cache memory module 1340) in which the destaged cache data exists from "unwritten" to "written".

The storage management program 1132 receives a management command from the service processor 3000 and updates the various control information stored in the control memory module 1320 in accordance with this management command. Examples of this control information include processor module configuration information 1321, processor module state information 1322, processor information 1324, LDEV configuration information 1325 and power management information 1326. The LDEV configuration information copy 1135 is updated simultaneously with the update of the LDEV configuration information 1325.

The power management program 1133 monitors the active state of the processor 1110 and regularly (or irregularly) updates the processor information 1324 and processor module state information 1322 stored in the control memory module 1320. In addition, the power management program 1133 regularly (or irregularly) executes a processor sleep control. The particulars of the processor sleep control are described later with reference to FIG. 16 to FIG. 19. In addition, the power management program 1133 regularly (or irregularly) executes the processor start control described by FIG. 20 of a sleeping processor module 1100, sleep processor 1110 or sleeping core 1111, and starts the sleeping processor module 1100, sleep processor 1110 or sleeping core 1111 when the load on the processor module 1100 is high. However, when level 1 is indicated by the later-described power management information 1326 input by way of the service processor 3000 by a storage administrator and stored in the shared memory module 1300, the power management processing described above is not executed by the processor module 1100.

The fault recovery program 1134, upon detection of fault in a self-executing processor module 1100, notifies one of the other active processor modules 1100 of fault generation. In addition, the fault recovery program 1134 regularly (or irregularly) sends a heartbeat signal to another active processor module 1100. The "heartbeat signal" referred to here denotes an externally-sent signal used to provide notification that the program itself is being activated normally. When notification of a fault from another processor module 1100 is provided or receipt of the heartbeat signal is interrupted, the fault recovery program 1134 executes the fault recovery of the processor module 1100 in question. The particulars related to the actuation of the fault recovery program 1134 during execution of processor fault recovery will be described later with reference to FIG. 21.

The various control information stored in the control memory module 1320 will be described later with reference to FIG. 9 to FIG. 14.

Figures 13, 14:
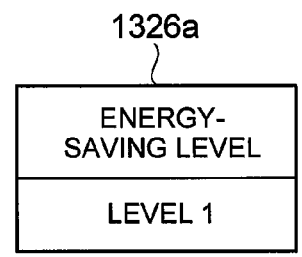
FIG. 13 is a diagram showing the configuration of a cache table of the first embodiment of the present invention.
FIG. 14 is a diagram showing the configuration of power management information of the first embodiment of the present invention.

The cache data 1341 is divided into a plurality of data blocks that are stored in respectively different LDEV. The "data blocks" referred to here denote cache data 1341 management units. Referring to FIG. 14, the later-described cache table 1327 retains a correspondence relationship between these data blocks and LDEV addresses.

The management I/F program 3031 displays a management screen (for example, GUI (Graphical User Interface)) on a display 3040. The storage administrator sets the LDEV performance requirement and inputs the energy-saving power level, low load threshold value and high load threshold values of the processor module 1100 by way of this management screen. The I/F program 3031 transmits the information input by the storage administrator as a management command to the processor module 1100 on which the storage management is being performed.

The processor module configuration information 1321, processor module state information 1322, processor information 1324, LDEV configuration information 1325, power management information 1326 and cache table 1327 stored in the control memory module 1320 will be described with reference to FIG. 9 to FIG. 14. This information includes information such as the configuration of the hardware and LDEV and so on, the settings established by the storage administrator, and device performance and active conditions such as the number of accesses from the host.

FIG. 9 shows the configuration of the processor module configuration information 1321.

The processor module configuration information 1321 which is provided as, for example, a table, contains information related to the configuration and setting of the processor module 1100. The processor module configuration information 1321 comprises an entry region 1321*a* to entry region 1321*g* for each processor module 1100.

More specifically, a processor module 1100 identifying number (processor module number) of the is stored in the entry region 1321*a*. An identifying number of the processor 1110 (processor number) of the processor module 1100 of the entry is stored in the region 1321*b*. An identifying number of the LDEV managed by a processor module 1100 (managed LDEV number) is stored in the entry region 1321*c*. An identifying number of the LDEV initially managed by a processor module 1100 (initially managed LDEV number) is stored in the entry region 1321*d*. A threshold value (low load threshold value) serving as a reference for determining whether or not the processor module 1100 is a low load is stored in the entry region 1321*e*. The threshold value (high load threshold value) serving as a reference for determining whether or not the processor module 1100 is a high load is stored in the entry region 1321*f*. A identifying number of the power supply (power supply number) to which a processor module 1100 is affiliated is stored in the entry region 1321*g*.

The processor module in which a processor exists can be specified by reference to this processor module configuration information 1321.

FIG. 10 shows the configuration of the processor module state information 1322.

The processor module state information 1322 which is provided as, for example, a table, contains information related to the performance and active conditions of a processor module 1100. The processor module state information 1322 comprises an entry region 1322*a* to entry region 1322*e* for each processor module 1100.

A processor module 1100 identifying number (processor module number) is stored in the entry region 1322*a*. The sum total of the capacity performance of the active processor modules 1100 of a processor 1110 (processor module capacity performance) is stored in the entry region 1322*b*. The capacity performance of a processor 1110 referred to here denotes the number of I/O commands processable thereby per unit time (for example, per second). This capacity performance changes in accordance with the number of active cores in an active processor 1110. The I/O command number that must be processed by the processor module 1100 per unit time (processor module performance requirement) in order to meet the performance requirement of the LDEV being managed is stored in the entry region 1322*c*. Accordingly, the value stored in the entry region 1322*c* constitute a sum total of the performance requirements of the LDEV being managed by the processor modules 1100 (the LDEV performance requirements are stored in the LDEV configuration information table of FIG. 12). A current processor module 1100 load is stored in the entry region 1322*d*. The stored load constitutes a value (for example, a percentage of processor module capacity performance with respect to processor module current performance) calculated on the basis of the processor module capacity performance stored in the entry region 1322*b* and the number of I/O commands processed by the current processor module 1100 (hereinafter processor module current performance). Information (processor module state) that expresses the state of a processor module 1100 such as "active", "sleep" or "fault" is stored in the entry region 1322*e*.

FIG. 11 shows the configuration of the processor information 1324.

The processor information 1324 which is provided as, for example, a table, contains information related to the performance, configuration and operational state of a processor 1110. The processor information 1324 comprises an entry region 1324a to entry region 1324e for each processor 1110.

A processor 1110 identifying number (processor number) is stored in the entry region 1324a. A capacity performance (core capacity performance) of each core of a processor 1110 is stored in the entry region 1324b. The number of current active cores (active core number) is stored in the entry region 1324c. The performance (processor capacity performance) of a processor 1110 is the product of core capacity performance and number of active cores. The number of I/O commands per second processed by the current processor 1110 (processor current performance) is stored in the entry region 1324d. Information (processor state) expressing the state of the processor 1110 such as "active", "sleep", "core sleep" is stored in the entry region 1324e.

The core capacity performance value may be a value input by either an administrator or storage administrator of the storage system 100, or it may be a value automatically calculated by a processor module 1100 from operation results or device specifications.

FIG. 12 shows the configuration of the LDEV configuration information 1325.

The LDEV configuration information 1325 which is provided as, for example, a table, contains information related to the configuration and setting of LDEV. The LDEV configuration information 1325 comprises an entry region 1325a to entry region 1325f for each LDEV.

A LDEV identifying number (LDEV number) is stored in the entry region 1325a. An identifying number of the RAID Group defined by LDEV (RAID Group number) is stored in the entry region 1325b. The head physical address (initial address) of the RAID Group of the LDEV is stored in the entry region 1325c. The LDEV storage capacity (region size) assigned to the RAID Group is stored in the entry region 1325d. In the example of this embodiment, megabyte is employed as the unit of region size. A port identifier-LUN set correspondent to an LDEV is stored in the entry region 1325e. The LDEV performance requirement established by a storage administrator is stored in the entry region 1325f.

FIG. 13 shows the configuration of the cache table 1327.

The cache table 1327 contains information related to cache data 1341 storage position. The cache table 1327 comprises an entry region 1327a to entry region 1327e for each data block (LDEV constituent element).

A identifying number (LDEV number) of an LDEV comprising a data block is stored in the entry region 1327a. A head logical address having correspondence to a data block is stored in the entry region 1327b. Data size (stored data length) stored in the data block is stored in the entry region 1327c. A physical address of a memory block of a cache memory module having correspondence to a data block is stored in the entry region 1327d. Information related to whether or not data stored in a memory block is already written in a corresponding data block (for example, information as to whether it is "written" or "unwritten") is stored in the entry region 1327e.

FIG. 14 schematically shows the configuration of the power management information 1326.

The power management information 1326 contains information related to power management-related settings. The power management information 1326 comprises an entry region 1326a, and values expressing the aforementioned energy-saving power level are stored in this entry region 1326a.

FIG. 15 shows the configuration of the routing information 1231 stored in the front-end module 1200.

The routing information 1231 contains the correspondence relationship between a LUN and a processor module that manages the LDEV correspondent to the LUN. The routing information 1231 which is provided as, for example, a table, comprises an entry region 1231a and an entry region 1231b for each LUN.

LUN are stored in the entry region 1231a. A identifying number of a processor module 1100 managing the LDEV (managing processor module number) correspondent to the LUN is stored in the entry region 1231b.

Next, the various processings executed by this embodiment will be described with reference to FIG. 16 to FIG. 21. The steps of these diagrams enclosed by a double line will be described in detail with reference to other diagrams.

Figure 16:
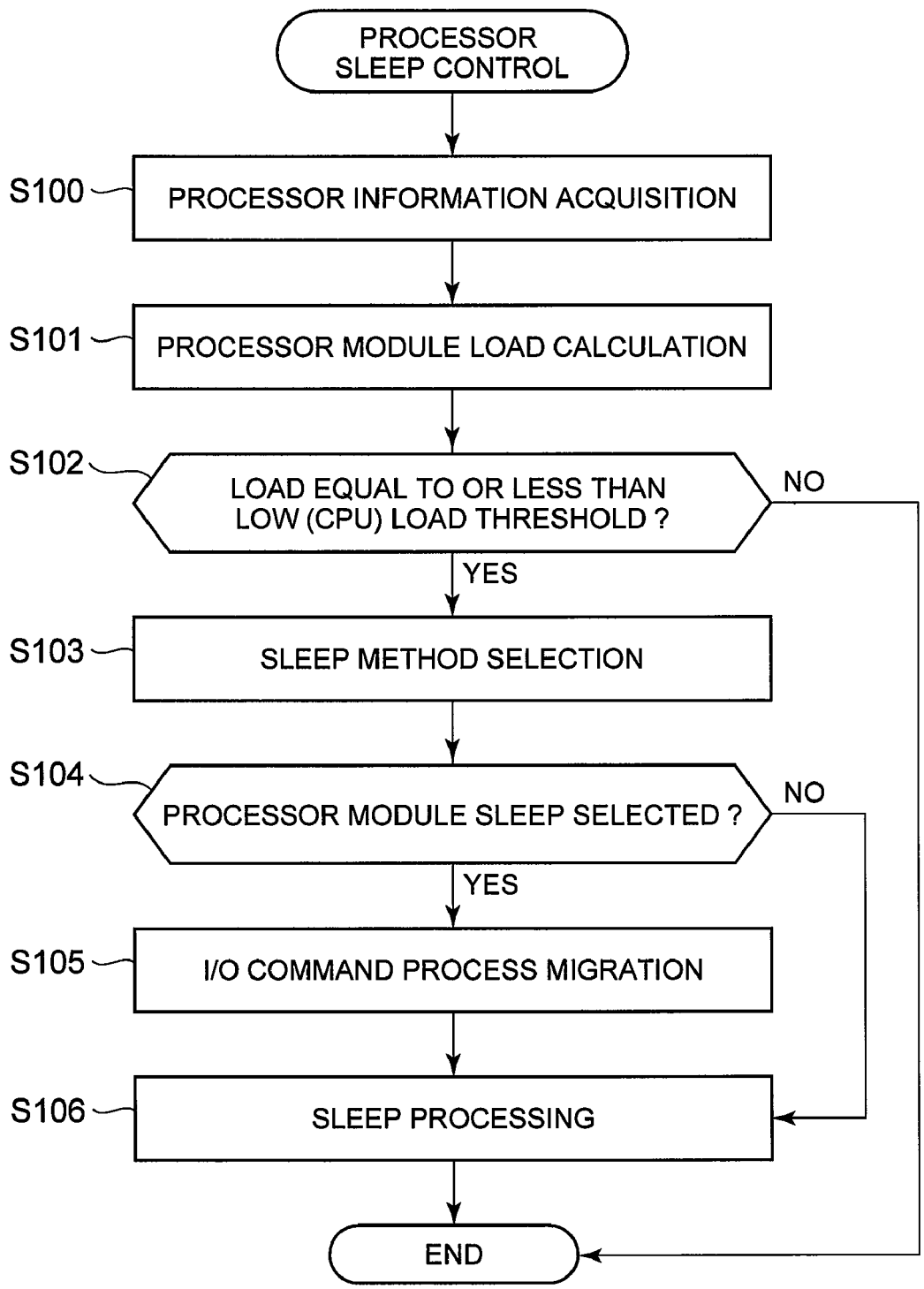
FIG. 16 is a flow chart of processor sleep control processing of the first embodiment of the present invention.

FIG. 16 is a flow chart of processor sleep control processing. The steps thereof will be hereinafter described. For convenience of the description, a single processor module serving as a target of processing will be hereinafter referred to as the "target processor module".

(S100) The power management program 1133 reads the processor module configuration information 1321, processor module state information 1322, processor information 1324 and power management information 1326 from the control memory module 1320.

(S101) The power management program 1133 calculates the product of the core capacity performance (in other words, the processor capacity performance) of the processor information 1324 (information stored in the entry region 1324b) and the number of active cores (information stored in the entry region 1324c) of the active processors 1110 of a target processor module (in other words, self-actuating processor module) 1100. In addition, the power management program 1133 calculates the sum total of the processor capacity performance of the one or more active processors (processors correspondent to the "active" processor state) existing in the target processor module 1100, in other words, the processor module capacity performance, and stores the calculated processor module capacity performance in the entry region 1322b. Furthermore, the power management program 1133 examines the processor current performance of the active processors (the number of I/O commands processed per second which is information stored in the entry region 1324d). The power management program 1133 calculates the processor module load from the sum total of the processor current performance of the active processors and the aforementioned processor module capacity performance, and stores this calculated processor module load in the entry region 1322d.

(S102) The power management program 1133 compares the processor module load obtained in S101 with a low load threshold value (information stored in the entry region 1321e) correspondent to the target processor module 1100 executing S103 when the processor module load is less than the low load threshold value, and otherwise ending the processor sleep control.

(S103) The power management program 1133 selects a sleep method in response to the energy-saving power level (energy-saving power level indicated by the power management information 1326) set by a storage administrator. The particulars of sleep method selection will be described later with reference to FIG. 17. If processor module sleep is selected, the power management program 1133 also executes an I/O command process migration destination processor module 1100 search.

(S104) If processor module sleep is selected in S103 the power management program 1133 executes S105. Otherwise, it executes S106.

(S105) The power management program 1133 migrates the I/O command process of the LDEV managed by a self-executing processor module 1100 to the migration destination processor module 1100 found in S103. The particulars of the I/O command process migration will be described later with reference to FIG. 19.

(S106) If processor module sleep is selected in S103, the power management program 1133 updates information stored in the entry region 1322*e* correspondent to the target processor module 1100 to "sleep". If processor sleep is selected in S103, the power management program 1133 updates the information stored in the entry region 1324*e* correspondent to the selected processor 1110 (processor 1110 selected in the S410 processing of FIG. 17) processing to "sleep". If core sleep is selected in S103, the power management program 1133 updates the information stored in the entry region 1324*e* correspondent to the selected processor 1110 (core 1111 selected in the S420 processing of FIG. 17) to "core sleep" and, furthermore, in order to put a single core 1111 to sleep, decreases the number of active cores stored in the entry region 1324*c* correspondent to the selected processor 1110 by one (for example, where the number of active cores is N, updates this to N−1).

Thereafter, the power management program 1133 puts the processor 1110, processor module 1100 or core 1111 to sleep in response to the selected sleep method. However, when no sleep method is selected, the power management program 1133 is not executed.

During this series of processings, the power management program 1133 acquires the control memory module 1320 lock and prohibits access to the control memory module 1320 by another power management program 1133.

Figure 17:
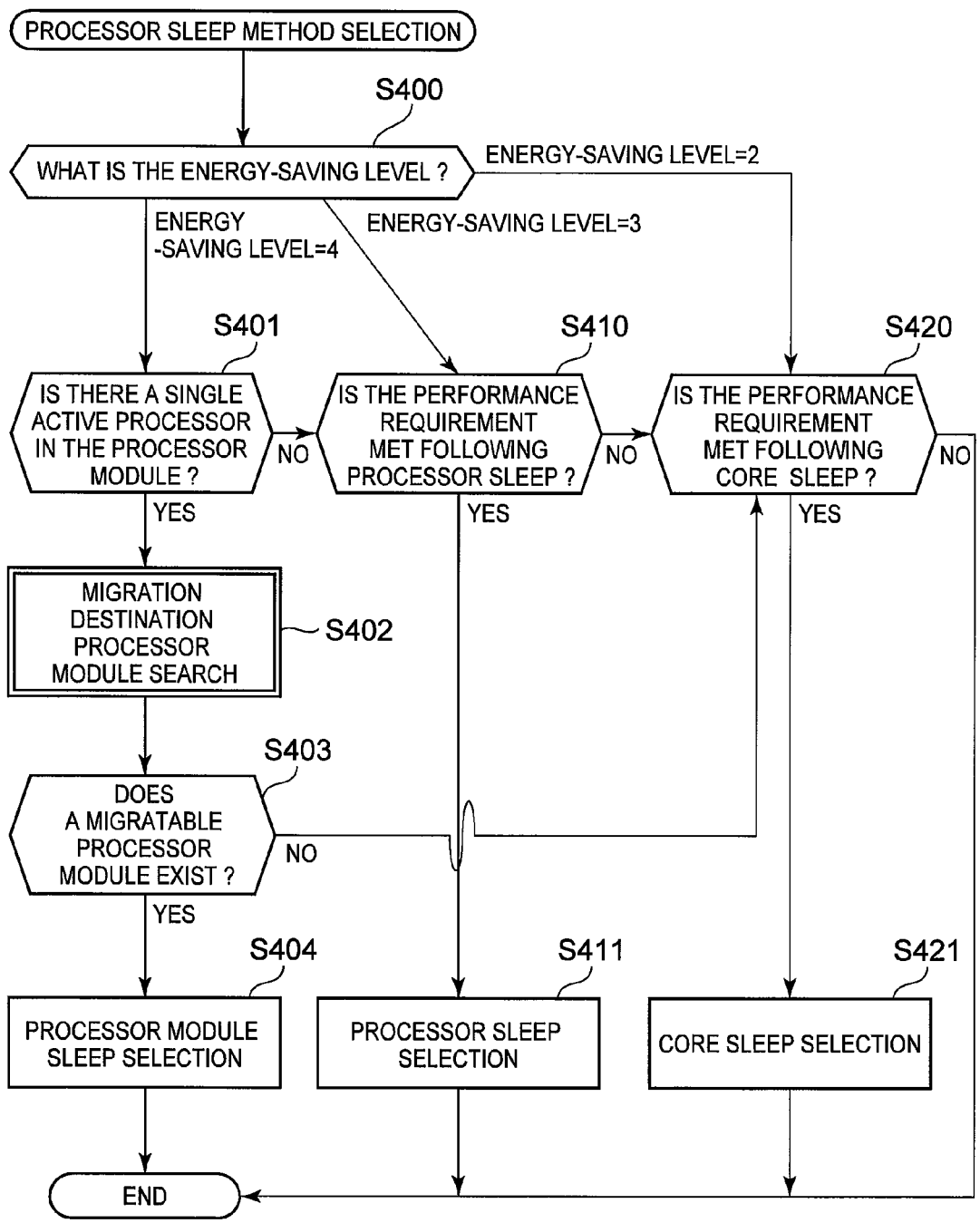
FIG. 17 is a flow chart of processor sleep method selection processing of the first embodiment of the present invention.

FIG. 17 is a flow chart of processor sleep method selection processing.

(S400) The power management program 1133 examines the energy-saving power level (entry region 1326*a*) indicated by the power management information 1326 executing S401 if the energy-saving power level is 4, S410 if the energy-saving power level is 3, and S420 if the energy-saving power level is 2.

(S401) The power management program 1133 examines on the basis of the processor number (entry region 1321*b*) of the processor module configuration information 1321 and the processor state (entry region 1324*e*) of the processor information 1324 if one or two or more target processor modules 1100 exist in the active processor 1110. The power management program 1133 executes S402 if there is one in the active processor 1110, and otherwise executes S410.

(S402) The power management program 1133 searches for a migration destination processor module 1100. The particulars of the migration destination processor module search processing will be described later with reference to FIG. 18.

(S403) If the migration destination processor module 1100 is found in S402, the power management program 1133 executes S404, while otherwise the power management program 1133 executes S420.

(S404) The power management program 1133 selects processor module sleep and ends the sleep method selection processing.

(S410) The power management program 1133 selects a single processor 1110 from the one or more active processors in the target processor module 1100 and calculates the current performance of the processor module 1100 subsequent to the selected processor 1110 being put to sleep. This current performance is calculated by, for example, subtraction of the current performance of the selected processor from the current performance of the target processor module. The power management program 1133 executes S411 when the calculated current performance is greater than the processor module performance requirement (value stored in the entry region 1322*c*), and otherwise executes S420.

(S411) The power management program 1133 selects the processor sleep and ends the sleep method selection processing.

(S420) The power management program 1133 selects one (or a plurality) of cores from two or more active cores of an active processor and calculates the capacity performance of the processor module 1100 subsequent to the selected core 1111 being put to sleep. This capacity performance is calculated by, for example, subtracting the capacity performance of the selected core from the capacity performance of the target processor module. The power management program 1133 executes S421 when the calculated capacity performance is greater than the processor module performance requirement (value stored in the entry region 1322*c*), and otherwise ends the sleep method selection processing without a sleep method having been selected.

(S421) The power management program 1133 selects core sleep and ends the sleep method selection processing.

Figure 18:
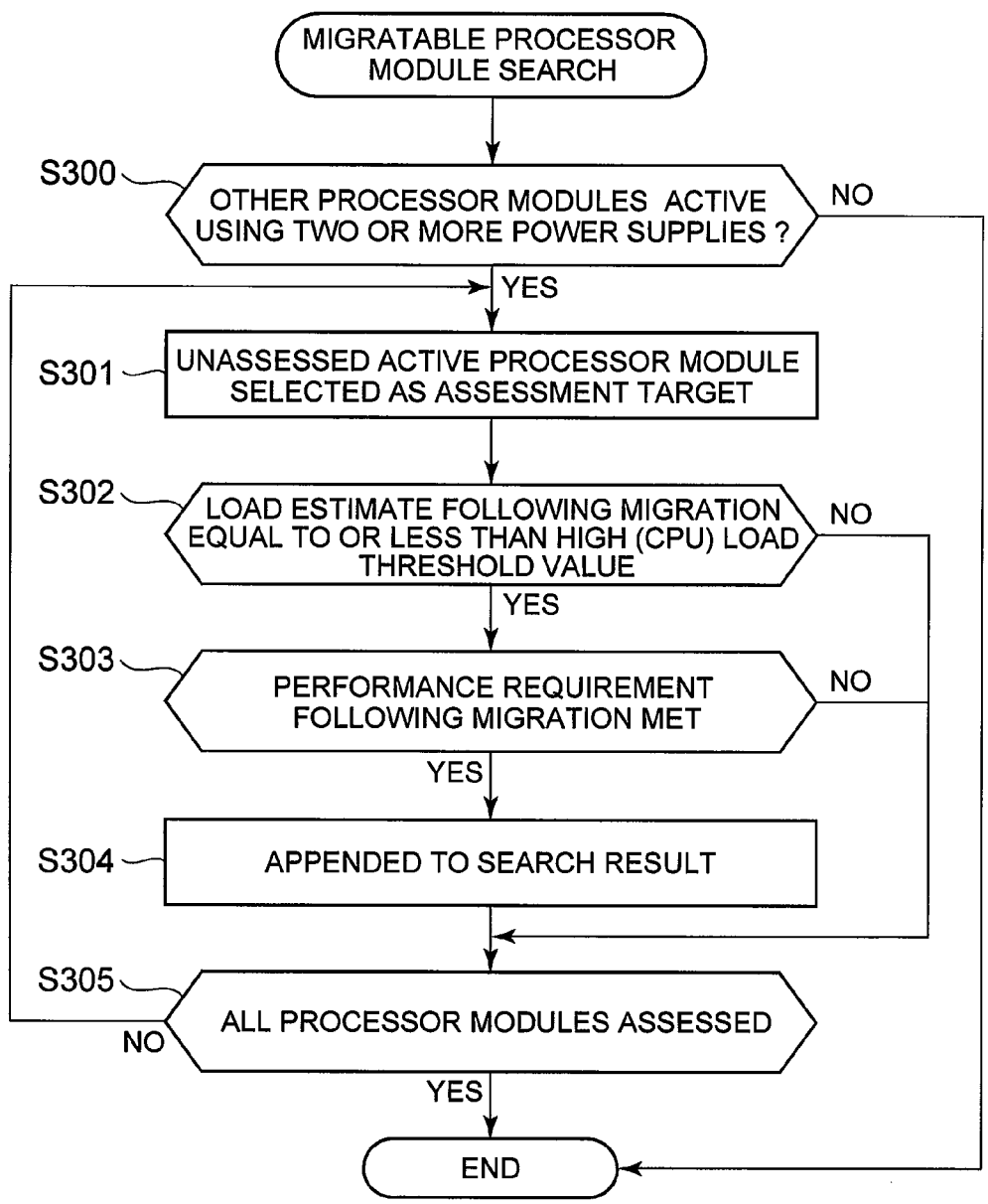
FIG. 18 is a flow chart of migratable processor module search processing of the first embodiment of the present invention.

FIG. 18 is a flow chart of the migration destination processor module search processing.

(S300) The power management program 1133, referring to the processor module state information 1322, judges whether or not two or more processor modules 1100 other than the target processor module 1100 are active using two or more power supplies. The power management program 1133 executes S301 if this is the case, and otherwise ends the processing.

(S301) The power management program 1133 selects one of the other active processor modules 1100 as an assessment target for whether or not migration is possible.

(S302) The power management program 1133, referring to the processor module state information 1322, specifies the capacity performance and load of a self-actuating target processor module 1100 and capacity performance and load of the assessment target processor module 1110. The power management program 1133 calculates a capacity performance ratio of two processor modules 1100 (capacity performance of target processor module/capacity performance of assessment target processor module), and calculates the product of the target processor module 1100 load and the calculated capacity performance ratio noted above (in other words, a load increase estimate of the assessment target processor module 1100). The power management program 1133 then calculates the sum of this load increase estimate and the assessment target processor module 1100 load (in other words, the load estimate following migration). When the load estimate following migration is less than the high load threshold value of the assessment target processor module 1100 (value stored in the entry region 1321*f*), the power management program 1133 executes S303. Otherwise, the power management program 1133 ends the assessment of the current assessment target processor 1110 and executes S305.

(S303) The power management program 1133 calculates the sum of the performance requirement of the target processor module (in other words, the migration destination processor module) 1110 and the performance requirement of the assessment target processor module (in other words, the performance requirement following migration of the assessment target processor module). The power management program 1133 compares the capacity performance and performance requirement following migration of the assessment target processor module 1100. The power management program 1133 executes S304 when the performance requirement following migration is equal to or less than the capacity performance of the assessment target processor module 1100, and otherwise the power management program 1133 ends the appraisal of the current assessment target processor 1110 and executes S305.

(S304) The power management program 1133 appends the assessment target processor module 1100 to the search result (for example, stores the processor module number of the assessment target processor module 1100 to predetermined electronic information temporarily prepared in the memory module 1130).

(S305) When all active processor modules 1100 have been assessed the power management program 1133 end this search processing. Otherwise, the power management program 1133 executes S300.

Figure 19:
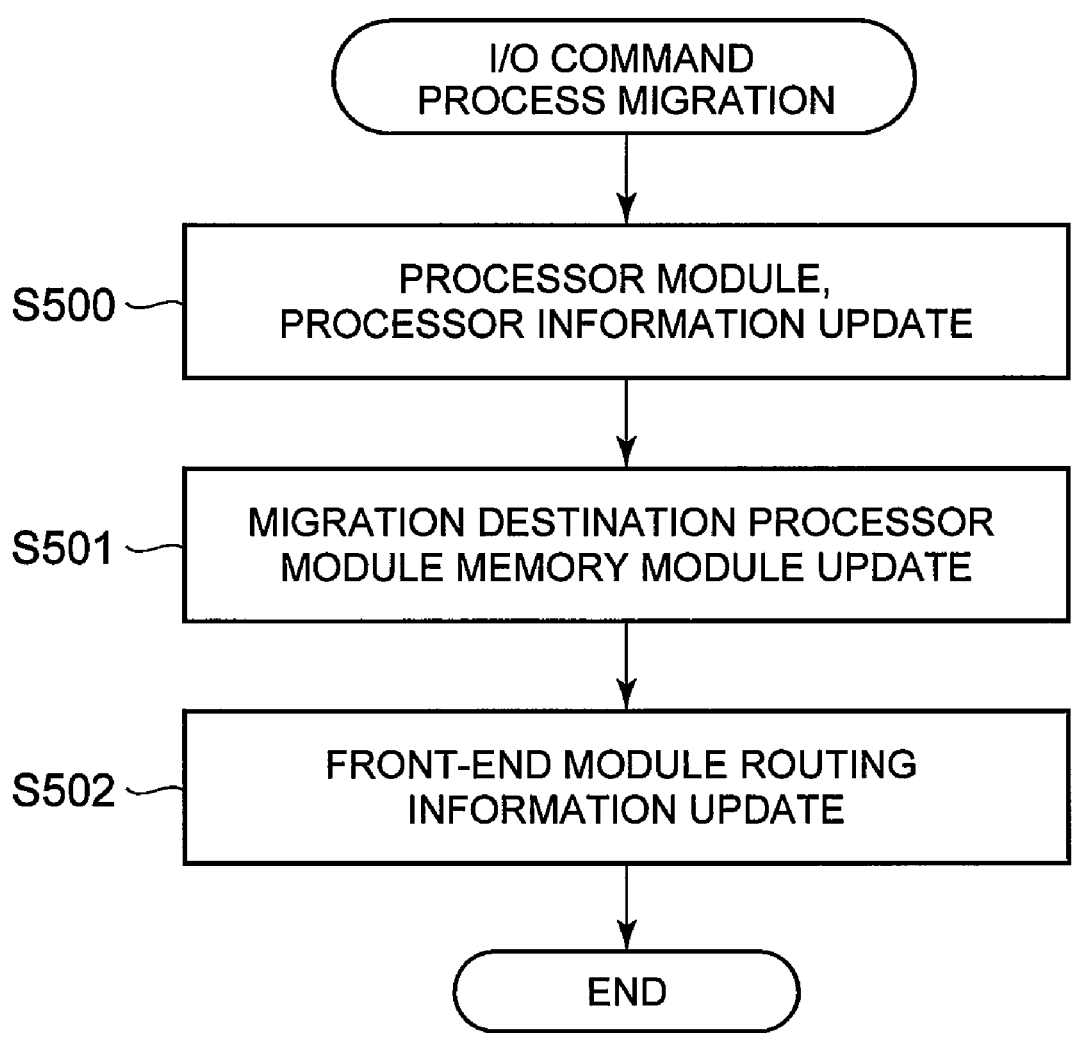
FIG. 19 is a flow chart of I/O command process migration processing of the first embodiment of the present invention.

FIG. 19 is a flow chart of I/O command process migration processing.

(S500) The power management program 1133 reads the LDEV managed by a target processor module 1100 (entry region 1321c) from the processor module configuration information 1321 and appends this to the LDEV managed by a migration destination processor module 1100 (entry region 1321c). At this time, the power management program 1133 updates information stored in the entry region 1322e correspondent with a target processor module 1110 to "sleep". In addition, the power management program 1133 updates information stored in the entry region 1324e correspondent to the processors 1110 existing in the target processor module to "sleep".

(S501) The power management program 1133 sends a memory module update message to the migration processor module 1100 issuing a command to perform memory module update. The memory module update message contains the LDEV number managed by the self-actuating processor module 1100. The power management program 1133 of the migration destination processor module 1100 that has received this messages appends information from the cache table 1327 of the shared memory module 1300 related to the LDEV to be migrated to the cache table copy 1136. The power management program 1133 of the migration destination processor module 1100 similarly updates the LDEV configuration information copy 1135. In addition, the power management program 1133 of the migration destination processor module 1100 appends the LDEV performance requirement (entry region 1325f) to the value of the processor module performance requirement (entry region 1322c). Following completion of these processings, the migration power management program 1133 sends and END message to the migration destination processor module 1100.

(S502) Following receipt of the END message of S501, the power management program 1133 examines the LDEV managed by the self-actuating processor module 1110 of the LDEV configuration information copy 1135. Thereupon, the power management program 1133 sends a routing alteration message to the front-end module 1200 issuing a command for alteration of the I/O command routing. The routing alteration message contains the LUN of the LDEV to be migrated and the number of the migration destination processor module 1100. The FE data transfer program 1232 of the front-end module 1200 designated to perform the routing alteration updates the number of the processor module managing the LUN indicated in the routing alteration message to the number of the migration destination processor module 1110. The FE data transfer program 1232 then sends and END message to the power management program 1133. In addition, the FE data transfer program 1232 transfers an I/O command of a subsequent migration source processor 1110 to a migration destination processor 1110. The power management program 1133, subsequent to receiving the END message, ends the I/O process migration.

Figure 20:
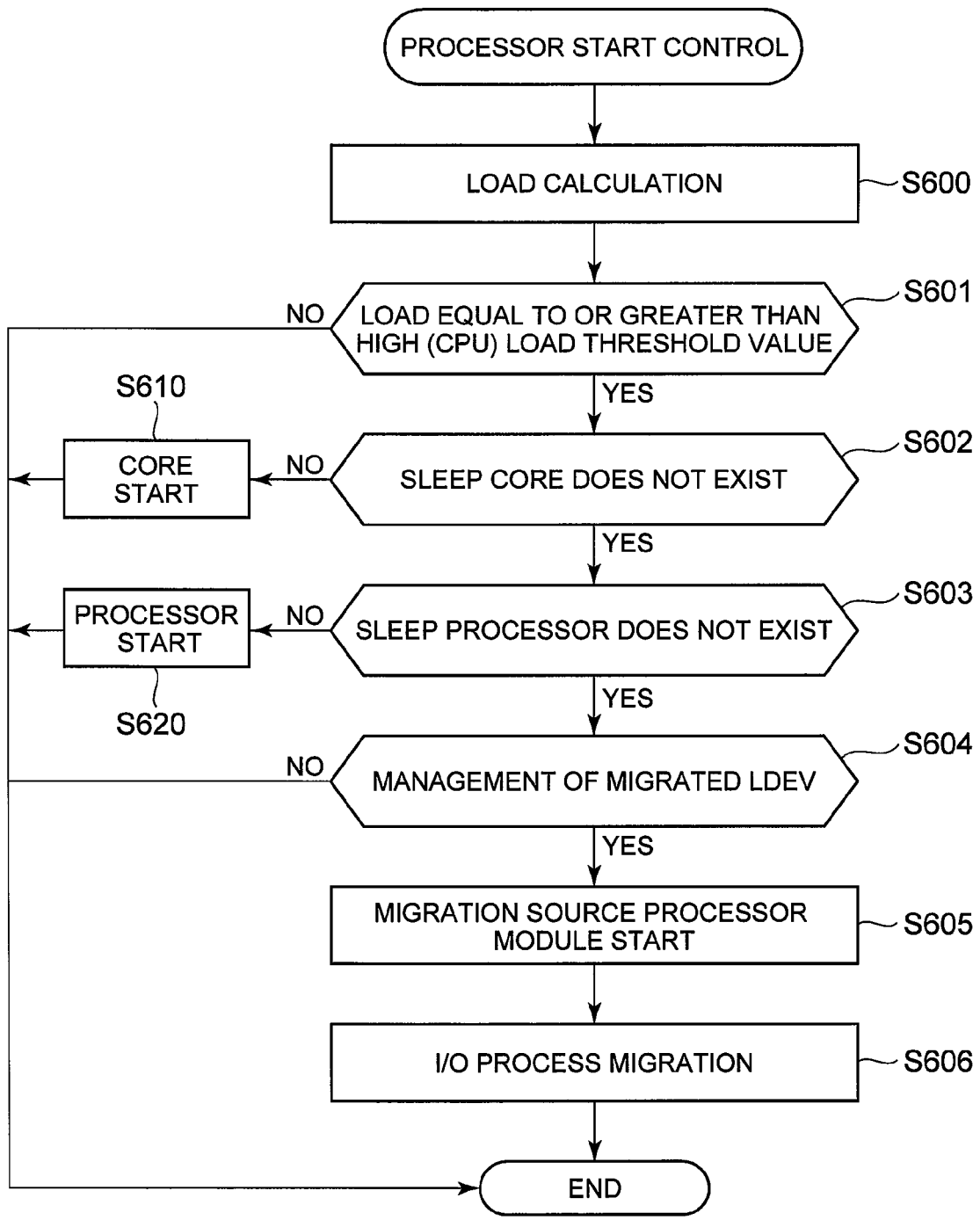
FIG. 20 is a flow chart of processor module high load processor start control processing of the first embodiment of the present invention.

FIG. 20 is a flow chart of a processor start control processing executed when the load on the migration destination processor module is high.

(S600) The power management program 1133 executed by the migration destination processor module of FIG. 19 calculates the load on the processor module 1100 using the method described in S101 of FIG. 16.

(S601) When the load obtained in S600 is equal to or greater than the high (CPU) load threshold value (entry region 1321f) correspondent to the processor module 1100 thereof the power management program 1133 executes S602, and otherwise ends the processor start control.

(S602) The power management program 1133, referring to the processor information 1324, examines whether or not a core sleep processor 1110 exists in the processor module 1100. When no sleeping core exists, the power management program 1133 executes S603, and otherwise executes S610.

(S603) The power management program 1133, referring to the processor information 1324, examines whether or not a sleep processor 1110 exists in this processor module. When no sleeping processor exists, the power management program 1133 executes S604, and otherwise executes S620.

(S604) The power management program 1133 examines, on the basis of the managed LDEV (entry region 1321c) and the initial managed LDEV (entry region 1321d) of the processor module configuration information 1321, whether or not migration from another processor module 1100 to a currently managed LDEV has occurred (that is, it examines whether the managed LDEV and the initial managed LDEV differ). If a migrated LDEV exists, the power management program 1133 executes S605, and otherwise it ends the processor start control.

(S605) The power management program 1133 restarts the migration processor destination module of FIG. 19. The power management program 1133 then updates the information stored in the entry region 1322e correspondent to the migration processor module to "active". In addition, the power management program 1133 updates the information stored in the entry region 1324e correspondent to the processors contained in the migration destination processor module 1100 to "active", and updates the values stored in the entry region 1324d correspondent to these processors to the number of cores that these processors possess.

(S606) The power management program 1133 migrates the I/O command process of the LDEV migrated using the method described with reference to FIG. 19 to the migration source processor module 1100 of FIG. 19.

(S610) The power management program 1133 starts all sleeping cores of an active processor of the migration destination processor module of FIG. 19. Next, the power management program 1133 updates the information stored in the entry region 1324e correspondent to the active processor 1110 comprising these cores 1111 from "core sleep" to "active". In addition, the power management program 1133 updates the information stored in the entry region 1324c correspondent with this active processor 1110 to the number of cores possessed by this processor 1110.

(S620) The power management program 1133 starts a sleep processor 1110 of the migration destination processor module of FIG. 19. Next, the power management program 1133 updates information stored in the entry region 1324e correspondent to this sleep processor 1110 to "active". In addition, the power management program 1133 updates the information stored in the entry region 1324c correspondent to this sleep processor 1110 to the number of cores possessed by this processor 1110.

During these series of processings, the power management program 1133 acquires the control memory module 1320 lock and prohibits access to the control memory module 1320 by another power management program 1133.

Figure 21:
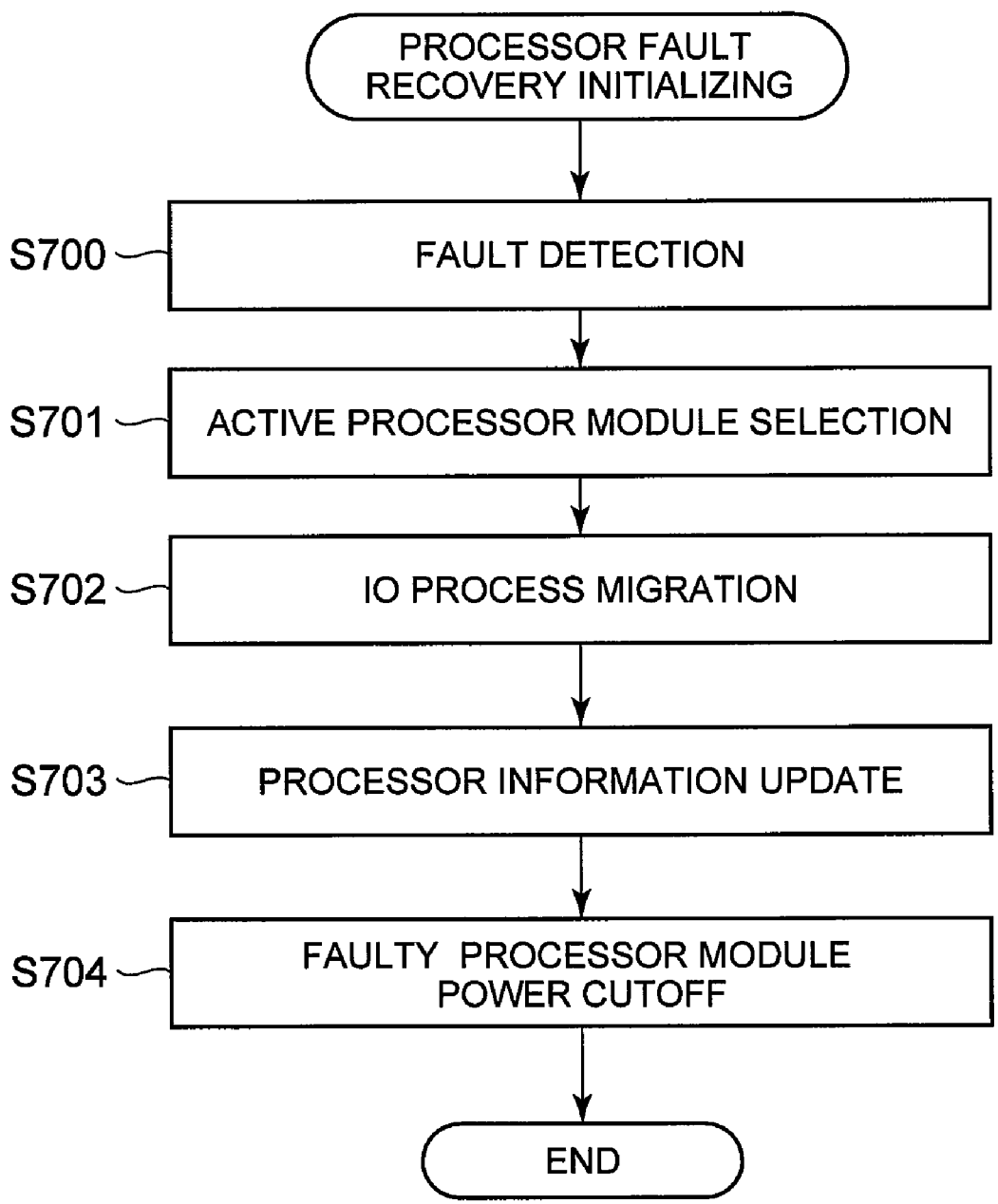
FIG. 21 is a flow chart of fault recovery processing of the first embodiment of the present invention.

FIG. 21 is a flow chart of processor fault recovery processing. (S700) When the fault recovery program 1134 fails to receive a heartbeat signal from another active processor module 1100 in a fixed time period or longer, or when notification of fault generation is provided, the existence of a fault is detected in the processor module 1100 of the notification source thereof or in the heartbeat signal transmission source thereof. This processor module 1100 is hereinafter referred to as a "fault processor module 1100".

(S701) The fault recovery program 1134 selects a migration destination processor module 1100. For example, the fault recovery program 1134 selects the active processor module 1100 of lowest load from the one or more active processor modules 1100.

(S702) The fault recovery program 1134 issues a command to the front-end module 1200 to transfer the I/O command process being executed by the fault processor module 1100 to the migration destination processor module 1100 selected in S701. In response to the command from the fault recovery program 1134, the FE data transfer program 1232 of the front-end module 1100 updates the LUN managed by the fault processor module 1100 to the LUN managed by the migration destination processor module 1100 (in other words, updates the routing information 1231). The FE data transfer program 1232 then initiates an I/O command transfer control in accordance with the updated routing information 1231.

(S703) The fault recovery program 1134 appends the number of the LDEV managed by the fault processor module 1100 to the entry region 1321c correspondent to the migration destination processor module 1100. In addition, the power management program 1133 appends the performance requirement of the LDEV managed by the fault processor module 1100 to the value stored in the entry region 1322c correspondent to the migration destination processor module 1100 and, furthermore, updates the information stored in the entry region 1322e correspondent to the fault processor module 1100 to "fault".

(S704) Finally, the fault recovery program 1134 cuts off the power supply to the fault processor module 1100 (in other words, blocks or puts the fault processor module 1100 to sleep).

A description of a first embodiment of the present invention is given above. While as an example method of power management this embodiment describes the use of a method based on putting a processor module 1100 to sleep, suppression of actuation frequency is also possible.

Second Embodiment

A second embodiment of the present invention will be hereinafter described. The configuration of the computer system of this second embodiment is substantially identical to that of the first embodiment and, accordingly, a description thereof has been omitted.

Figure 22:
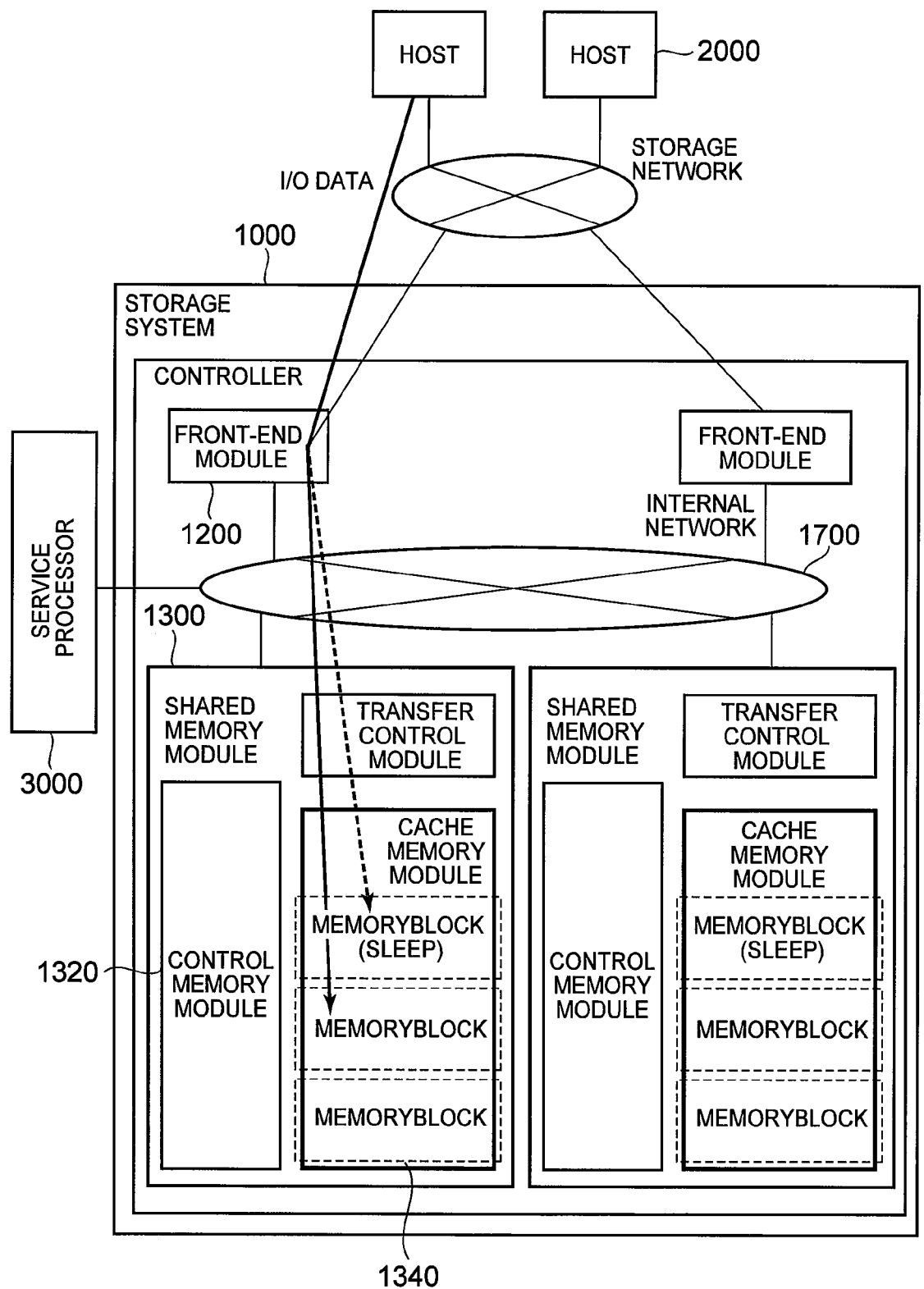
FIG. 22 is a schematic diagram of a second embodiment of the present invention.

FIG. 22 is a diagram showing a schema of the second embodiment.

In the second embodiment, the power consumption of the cache memory module 1340 is reduced. The actuation of the cache memory module 1340 will be described. The storage system 100 increases the speed of the I/O command process from the host 200 by storing I/O data (read/write data accompanying I/O commands from the host 200) in the cache memory module 1340 as cache data 1341. In data writing, the storage system 100 holds the I/O data as cache data 1341 and performs I/O data write to a disk unit 2000 non-synchronously with receipt of I/O commands. In addition, in data reading, the storage system 100 transfers the cache data to the host 200 during a cache hit. The "cache hit" referred to here denotes finding of I/O data associated with an I/O command from the cache memory module 1340.

The storage system 100 achieves increased data read speed by increasing the capacity of the cache memory module 1340 and increasing the cache hit rate. The cache hit rate referred to here denotes the probability that a cache hit will occur during the I/O command process. A large capacity cache memory module 1340 carries with it an inherent concern of increased power consumption.

Thereupon, the storage system 100 of the second embodiment puts a partial region of the cache memory module 1340 to sleep when the number of I/O commands is low and, accordingly, power consumption is reduced.

In the second embodiment, the sleep of the cache memory module 1340 is actualized by the following method.

The processor module 1100 on which the power management is being executed monitors the number of I/O commands per unit capacity of the cache memory module 1340. When the number of I/O commands of the processor module 1100 is equal to or less than a threshold value, a memory block of low access frequency is put to sleep. The memory block referred to here denotes a physically or logically divided unit of the cache memory module 1340 on which a sleep control can be performed.

The processor module 1100, prior to the memory block being put to sleep, destages the unwritten cache data 1341 stored in this memory block to a disk unit 2000. The processing executed by the processor module 1100 which involves destaging of the unwritten cache data 1341 prior to the memory block being put to sleep in order to prevent data loss is an illustrative example. In addition to this, prior to the memory block being put to sleep by the processor module 1100, the unwritten cache data 1341 can be migrated to another memory block (memory block in which no cache data exists or memory block in which cache data that may be overwritten is stored).

The destaging need not be performed when a non-volatile memory such as a flash memory is employed as the cache memory module. In this case, if the cache data of the sleep memory block is to be accessed, the processor module 1100 restarts the memory block and accesses the memory block after this start is completed.

In addition, prior to putting the memory block to sleep, the processor module 1100 confirms that the access performance estimate following sleep will meet the LDEV performance requirement. The access performance referred to here denotes the maximum number of I/O accesses processable per second. The number of I/O accesses denotes the number of accesses of the cache memory module 1341 or a disk unit 2000 and constitutes a sum of the number of cache hits and the number of cache misses. The "cache miss" referred to here denotes the access-target cache data stored in the cache memory module 1340.

In addition, the storage system 100 receives a low access threshold value and a high access threshold value from the service processor 3000. A storage administrator is able to set a trade-off between performance and energy-saving power effect. While in this case a comparison of the low access threshold value and high access threshold value is made with, for example, the number of I/O commands per unit capacity, a comparison with the total number of accesses of the cache memory module 1340 may also be made.

The second embodiment will be hereinafter described in detail.

Figure 23:
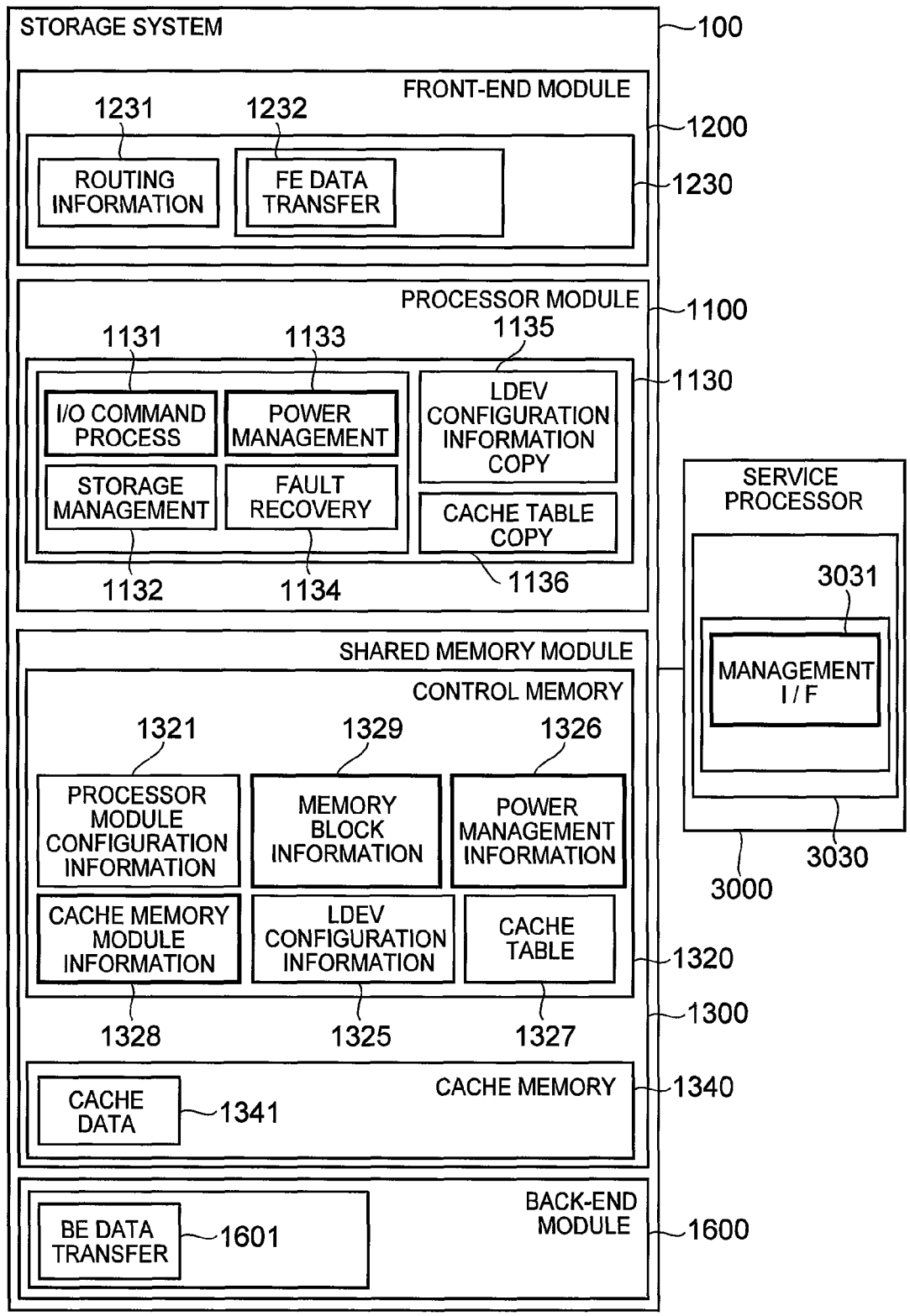
FIG. 23 is a diagram showing programs and various data of the second embodiment of the present invention.

The program and various data of the storage system 100 of the second embodiment are described with reference to FIG. 23. A description of the elements thereof identical to those of the first embodiment has been omitted. The data and programs indicated by the thick line in the diagram denote data and programs not present in the first embodiment or data and programs different to those of the first embodiment.

In addition to the processings of the first embodiment, the I/O command process program 1131 monitors the number of I/O commands and cache hit rate of the cache memory as a whole and writes this regularly in a later-described cache memory module information 1328. In addition, the I/O command process program 1131 monitors the number of cache hits of each memory block and records this regularly in the later-described memory block information 1329.

The power management program 1133 regularly implements a later-described cache memory sleep control. The particulars of the cache memory sleep control will be described later with reference to FIG. 26 and FIG. 27. In addition, when a sleep memory block exists, the power management program 1133 regularly performs a cache memory start control. The particulars of the cache memory start control will be described later with reference to FIG. 28.

The cache memory module information 1328 and memory block information 1329 will be described later with reference to FIG. 24 and FIG. 25.

The management I/F program 3031 displays a management screen on a display 3040. A storage administrator inputs a low access threshold value and a high access threshold value of a later-described cache memory module 1340 by way of the management screen. The management I/F program 3031 sends to a processor module 1100, as a management command, a command containing the management contents (input low access threshold value and high access threshold value).

FIG. 24 shows the configuration of cache memory module information 1328.

The cache memory module information 1328 which is provided as, for example, a table, contains information related to the performance and operational state and setting of the cache memory module 1340. The cache memory module information 1328 comprises an entry region 1328a to an entry region 1328h.

The maximum number of I/O accesses (cache hit performance) processable per unit time (for example, per second) by the storage system 100 during cache hit is stored in the entry region 1328a. The maximum number of I/O accesses (cache miss performance) processable per second by the storage system 100 during cache miss is stored in the entry region 1328b. The cache hit rate is stored in the entry region 1328c. The number of I/O commands received from a host of the most recent 1-second period is stored in the entry region 1328d. The size of the active memory region of the cache memory module 1340 (sum total of size of non-sleep memory blocks, hereinafter active memory size) is stored in the entry region 1328e. The threshold value (low access threshold value) serving as a reference for whether or not the access frequency to the cache memory module 1340 is a low access frequency is stored in the entry region 1328f (as an example method for appraising the access frequency of the cache memory module 1340 the number of I/O commands persecond per megabyte of cache memory module is employed in this embodiment). The threshold value serving as a reference as to whether or not the cache memory module 1340 access frequency is a high access frequency (high access threshold value) is stored in the entry region 1328g. The number of I/O commands (performance requirement) requested for processing per second by the storage system 100 is stored in the entry region 1328h. This performance requirement is the sum total of the performance requirement of all the LDEV existing in the storage system 100.

The cache hit performance (entry region 1328a) and cache miss performance (entry region 1329b) may be set manually by an administrator or storage administrator of the storage system 100, or it may be automatically computed by the processor module 1100 from operation results of device specifications.

FIG. 25 shows the configuration of memory block information 1329.

The memory block information 1329 which is provided as, for example, a table, contains information related to the configuration and operational state of each memory block. The memory block information 1329 comprises an entry region 1329a to entry region 1329e for each memory block.

A memory block identifying number (memory block number) is stored in the entry region 1329a. A memory block head physical address (initial address) of the cache memory module 1340 is stored in the entry region 1329b. The memory block size (region size, the unit thereof being, for example, a megabyte) is stored in the entry region 1329c. The number of cache hits of the memory block per unit time (for example, per second) is stored in the entry region 1329d. Information expressing the memory block state such as, for example, "active", "sleep" and so on is stored in the entry region 1329e.

Next, the various processings executed by the second embodiment will be described with reference to FIG. 26 to FIG. 28.

Figure 26:
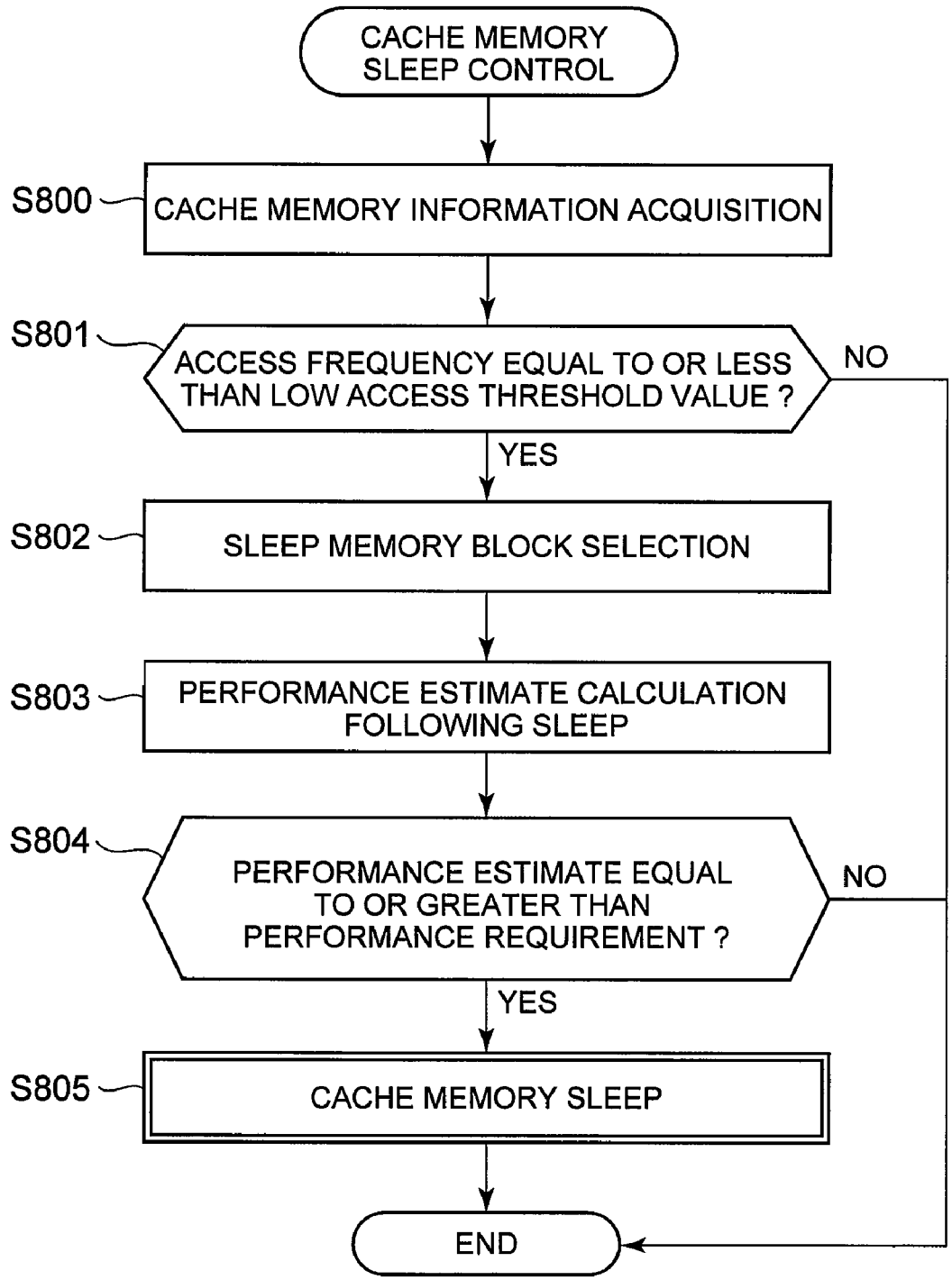
FIG. 26 is a flow chart of cache memory sleep control processing of the second embodiment of the present invention.

FIG. 26 is a flow chart of cache memory sleep control processing.

(S800) The power management program 1133 reads cache memory module information 1328, memory block information 1329 and power management information 1326 from the control memory module 1320.

(S801) The power management program 1133 calculates the per megabyte access frequency of the cache memory module 1340 from a quotient of the number of I/O commands (entry region 1328d) and active memory size (entry region 1328e) of the cache memory module information 1328. The power management program 1133 compares the calculated access frequency with a low access threshold value (entry region 1328f) executing S802 when the access frequency is equal to or less than the low access threshold value, and otherwise ending the cache memory sleep control.

(S802) The power management program 1133, referring to the memory block information 1329, selects the active memory block of lowest cache hit number (value stored in the entry region 1329d) as a sleep target.

(S803) The power management program 1133 calculates a performance estimate following migration based on cache hit performance a (entry region 1328a), cache miss performance b (entry region 1328b), cache hit rate c (entry region 1328c), active memory size d (entry region 1328e) and sleep target memory block size e (entry region 1329c) of the cache memory module 1340. The power management program 1133 calculates a cache hit rate estimate x and a performance estimate y following sleep based on the following (Equation 1) and (Equation 2):

$$x = c \times (d-e)/d \quad \text{(Equation 1)}$$

$$y = a \times x + b \times (1-x) \quad \text{(Equation 2)}.$$

(S804) The power management program 1133 compares the performance estimate y obtained in S803 with the performance requirement (entry region 1328h) executing S805 when the performance estimate y is equal to or greater than the performance requirement, and otherwise ending the cache sleep control.

(S805) The power management program 1133 executes cache memory sleep. As a result, the sleep target memory block selected in S802 is put to sleep. The particulars of cache memory sleep will be described later with reference to FIG. 27.

Figure 27:
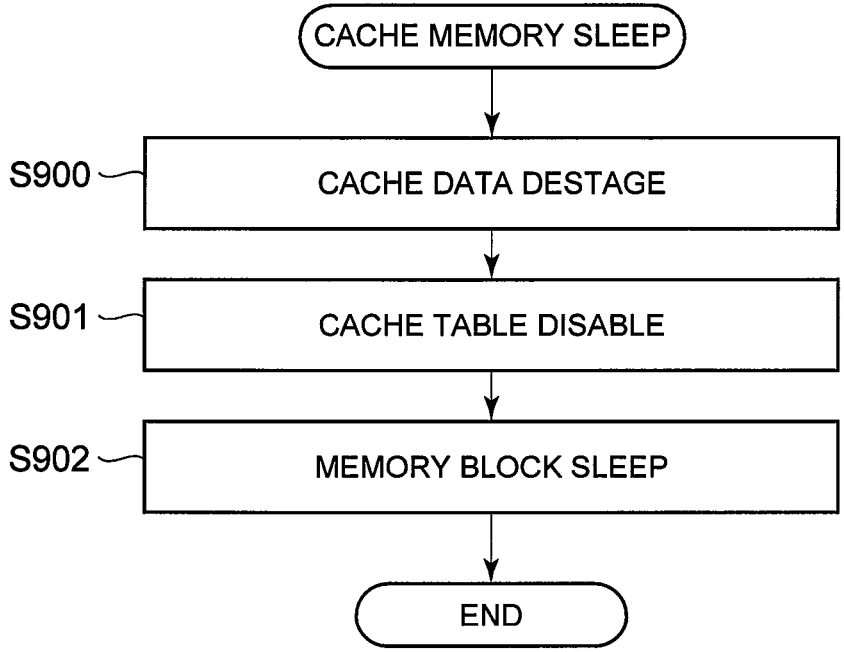
FIG. 27 is a flow chart of cache memory sleep processing of the second embodiment of the present invention.

FIG. 27 is a flow chart of cache memory sleep processing.

(S900) The power management program 1133, referring to the cache table 1327, examines whether or not the data block stored in the sleep target memory block is an unwritten data block in a disk unit 2000. If this data block is unwritten, the power management program 1133 destages this unwritten data block to the disk unit 2000.

(S901) The power management program 1133 deletes information related to the sleep target memory block from the cache table 1327. In addition, the power management program 1133 notifies all processor modules 1100 of the sleep target memory block identifying number. In the processor module 1100 receiving this notification, the power management program 1133 deletes information related to sleep target memory block (memory block corresponding to the notified identifying number) from the cache table copy 1134.

(S902) The power management program 1133 updates the information stored in the entry region 1329e of the memory block information 1329 to "sleep". In addition, the power management program 1133 updates the active memory size (entry region 1328e) of the cache memory module 1328 to a value arrived at by deduction of the region size of the sleep target memory block (entry region 1329c). Finally, the power management program 1133 puts the sleep target memory block to sleep.

Figure 28:
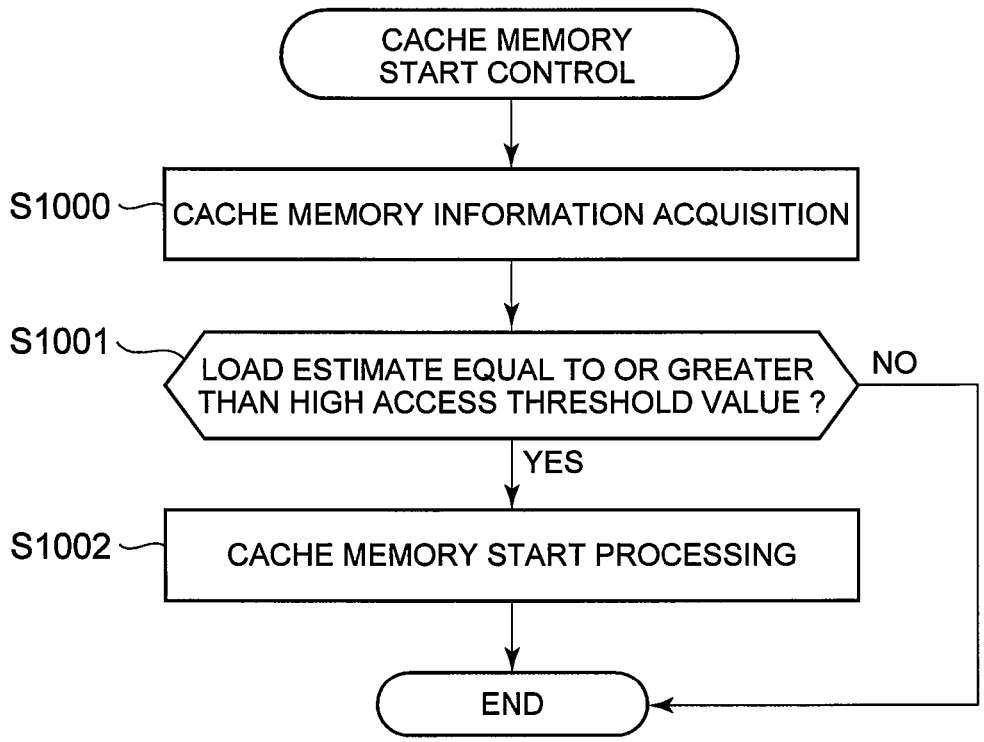
FIG. 28 is a flow chart of cache memory start control processing of the second embodiment of the present invention.

FIG. 28 is a flow chart of cache memory start control processing.

(S1000) The power management program 1133 acquires cache memory module 1340 information in the same way as described by S800.

(S1001) The power management program 1133 calculates the cache memory module 1340 access frequency in the same way as described by S801. The power management program 1133 compares the calculated access frequency with a high access threshold value (entry region 1328g) executing S1002 when the access frequency is equal to or greater than the high access threshold value, and otherwise ending the cache memory start control.

(S1002) The power management program 1133 selects a single sleep memory block and restarts this sleep memory block. The power management program 1133 updates the information of the memory block information 1329 stored in the entry region 1329e correspondent to the memory block to be started to "active". In addition, the power management program 1133 updates the active memory size (entry region 1328e) of the cache memory module information 1328 to a value obtained by addition of the region size of the memory block to be started up (entry region 1329c).

A description of a second embodiment of the present invention is given above. Instead of, or in addition to the memory blocks being put to sleep as described in this embodiment, the cache memory module can be put to sleep in regions logically divided into LDEV.

Third Embodiment

A third embodiment of the present invention will be hereinafter described. The configuration of the computer system of this third embodiment is substantially identical to that of the first embodiment and, accordingly, a description thereof has been omitted.

Figure 29:
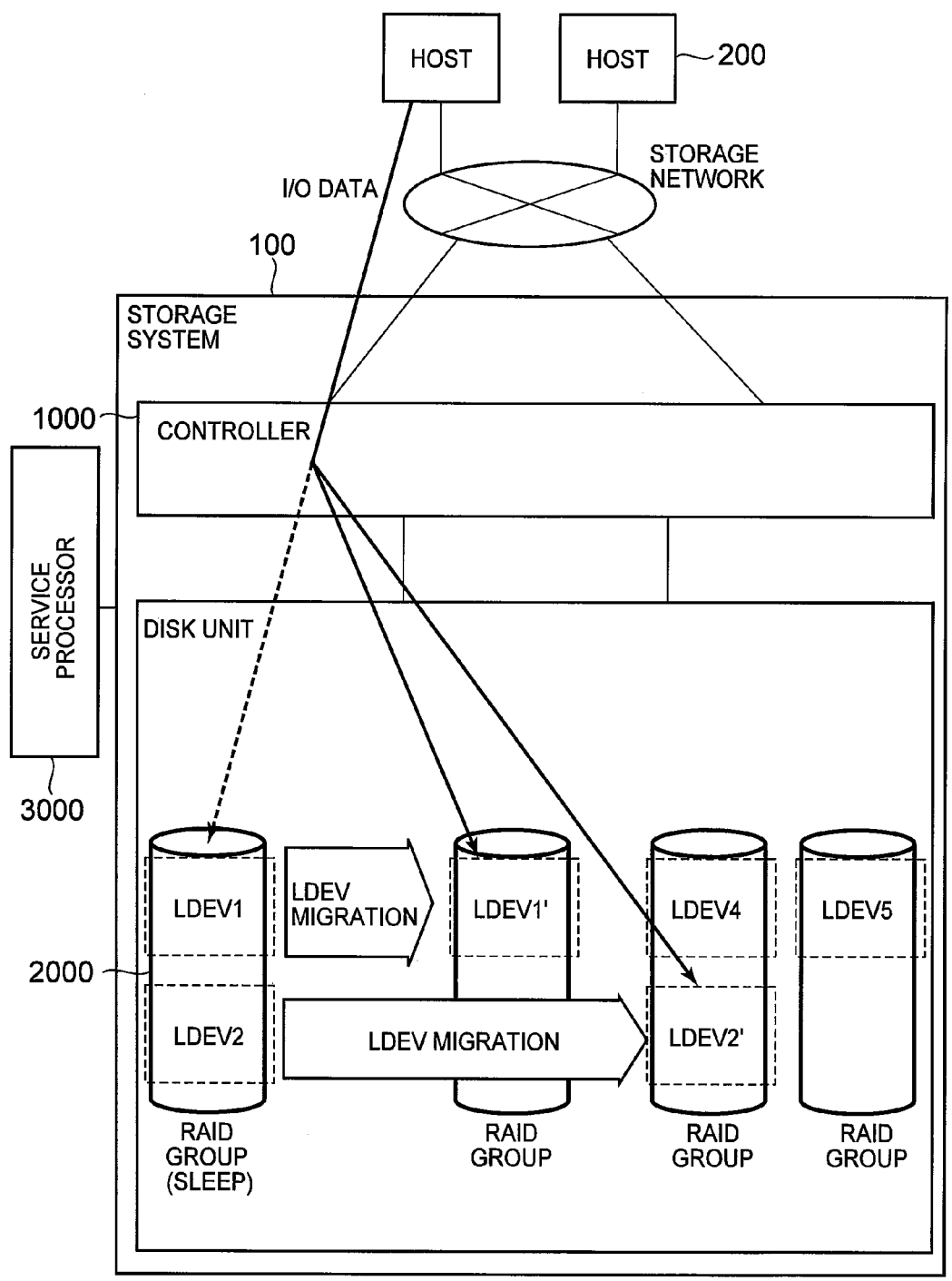
FIG. 29 is a schematic diagram of a third embodiment of the present invention.

FIG. 29 is a diagram showing a schema of the third embodiment.

In this third embodiment the power consumption of the disk unit 2000 is reduced.

In the disk unit 2000, one or more LDEV are prepared for each RAID Group configured from a plurality of disks 2010 and I/O data is stored in the LDEV. The storage system 100 requires a large number of disks 2010 to store a large volume of data and, accordingly, the power consumption thereof is a problem. Accordingly, in the third embodiment, the storage system 100 puts the disks 2010 from which a RAID Group is configured and for which there is no fixed time data input/output to sleep and, accordingly, power consumption is reduced. For ease of understanding of the description provided hereinafter, the sleep of the disks 2010 from which a RAID Group is configured is expressed simply as RAID Group sleep.

Consideration of RAID Group power consumption reduction raises the problems of, for example, (Problem 1) and (Problem 2) noted below.

(Problem 1) When an LDEV from which a sleep RAID Group is formed exists, all disks from which the sleep RAID Group is configured must be restarted on each occasion of data input/output to this LDEV in accordance with an I/O command from a host 200. Accordingly, a slowing of response speed to the host 200 occurs. In addition, when a RAID Group is started on each occasion of data input/output to an LDEV, depending on the frequency of this data input/output, there is an inherent concern that more power than when the RAID Group is in constant operation will be consumed.

(Problem 2) A storage administrator cannot implement a trade-off between performance and power amount reduction.

The following means (Means 1) and (Means 2) are administered in this third embodiment to resolve the problems (Problem 1) and (Problem 2) described above.

(Means 1) A controller 1000, subsequent to migrating all LDEV contained in this RAID Group to another RAID Group when a low load RAID Group is found, puts the low load RAID Group to sleep. The LDEV migration referred to here denotes the physical storage location of the LDEV being transparently altered by a host. The method of RAID Group load appraisal involves a comparison between the number of disk accesses processable per unit time (for example, per second) and the number of current disk accesses. In addition, the number of disk accesses refers to the number of accesses to an actual storage unit and does not include access to cache data. As a result, the sleep RAID group is not accessed by the host 200, and the need for restart thereof becomes unnecessary.

There are inherent concerns accompanying LDEV migration of high load on the migration destination RAID Group and LDEV performance requirement not being met. Accordingly, as further means, prior to LDEV migration, the controller 1000 judges whether or not the load on the migration destination RAID Group will be a high load and whether or not, when LDEV migration is performed, the LDEV performance requirement will be met, and executes LDEV migration if the load will not be high and the LDEV performance requirement will be met.

In addition, the LDEV migration involves a load being placed on the controller 1000 and the disks 2010. Furthermore, it is not necessarily the case that all RAID Groups have the same reliability and performance. Accordingly, in contradiction to the aims of a storage administrator, there is a concern that a temporary rise in load on the storage system 100 and change in the LDEV reliability and performance will occur as a result of LDEV migration. Accordingly, as further means, the storage system 100 provides the storage administrator with a warning message whereupon, by selection of whether or not RAID Group sleep should be enabled, LDEV migration that contradicts the aims of the storage administrator is prevented.

(Means 2) The storage system 100 receives a RAID Group for which sleep is to be enabled, a low access threshold value, and a high access threshold value from the service processor 3000. The storage administrator is able to set a trade-off between performance and amount of power reduction.

The third embodiment will be hereinafter described in detail.

Figure 30:
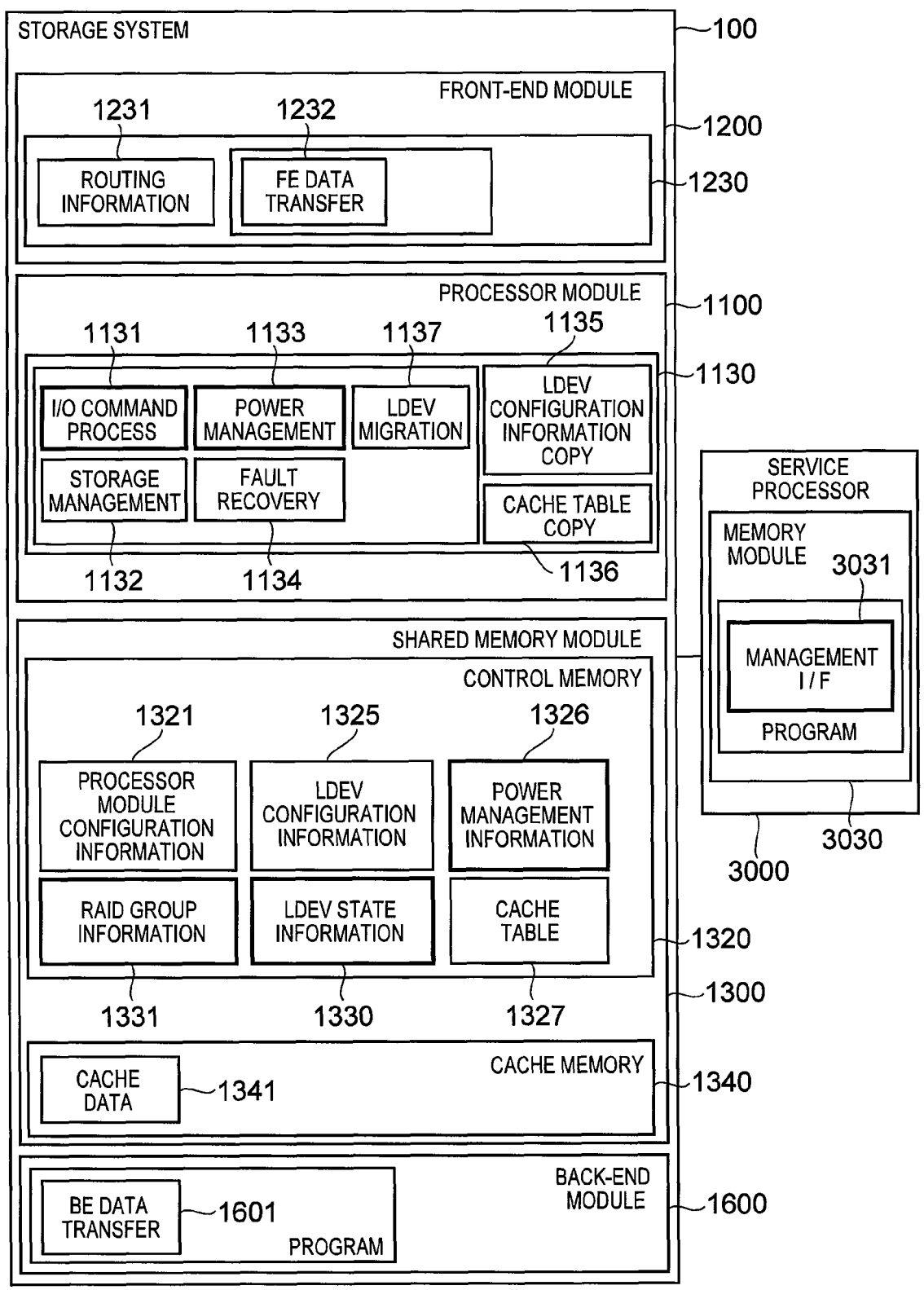
FIG. 30 is a diagram showing programs and various data of the third embodiment of the present invention.

The programs and various data of the storage system 100 in the third embodiment will be described with reference to FIG. 30. A description of the elements identical to those of the first embodiment has been omitted. The data and programs indicated by the thick line of the diagram denote data and programs that exist in the first embodiment or data and programs that differ from the first embodiment.

LDEV migration processing is performed as a result of a processor 1110 executing an LDEV migration program 1137 stored in a memory module 1130. The LDEV migration processing can be actualized using, for example, integrated circuit-based hardware.

In addition to the processings described in the first embodiment, the I/O command process program 1131 writes the number of I/O commands of each LDEV of the most recent 1-second period in a later-described LDEV state information 1330. In addition, the I/O command process program 1131 regularly (or irregularly) examines the number of disk accesses and free capacity of the RAID Groups, and updates the later-described RAID Group information 1331.

The power management program 1133 regularly (or irregularly) executes a disk sleep control. The particulars of the disk sleep control will be described later with reference to FIG. 34 and FIG. 35. In addition, the power management program 1133, when a sleep RAID Group exists, regularly (or irregularly) executes a disk start control. The particulars of the disk start control will be described later with reference to FIG. 36.

The LDEV migration program 1137 migrates a designated LDEV to a designated RAID Group. The LDEV migration program 1137, prior to migrating the LDEV, secures a region of a capacity the same as the LDEV to be migrated to the migration destination RAID Group. Next, the LDEV migration program 1137 copies the LDEV data to be migrated to the secured region. The LDEV migration program 1137 then updates each of the values of the migration LDEV RAID Group number (1325b) and initial address (1325c) of the LDEV configuration information 1325 and updates the migration destination RAID Group number and initial address of the secured region. After this, the LDEV migration program 1137 updates the LDEV configuration information 1325 stored in the shared memory module 1300. At this time, the LDEV migration program 1137 issues a command to all processor modules 1100 to update the LDEV configuration information copy 1135. Finally, the LDEV migration program 1137 erases the data stored in the migration destination LDEV.

The LDEV state information 1330, RAID Group information 1331 and power management information 1326 of the control memory module 1320 will be described with reference to FIG. 31 to FIG. 33.

In addition to the processings of the first embodiment, the management I/F program 3031 displays on a display 3040 a management screen into which the RAID Group for which sleep is to be enabled, warning settings, and a low load threshold value and high load threshold value for each RAID Group are input. In addition, the management I/F program 3031 notifies the processor module 1100 of, as a management command, a command containing the various information input by way of this management screen.

Next, the configuration of various information will be described with reference to FIG. 31 to FIG. 33.

FIG. 31 is a diagram showing the configuration of LDEV state information 1330.

The LDEV state information 1330 which is provided as, for example, a table, contains information related to LDEV operational state. The LDEV state information 1330 comprises, for each LDEV, entry regions 1330a and 1330b. The LDEV identifying number (LDEV number) is stored in the entry region 1330a. The number of I/O commands to an LDEV in the most recent 1-second period is stored in the entry region 1330b.

FIG. 32 is a diagram showing the configuration of RAID Group information 1331.

The RAID Group information 1331 which is provided as, for example, a table, contains information related to the performance, configuration and operational state of a RAID Group. The RAID Group information 1331 comprises, for each RAID Group, an entry region 1331a to entry region 1331j.

A RAID Group identifying number (RAID Group number) is stored in the entry region 1331a. The number of disk accesses processable by a RAID Group per second (RAID Group capacity performance) is stored in the entry region 1331b. The number of disk accesses requested by a RAID Group per second, (RAID Group performance requirement) is stored in the entry region 1331c. The RAID Group performance requirement is a value arrived at by multiplying a predetermined coefficient with the sum total of the performance requirement of one or more LDEV of the RAID Group. The coefficient is generally determined on the basis of, for example, cache miss rate. The LDEV identifying number of a RAID Group is stored in the entry region 1331d. The identifying number of an LDEV initially formed in a RAID Group is stored in the entry region 1331e. The number of disk accesses per second (RAID Group current performance) is stored in the entry region 1331f. The size of a currently non-used storage region (free capacity) is stored in the entry region 1331g. The threshold value (low load threshold value) serving as a reference as to whether or not RAID Group load is a low load is stored in the entry region 1331h. The threshold value (high load threshold value) serving as a reference as to whether or not RAID Group load is a high load is stored in the entry region 1331i. Information indicating the RAID Group state such as, for example "active" or "sleep" is stored in the entry region 1331j.

RAID Group capacity performance may be set manually by a maintenance personal or storage administrator of the storage system 100, or it may be set automatically on the basis of operation results or device specifications.

FIG. 33 is a diagram showing the configuration of the power management information 1326 of the third embodiment.

The power management information 1326 contains information related to power management. The power management information 1326 comprises an entry region 1326b and an entry region 1326c. A sleep enable RAID Group (RAID Group in which sleep is to be enabled) identifying number is stored in the entry region 1326b. Information expressing whether or not notification is to be provided to a storage administrator prior to a RAID Group being put to sleep is stored in the entry region 1326c.

The various processings performed in this third embodiment will be hereinafter described with reference to FIG. 34 to FIG. 36.

Figure 34:
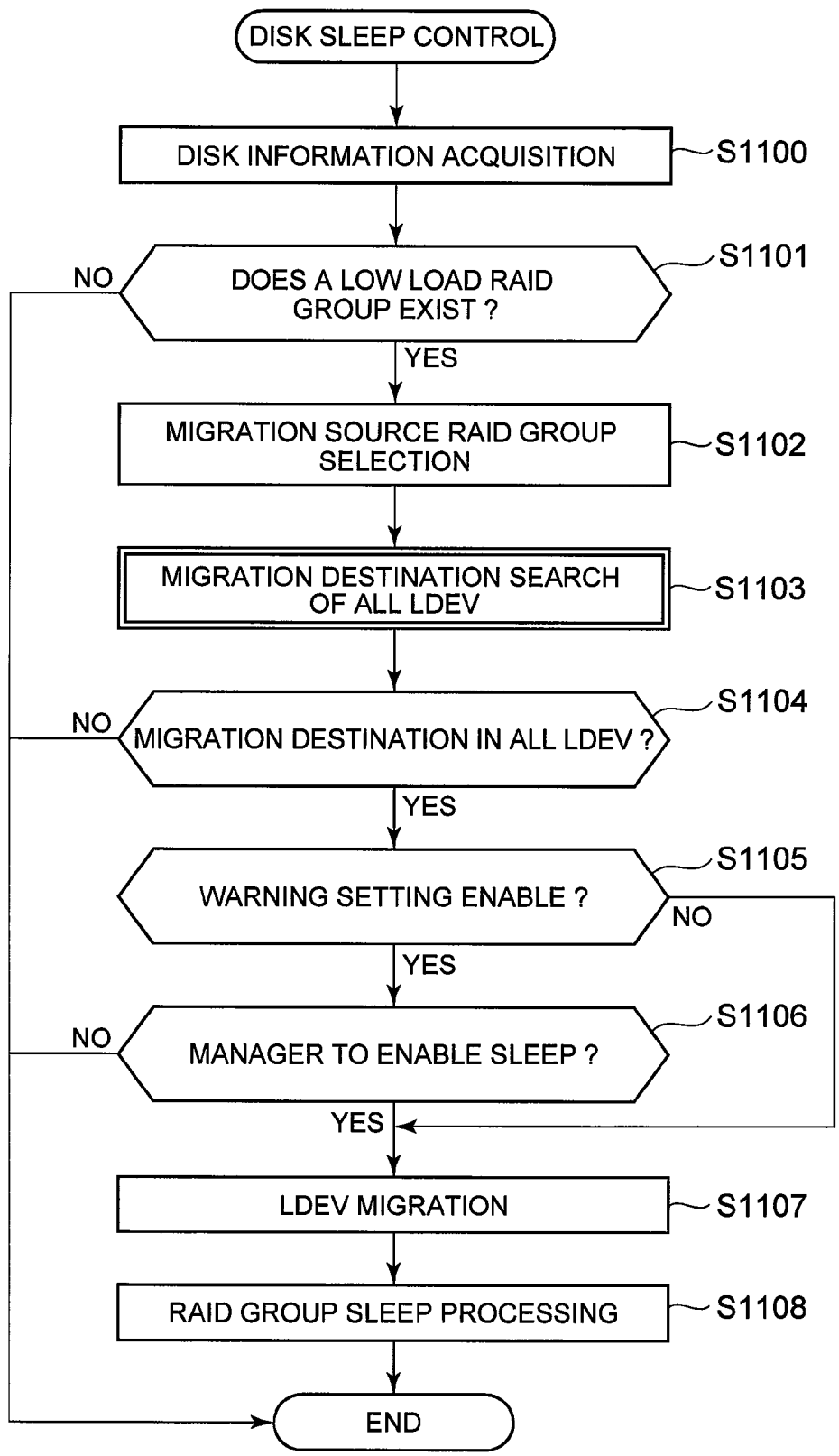
FIG. 34 is a flow chart of disk sleep control processing of the third embodiment of the present invention.

FIG. 34 is a flow chart of disk sleep control processing.

(S1100) The power management program 1133 reads LDEV configuration information 1325, LDEV state information 1330, RAID Group information 1331 and power management information 1326 from the control memory module 1320.

(S1101) The power management program 1133, referring to the power management information 1326, specifies one or more sleep enable RAID Group, specifies the RAID Group performance (entry region 1331b) and the RAID Group current performance (entry region 1331f) of a sleep enable RAID Group, and calculates the load on a sleep enable RAID Group. The load is determined on the basis of, for example, a ratio of RAID Group current performance to RAID Group capacity performance (for example, RAID Group current performance as a percentage of RAID Group capacity performance). The power management program 1133 compares the load on a sleep enable RAID Group with the low load threshold value (entry region 1331h) executing S1102 when there is at least one sleep enable RAID Group of load equal to or less than the low load threshold value, and otherwise ending the disk sleep control.

(S1102) The power management program 1133 selects one of the RAID Groups judged in S1101 as being of low load (sleep enable RAID Group of load equal to or less than the low load threshold value) as a RAID Group candidate to be put to sleep (sleep RAID Group candidate).

(S1103) The power management program 1133 referring to the RAID Group information 1331, specifies the LDEV existing in the sleep RAID Group candidate selected in S1102. The power management program 1133 searches the RAID Group for the LDEV of the specified LDEV that will serve as a migration destination. The particulars of the LDEV migration destination search will be described later with reference to FIG. 35.

(S1104) Based on the result of S1103, the power management program 1133 executes S1105 when a migration destination exists in all LDEV, and otherwise ends the disk sleep control.

(S1105) The power management program 1133 executes S1106 when a warning setting of the power management information 1326 (entry region 1326c) is enabled, and otherwise executes S1107.

(S1106) The power management program 1133 sends to the service processor 3000 a warning message containing an identifying number of the RAID Group to be put to sleep and an identifying number of the RAID Groups in which there are LDEV migration destinations. Upon receipt of this warning message, the management I/F program 3031 of the service processor 3000 displays the warning message in a display 3040 and asks the storage administrator if sleep is to be enabled. The storage administrator confirms the contents of the aforementioned warning message noted and inputs whether or not the RAID Group sleep is to be enabled. The power management program 1133 executes S1107 when sleep is enabled by the storage administrator, and otherwise ends the disk sleep control.

(S1107) The power management program 1133 migrates all LDEV of the sleep RAID Group candidates (migration source RAID Groups) selected in S1102 to respective migration destination RAID Groups found by the search processing of S1103. The actual migration processing is executed by the LDEV migration program 1137. Following completion of the LDEV migration, the LDEV migration program 1137 provides notification to the power management program 1133 of LDEV migration completion.

(S1108) Upon receipt of this notification (in other words, following migration completion of all migration target LDEV), the power management program 1133 accesses the RAID Group information 1331 and, for each migration source RAID Group and migration destination RAID Group, updates the RAID Group performance requirement (entry region 1331b), LDEV identifying number (entry region 1331d), free capacity (entry region 1331f) and RAID Group state (entry region 1331j).

Figure 35:
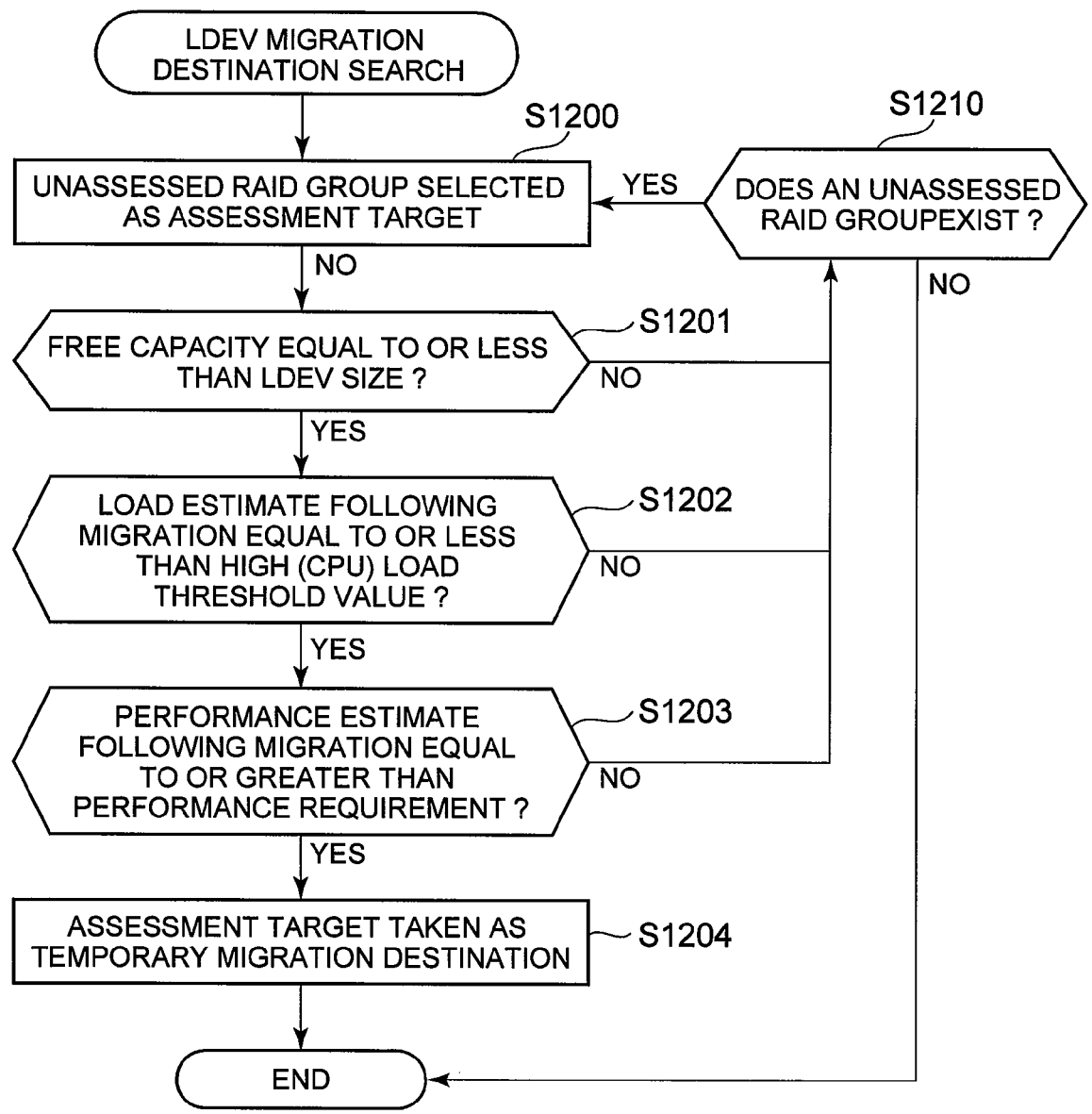
FIG. 35 is a flow chart of LDEV migration destination search processing of the third embodiment of the present invention.

FIG. 35 is a flow chart of the LDEV migration destination search processing.

(S1200) The power management program 1133 selects a RAID Group as an assessment target for LDEV migration destination. The power management program 1133 selects the RAID Groups on which an assessment has not yet been carried out as an assessment target in order of low load RAID Group as calculated by S1100.

(S1201) The power management program 1133, referring to the LDEV configuration information 1325 and RAID Group information 1331, specifies and compares the LDEV region size (1325d) and assessment target RAID Group free capacity (1331g). The power management program 1133 executes S1202 when the LDEV region size is equal to or less than the free capacity of the assessment target RAID Group, and otherwise executes S1210.

(S1202) The power management program 1133, referring to the LDEV state information 1330 and RAID Group information 1331, calculates a load estimate following migration based on a sum of the number of I/O commands of the LDEV being migrated (entry region 1330b) and the number of disk accesses of the assessment target RAID Group (entry region 133f). When the RAID Group serving as the assessment target constitutes a temporary migration destination for another LDEV, the number of I/O commands of this LDEV (entry region 1330b) is also added to the estimate of number of accesses following migration. Next, the power management program 1133, referring to the RAID Group information 1331, calculates a ratio of assessment target RAID Group capacity performance (entry region 1331b) and estimated number of disk accesses following migration (for example, a percentage of the estimate of the number of disk accesses following migration to the capacity performance thereof), in other words, a load estimate. The power management program 1133 compares the load estimate with the high load threshold value and executes S1203 when the load estimate is equal to or higher than the high load threshold value, and otherwise executes S1210.

(S1203) The power management program 1133, referring to the LDEV configuration information 1325 and RAID Group information 1331, determines a performance requirement estimate following migration based on a sum of the performance requirement of the assessment target RAID Group (entry region 1331d) and performance requirement of the LDEV to be migrated (1325*f*). When the RAID Group serving as the assessment target constitutes a temporary migration destination for another LDEV, the performance requirement of this other LDEV (entry region 1330*b*) is also added to the performance requirement estimate following migration. The power management program 1133, referring to the RAID Group information 1331, executes S1204 when the performance requirement estimate is less than the RAID Group capacity performance (1331*b*), and otherwise executes S1210.

(S1204) The power management program 1133, taking the assessment target RAID Group as a temporary migration destination, ends the LDEV migration destination search.

(S1210) The power management program 1133 executes S1200 when a non-assessed RAID Group exists, and otherwise ends the LDEV migration destination search.

Figure 36:
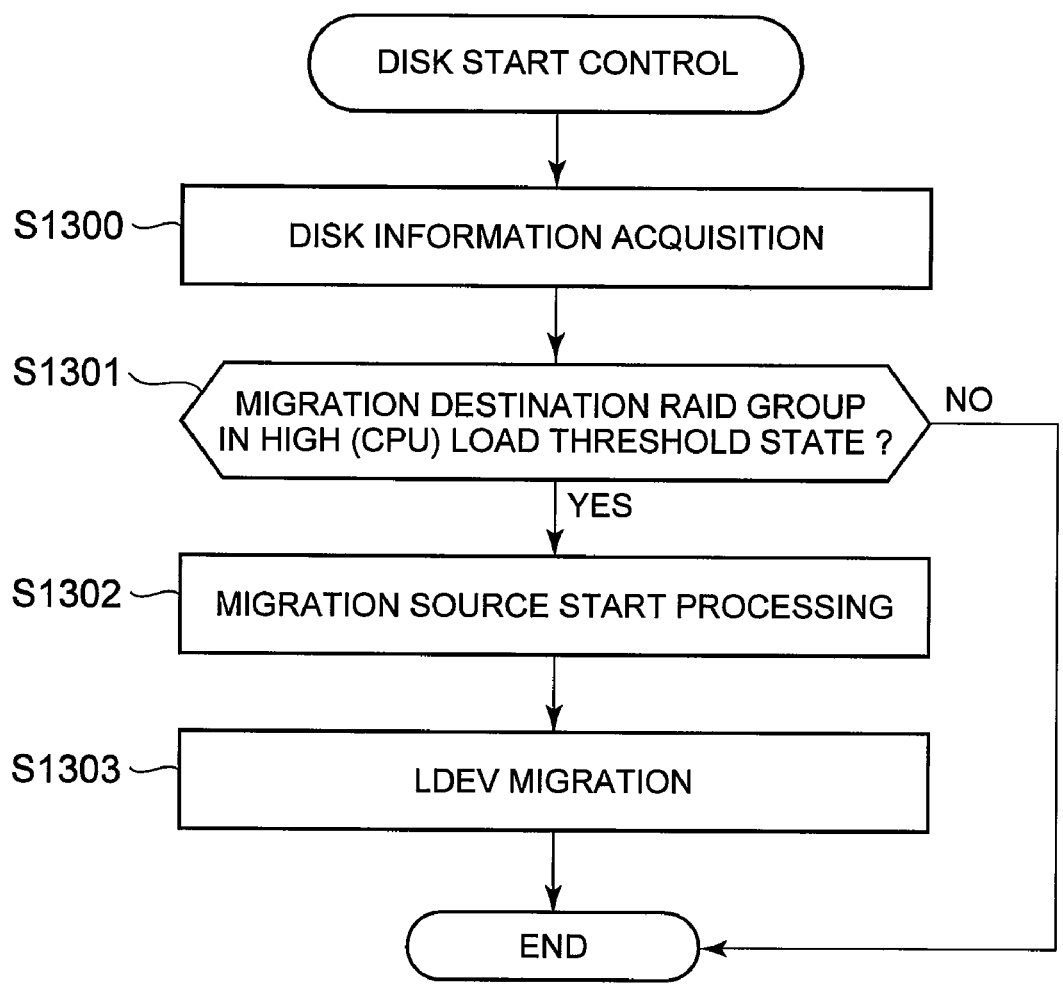
FIG. 36 is a flow chart of disk start control processing of the third embodiment of the present invention.

FIG. 36 is a flow chart of disk start control processing.

(S1300) The power management program 1133, similarly to S1100, reads information related to RAID Groups from the control memory module 1320.

(S1301) The power management program 1133, similarly to the method of S1101, calculates the load estimate of the RAID Group of which an LDEV is being migrated. The power management program 1133 ends the disk start control when the load estimate of all migration destination RAID Groups is equal to or less than the high load threshold value (entry region 1331*g*), and otherwise executes S1302.

(S1302) The power management program 1133 restarts the LDEV migration source RAID Group. Next, the power management program 1133 updates the information of the RAID Group information 1331 correspondent to the restarted RAID Group recorded in the entry region 1331*j* to "active". If the LDEV migration source RAID Group has been already started, the power management program 1133 is not executed.

(S1303) The power management program 1133, using the same method as S1106, migrates an LDEV to a source RAID Group.

A description of a third embodiment of the present invention is given above. Control of reliability and performance can be added to the LDEV migration destination RAID Group search processing.

Fourth Embodiment

Figure 37:
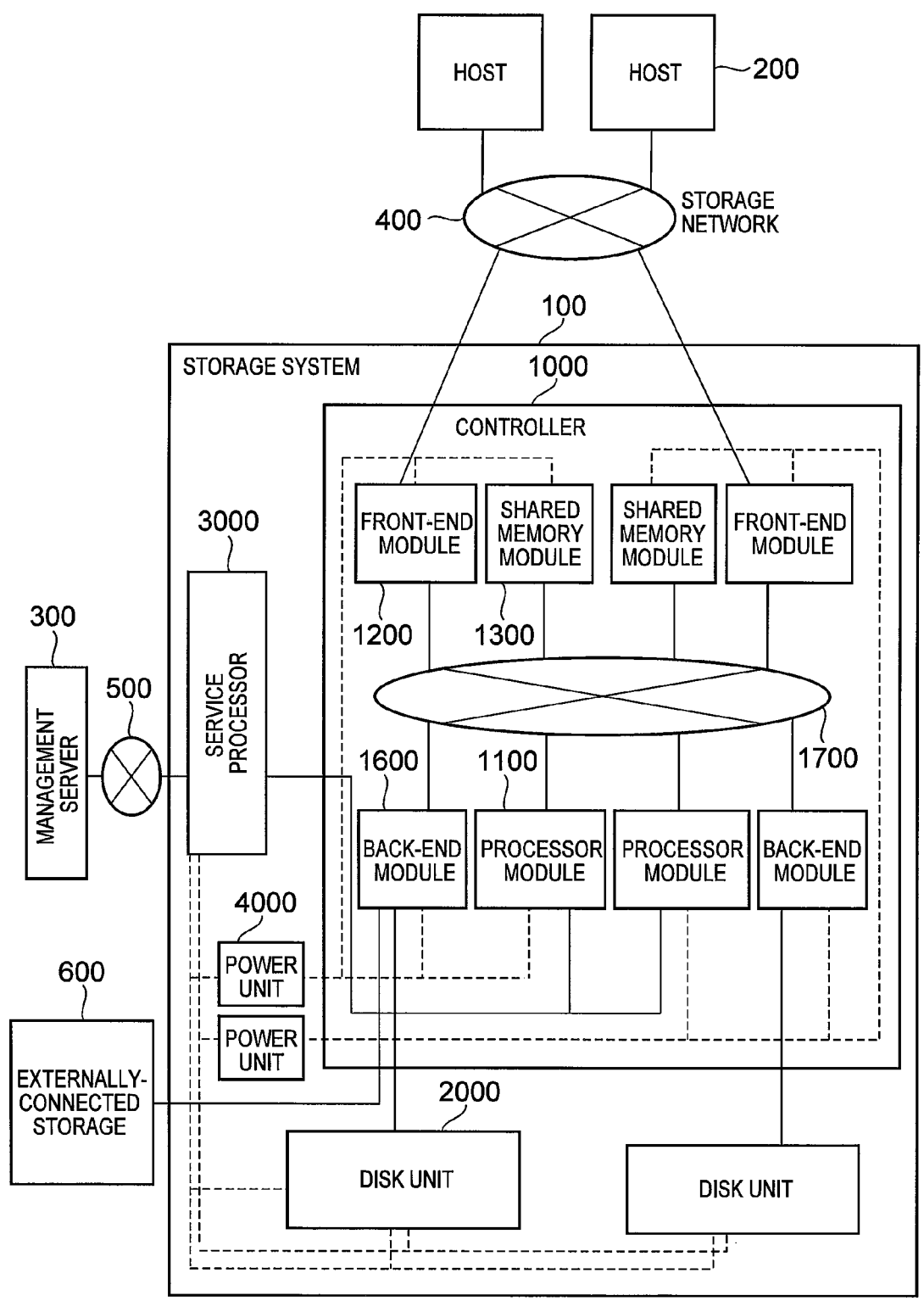
FIG. 37 is a configuration diagram of a computer system pertaining to a fourth embodiment of the present invention.

The configuration of a computer system pertaining to a fourth embodiment of the present invention will be described with reference to FIG. 37.

In this fourth embodiment, an externally-connected storage system 600 is connected to the storage system 100. The remaining configuration is substantially identical to the first embodiment and, accordingly, a description thereof has been omitted.

The externally-connected storage system 600 is connected to an internal back-end module 1600 of the storage system 100 employing Fiber Channel or FCP. The back-end module 1600 performs data transfer between the storage system 100 and the externally-connected storage system 600 in accordance with a command from the processor module 1100. The externally-connected storage system 600 comprises a function for implementing sleep or restart in response to an externally-received sleep command or start command.

Figure 38:
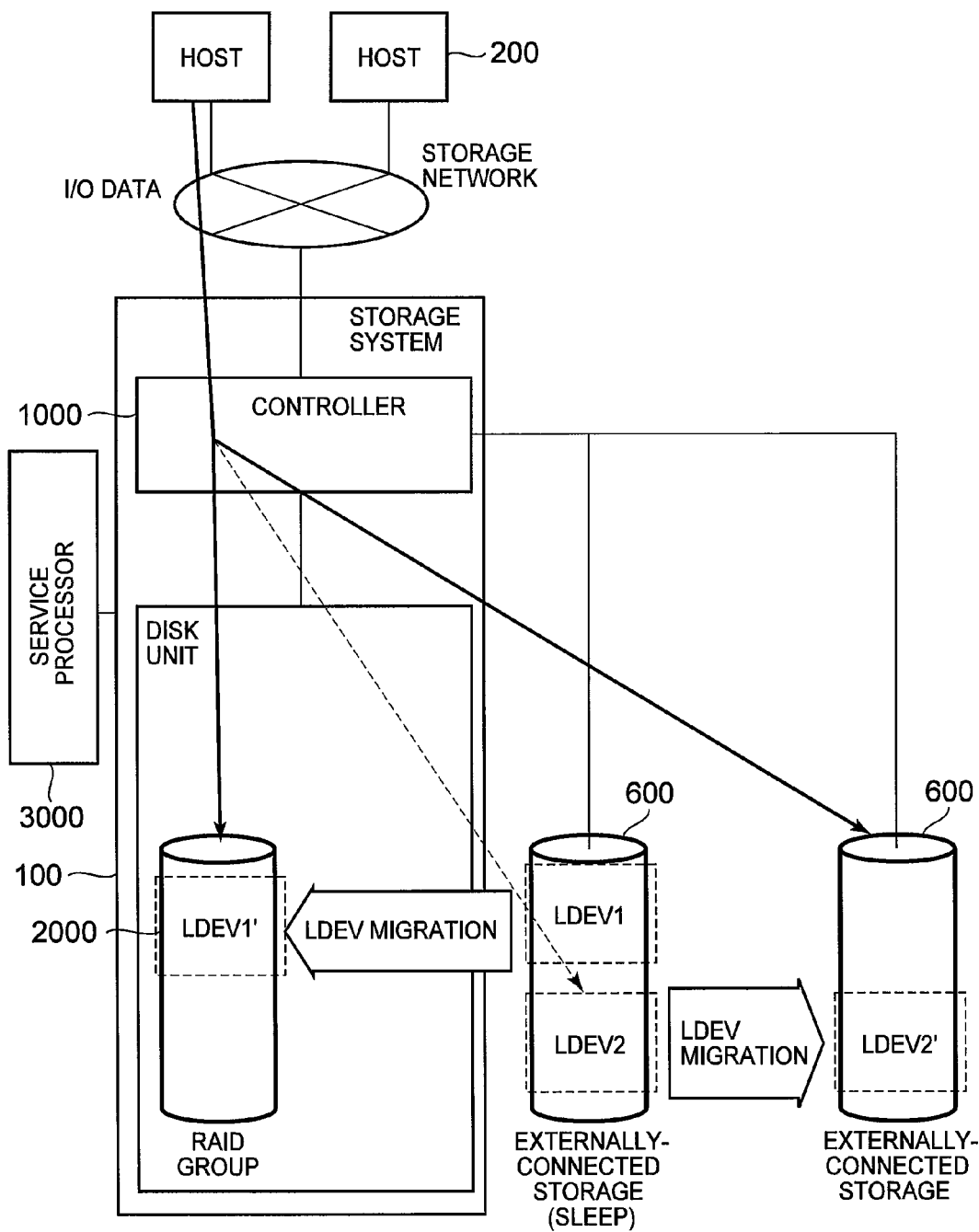
FIG. 38 is a schematic diagram of the fourth embodiment of the present invention.

FIG. 38 is a diagram showing a schema of the fourth embodiment.

In this fourth embodiment, the power consumption of the externally-connected storage system 600 is reduced.

The externally-connected storage system 600 will be described. Similarly to the storage system 100, the externally-connected storage system 600 constitutes a storage system that itself comprises a function for providing LDEV to the host 200. The storage system 100 implements a virtual provision of the LDEV of the externally-connected storage system 600 to the host 200 as its own LDEV. When an I/O command is received at the LDEV of the externally-connected storage system 600, the storage system 100 performs a virtual control of the externally-connected storage system 600 as a RAID Group of the virtual storage system 100.

A plurality of externally-connected storage systems 600 are connected to the storage system 100, a simplification of the management thereof being able to be achieved by centralized management. A problem inherent to this kind of system is the power consumption of the externally-connected storage system 600. In this fourth embodiment, power consumption is reduced by an externally-connected storage of low access frequency of the externally-connected storage systems 600 being put to sleep.

In putting an externally-connected storage system 600 to sleep, a substantial occurrence of the problem associated with putting a RAID Group to sleep of the third embodiment can be considered. A resolution to this problem is achieved in the fourth embodiment by the following means.

That is, the storage system 100 migrates an LDEV of an externally-connected storage system 600 to another externally-connected storage system 600 or to a RAID Group of its own disk unit 2000, and then puts the externally-connected storage system 600 to sleep. The storage system 100 performs a power management similar to that of the third embodiment based on managing the externally-connected storage system 600 as a virtual RAID Group.

The main points of difference to the third embodiment will be hereinafter described.

The programs and various data of the storage system 100 of the fourth embodiment will be hereinafter described with reference to FIG. 30.

The I/O command process program 1131, when an I/O command is received at the LDEV provided by an externally-connected storage system 600, issues a command to the back-end module 1600 to perform the necessary data transfer.

The power management program 1133 deals with its own RAID Group and the externally-connected storage system 600 in the same way as described for the RAID Group of the third embodiment.

LDEV migration program 1137 regards the externally-connected storage system 600 as a virtual RAID Group and executes LDEV migration between externally-connected storage systems 600 and between an externally-connected storage and the storage system 100. The LDEV migration program 1137 calls the function of the externally-connected storage system 600 necessary for LDEV migration such as LDEV definition and LDEV deletion using a method designated by an externally-connected storage system 600.

In addition to LDEV configuration information 1325, RAID Group information 1331, LDEV state information 1330, and information related to RAID Groups, information related to the externally-connected storage systems 600 are stored in the shared memory module 1300.

In addition to the processings of the third embodiment, the management I/F program 3031 displays in the display 3040 a management screen related to a RAID Groups of an externally-connected storage for which sleep is to be enabled. The management I/F program 3031 notifies a processor module 1100 of, as a management command, a command containing information input by way of the management screen.

A description of a fourth embodiment of the present invention is given above. Instead of the whole of the externally-connected storage system 600 being put to sleep, a part thereof such as, for example, a controller or a cache memory or disk may be put to sleep.

Fifth Embodiment

Figure 39:
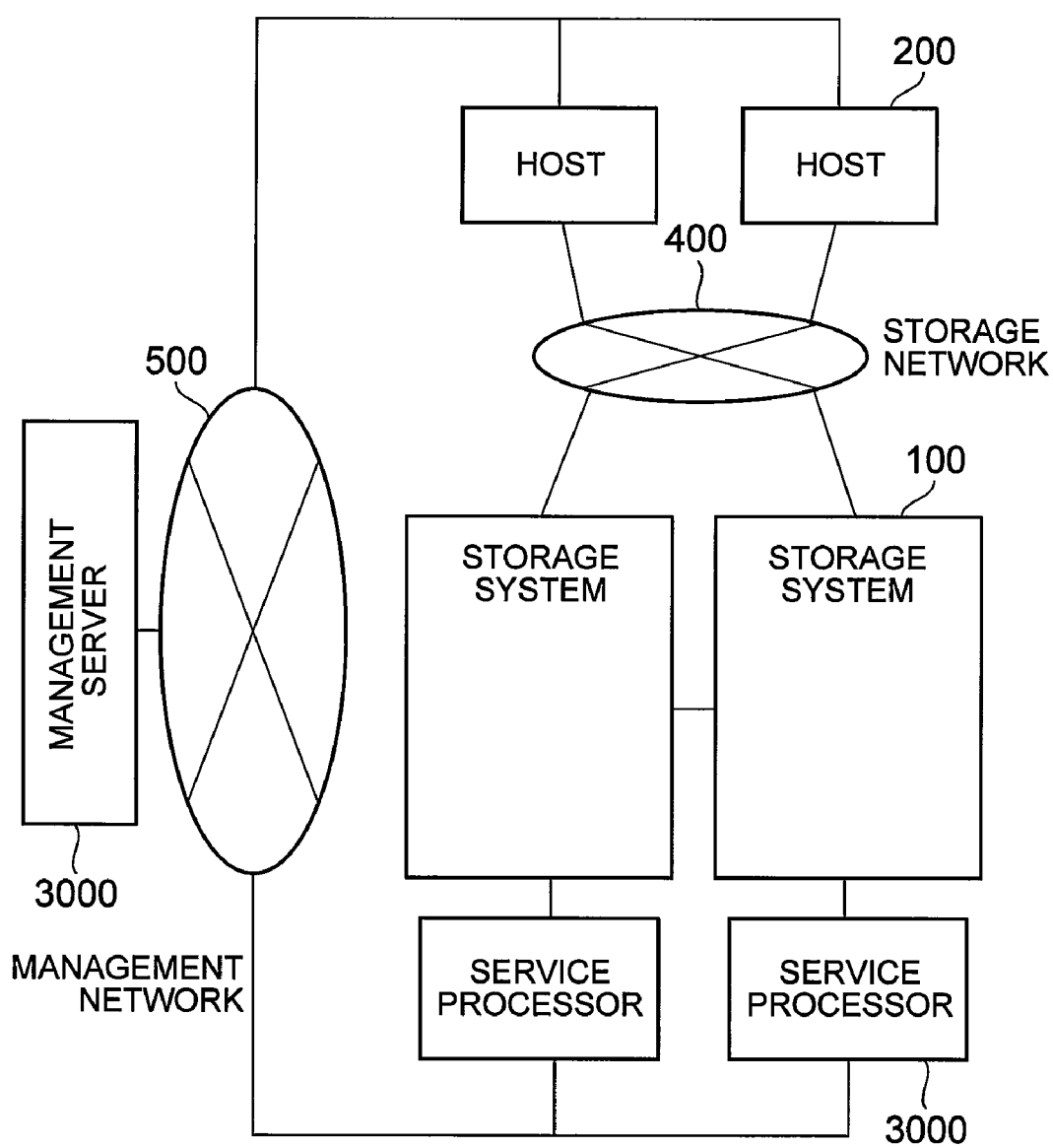
FIG. 39 is configuration diagram of a computer system pertaining to a fifth embodiment of the present invention.

The configuration of a computer system related to a fifth embodiment of the present invention will be hereinafter described with reference to FIG. 39.

In this fifth embodiment, the computer system is configured from two or more storage systems 100, one or more hosts 200, one or more management servers 300, a storage network 400 and a management network 500. The system configuration between the storage system 100, host 200 and management server is substantially identical to that of the first embodiment. Management information and data is transferred between the plurality of storage systems 100 to which controllers 1000 are connected employing FC and FCP. The interface and protocol between the controllers 1000 are illustrative examples, and other interfaces and protocols may be employed. The access path from the host 200 to the LDEV storage system 100 is controlled by a path control module 2001 actuated by the host 200. The access path refers to the network path used when the host accesses an LDEV. While the use of hardware as the path control module 2001 is cited in this example, a computer program executed by a processor may also be employed.

The storage system 100 of this fifth embodiment comprises a function by which it is itself put to sleep by a controller 1000, and a function for its external restart. The hardware configuration thereof is substantially identical to that of the first embodiment and, accordingly, a description thereof has been omitted.

Figure 40:
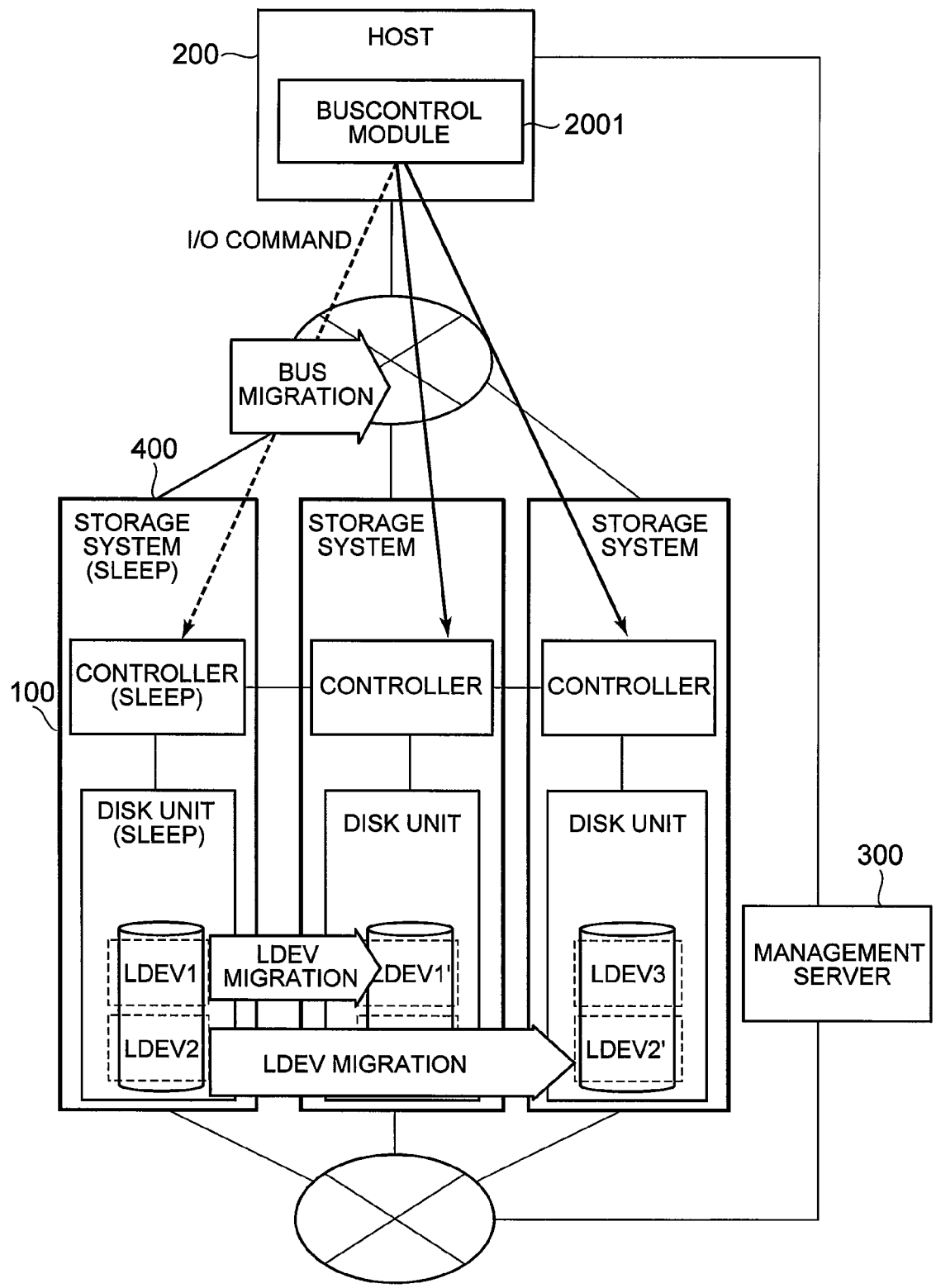
FIG. 40 is a schematic diagram of a fifth embodiment of the present invention.

Next, a schema of the fifth embodiment will be hereinafter described with reference to FIG. 40.

In the fifth embodiment, power consumption of the storage system 100 is reduced.

A greater amount of data storage and greater number of I/O command processings are afforded by increasing the number of storage systems 100. However, a problem inherent to increasing the number of storage systems carries is a problem of increased power consumption.

In the fifth embodiment, a storage system 100 migrates an LDEV of a RAID Group of low access to another storage system 100 and puts the RAID Group to sleep. In this case, the occurrence of the following problems can be considered.

First, when an LDEV is migrated to another storage system 100, the network path from the host 200 for accessing the LDEV in question changes. Accordingly, the LDEV migrated by the host 200 can no longer be accessed.

In addition, similarly to the other embodiments, there are concerns that the load on the migration destination storage system 100 will be high and the LDEV performance requirement will not be met. Furthermore, the storage administrator is unable to set a trade-off between performance and energy-saving power effect.

The following means are administered in the fifth embodiment to resolve these problems.

A storage system 100 migrates an LDEV of the low load RAID Group to another storage system and puts the RAID Group to sleep. These processings are actualized as a result of the RAID Groups of all storage systems being virtually regarded by a storage system 100 as its own RAID Groups, and implementation of the processings identical to those of the third embodiment. The storage system 100 executing the power management program puts a storage system 100 to sleep when all RAID Groups are sleep.

When an LDEV is migrated to another storage system 100, the storage system 100 executing the power management program provides notification to the host 200 of a migration LDEV identifying number and a migration destination storage system identifier. The host 200 comprises a path control module 2001, and the path control module 2001 receives these notifications. The path control module 2001 updates the access path to the migrated LDEV in response to these notifications. The path control module 2001 which, for example, constitutes a computer program executed by a processor of the host 200, refers to and updates the information for each LDEV expressing the LDEV number and identifier of the storage system in which the LDEV exists (information stored in a storage resource such as the memory of the host 200). When an I/O command in which the LDEV is designated is received from an application program executed by a processor of the host 200, the path control module 2001 specifies the storage system in which this LDEV exists, or sends an I/O command in which the LDEV is designated to a specified storage system.

The main points of difference with the third embodiment will be hereinafter described, a description of the points of commonality therebetween being either omitted or abridged.

The programs and various data of the storage system 100 of the fifth embodiment will be described with reference to FIG. 30.

The power management program 1133 regularly (or irregularly) issues a command to another storage system 100 to send LDEV configuration information 1331, LDEV state information 1330 and RAID Group information 1331. The power management program 1133 of the other storage system receiving this command transfers this information from the control memory module 1320 to the storage system 100 on which the power management processing is being executed. The power management program 1133 of the storage system 100 to which this transfer of information has been received combines this information and stores it as LDEV configuration information 1331, LDEV state information 1330 and RAID Group information 1331 of the control memory module 1320.

The LDEV migration program 1137, in association with another storage system 100, actualizes the LDEV migration between the storage systems 100.

Information related to all storage systems 100 is contained in the LDEV configuration information 1325, LDEV state information 1330 and RAID Group information 1331 stored in the control memory module 1320 of the storage system 100 on which the power management is being performed.

In addition to the processings of the third embodiment, the management I/F program 3031 displays in a display 3040 a management screen of the RAID Groups for which sleep is to be enabled of another storage system 100. In addition, the management I/F program 3031 notifies the processor module 1100 of, as a management command, a command containing information input by way of the management screen.

Next, the various processings different to those of the third embodiment will be described with reference to FIG. 34 to FIG. 36.

The power management program 1133 deals with RAID Groups of another storage system 100 in which the RAID Groups are virtually recognized in the same way as the RAID Groups of the third embodiment.

(S1108 of FIG. 34) When all RAID Groups of a storage system 100 are sleeping, the power management program 1133 issues a sleep command to the controller 1000 of this storage system 100.

(S1302 of FIG. 36) When the migration destination storage system 100 is sleeping, the power management program 1133 issues a command to restart the storage system 100 of this migration destination.

(S1106 of FIG. 34 and S1303 of FIG. 36) The LDEV migration program 1137 having received a command from the power management program 1133 notifies the host 200 of the LDEV number and the storage system identifier of the migration destination storage system 100. The path control module 2001 of the host 200, subsequent to the receipt of these notifications, performs an access path switch over to the migrating LDEV. For example, when an I/O command in which a particular LDEV is designated is received from an application program (not shown in the diagram) on the host 200, the path control module 2001 sends the I/O command in which this LDEV is designated to the migration destination storage system 100 indicated by the received storage system identifier.

A fifth embodiment of the present invention is described above. Replacing the storage system 100, the power management may be executed by a management server 300.

Sixth Embodiment

Two or more of the first to fifth embodiments may be combined. Accordingly, for example, both cache sleep and disk sleep can be performed in a single storage system. However, in this case, a timing control between the cache sleep and disk sleep must be executed. More specifically, for example, when disk sleep control processing is generated during cache sleep control processing, destaging of disk unwritten cache data (unwritten data to the disk) of the cache memory module 1340 and LDEV migration can be simultaneously generated. There is concern that if the destaged destination LDEV of the disk unwritten cache data constitutes the LDEV to be migrated, destaging will be performed during LDEV migration and the cache data will not reflected in the LDEV of the migration destination RAID Group (that is, a concern that the cache data will be lost).

Figure 41:
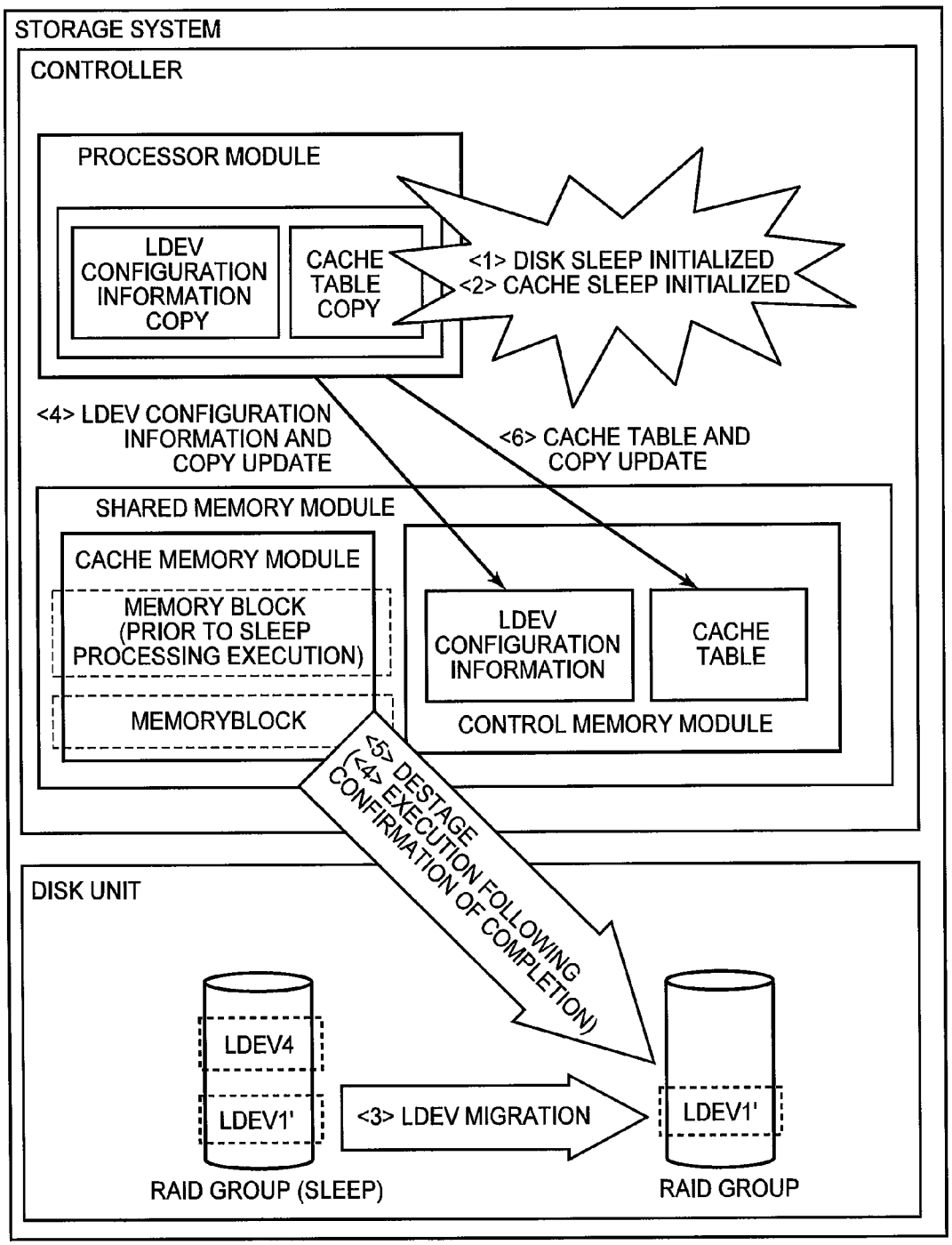
FIG. 41 is a schematic diagram of a sixth embodiment of the present invention.

Thereupon, in this sixth embodiment, one of either the cache sleep or the disk sleep is implemented first, the processing of the other being initiated following completion of the processing implemented first. The particulars thereof will be described with reference to FIG. 41 (the numbers within the ◇ of FIG. 41 express the sequence in which the processings are performed).

The disk sleep and cache sleep are taken as occurring essentially simultaneously. The migration target LDEV of the disk sleep and the destage destination LDEV of the cache sleep are taken as LDEV1'.

The power management program 1133 stops the destaging of dirty cache data from the cache memory module, and executes LDEV1' migration to the LDEV migration program. Following completion of the LDEV1' migration, the power management program 1133 updates the LDEV configuration information 1325 stored in the control memory module 1320 and the LDEV configuration information copy 1135 of the self-actuated processor module. Following completion of the update of the LDEV configuration information 1325 and LDEV configuration information copy 1135, the power management program 1133 initiates the stopped destaging. The destaged destination at this time is the LDEV1' of the migration destination RAID Group. The power management program 1133 then updates the cache table stored in the shared memory module and the cache table copy of the self-actuated processor module, and ends the processing.

The execution of the LDEV migration first in the description above is used only as an example, and the LDEV migration may instead be initiated following destaging. In addition, for example, which of either the destaging or the LDEV migration is to be implemented first may be determined in accordance with, for example, whether or not the LDEV migration destination is a remote storage system. For example, the destaging may be implemented first when the LDEV migration destination is a remote storage system, while on the other hand the LDEV migration may be executed first when the LDEV migration destination is a local storage system (that is, when it is the same storage system).

Seventh Embodiment

When at least two of processor sleep, cache sleep and disk sleep are to be performed, a storage administrator must set a trade-off (for example, low load threshold value, low access threshold value, high load threshold value, high access threshold value, and energy-saving power level and so on) between the various sleeps. It is possible that a storage administrator will find this complicated.

Figure 42:
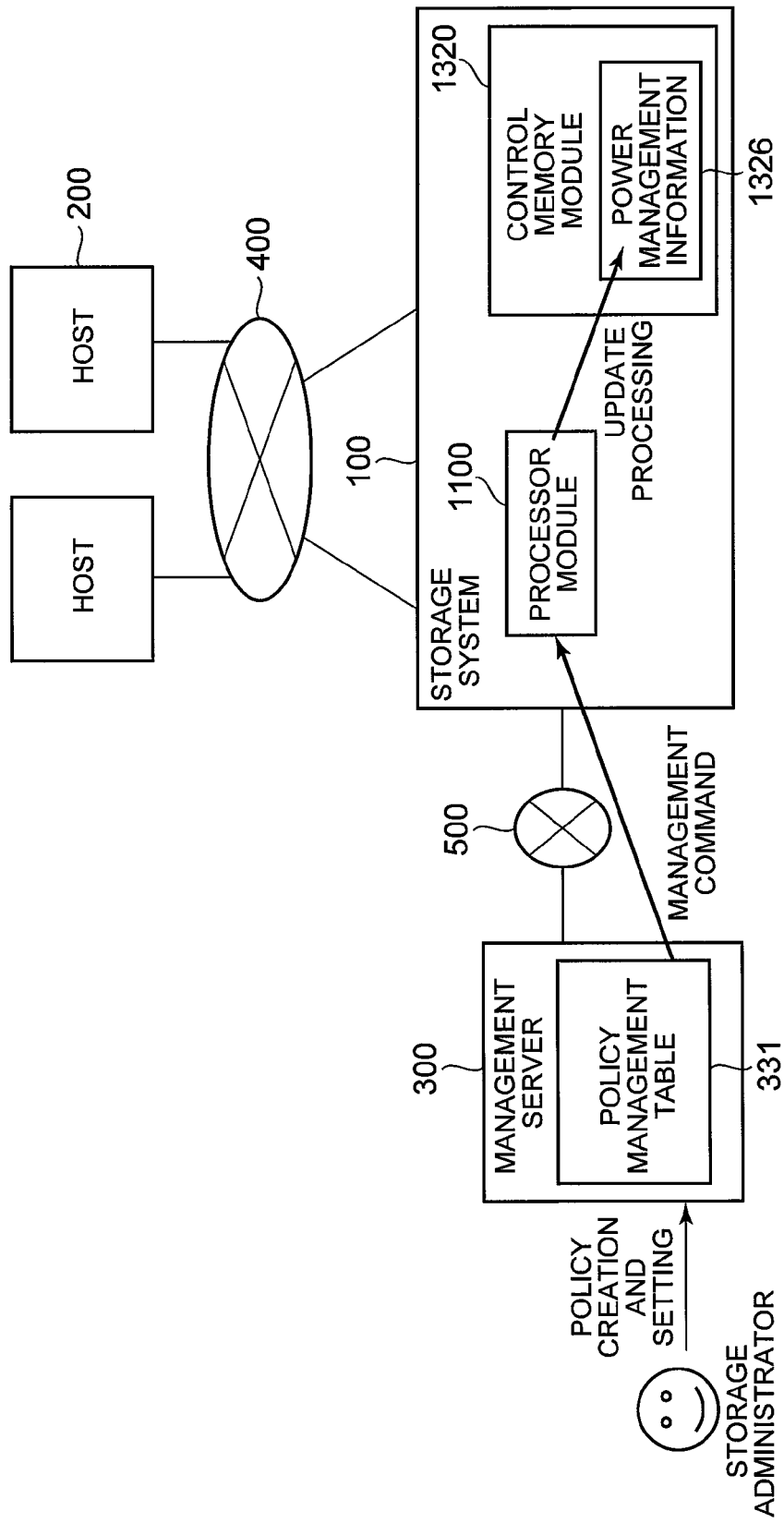
FIG. 42 is a schematic diagram of a seventh embodiment of the present invention.

Thereupon, the processing as shown in FIG. 42 is performed in the seventh embodiment.

That is, a policy management table 331 is stored in management server 300 (or service processor 3000) storage resource. In the policy management table 331, for example as shown in FIG. 43, for each policy there is corresponding combination of set values used for the plurality of types of sleep control. For example, for the policy value "A", there is correspondence between an energy-saving power level is "4", high load threshold value "80%" and low load threshold value "30%" of processor sleep, high access threshold value "80%" and low access threshold value "30%" of cache sleep, sleep enable RAID Groups "1, 2, 3, 4, 5", high load threshold value "80%", low load threshold value "30%" and warning setting "enable" of disk sleep.

The management server 300 (or service processor 3000) provides a GUI for editing the policy management table 331 and inputting the desired policy values of a storage administrator. A storage administrator inputs policy values and edits the policy management table 331 by way of this GUI.

When a policy value has been input by way of the GUI, the management server 300 (or service processor 3000), by way of a setting control program (not shown in the diagram) executed by a processor of, for example, the management server 300 (or service processor 3000), specifies the various set values of the policy management table 331 correspondent to this policy value and sends a management command containing the various designated set values to a processor module 1100. The processor module 1100 processes these management commands using a method as outlined in the embodiments, and updates the power management information 1326 or other information (for example, LDEV configuration information) stored in the control memory module 1320.

In this way, in this seventh embodiment, various settings of a plurality of types of sleep control can be performed by a storage administrator based on a simple inputting of a desired policy value of a plurality of policy values.

While preferred embodiments of the present invention are described above, these represent illustrative examples only provided for the purpose of describing the present invention and the gist of the present invention is not to be regarded as being limited to these embodiments. The present invention can be carried out in various other modes.

What is claimed is:

1. A storage system comprising:
a plurality of storage on which a plurality of logical volumes are based; one or more processors for writing data to a logical volume, of said plurality of logical volumes, designated by an I/O command sent from a host device or reading data from this logical volume;
one or more cache memories for temporarily storing data to be written to a logical volume by said processor or data read from a logical volume by said processor; and
a power-saving controller for redirecting a processing related to a state of one or more I/O process-participating devices or a part thereof, for at least one of storage unit, processor and cache memory which constitute I/O process-participating devices related to said I/O command processing, to another one or more I/O process-participating devices or a part thereof, and shifting the state of said one or more I/O process-participating devices or a part thereof to a power-saving state,
wherein RAID Groups are configured from two or more storage units of said plurality of storage units, and
wherein said power-saving controller migrating all logical volumes from which a low load RAID Group is formed to one or more other low load RAID Groups, thereby shifting a state of the storage units from which the low load RAID Group is configured to a power-saving state.

2. The storage system as claimed in claim 1, wherein said processors exist in plurality,
wherein the processors are constituent elements of a plurality of processor modules,
wherein the processor modules are configured from one or more processors,
wherein said one or more I/O process-participating devices or a part thereof are a processor module or a part thereof, and
wherein the part of said processor module is a processor or at least one of a plurality of processor cores from which the processor is configured.

3. The storage system as claimed in claim 2, further comprising a storage region for storing information expressing an energy-saving level desired by a storage administrator,
wherein said power-saving controller, in accordance with the energy-saving level indicated by said information, selects one of a processor module, processor and processor core, as a target, for conversion to a power-saving state.

4. The storage system as claimed in claim 2,
wherein one or more logical volumes of the plurality of logical volumes are each assigned to said processor modules,
wherein the storage system further comprising a host interface part for receiving an I/O command sent from said host device and transferring the I/O command to a processor module to which a logical volume designated by the I/O command is assigned, of said plurality of processor modules, and
wherein said power-saving controller assigning a logical volume assigned to a low load processor module of said plurality of processor modules to another processor module of said plurality of processor modules, and thereby shifting a state of said low load processor module to a power-saving state.

5. The storage system as claimed in claim 4, wherein said power-saving controller judges whether, when a load placed on said low load processor module is placed on another processor module, the load placed on the other processor module exceeds a predetermined threshold value, and assigns a logical volume assigned to said low load processor module to said other processor module if a judged result thereof indicates that the load does not exceed the predetermined threshold value.

6. The storage system as claimed in claim 4, wherein said power-saving controller, if the load on said other processor module to which said logical volume has been assigned exceeds a predetermined threshold value, shifts a state of a power-saving state of the processor module to a non-power-saving state, said logical volume being assigned from said other processor module to this processor module.

7. The storage system as claimed in claim 1, wherein the cache memory is configured from a plurality of cache memory regions, and
wherein said one or more I/O process-participating devices or a part thereof constituting one or more cache memories or at least one of the plurality of cache memory regions from which the cache memory is configured.

8. The storage system as claimed in claim 1,
wherein RAID Groups are configured from two or more storage units of said plurality of storage units,
wherein said power-saving controller migrating all logical volumes from which a low load RAID Group is formed to one or more other low load RAID Groups, thereby shifting a state of the storage units from which the low load RAID Group is configured to a power-saving state, and
wherein said power-saving controller judges whether or not, when a load on a migration-targeted logical volume is placed on another RAID Group, the load placed on the other RAID Group exceeds a predetermined threshold value and, if a judged result thereof indicates that the load does not exceed the predetermined threshold value, migrates a migration-targeted logical volume based on said low load RAID Group to said other RAID Group.

9. The storage system as claimed in claim 1, wherein the I/O process-participating devices for which shift to a power-saving state is possible are two or more types of processor, cache memory or storage unit, and
wherein a threshold value that defines a low load of various I/O process-participating devices constituting a threshold value that is associated with a policy value selected from a plurality of policy values.

10. The storage system as claimed in claim 1,
wherein said power-saving controller, when a load on said one or more I/O process-participating devices or a part thereof is equal to or less than a predetermined threshold value, judges whether or not performance is below performance in predetermined requirements upon conversion of a state of said one or more I/O process-participating devices or a part thereof to a power-saving state and, if a judged result thereof indicates that the performance is below the performance in predetermined requirements, shifts a state of said low load one or more I/O process-participating devices or a part thereof to a power-saving state.

11. A storage system comprising:
a plurality of storage on which a plurality of logical volumes are based; one or more processors for writing data to a logical volume, of said plurality of logical volumes, designated by an I/O command sent from a host device or reading data from this logical volume;
one or more cache memories for temporarily storing data to be written to a logical volume by said processor or data read from a logical volume by said processor; and a power-saving controller for redirecting a processing related to a state of one or more I/O process-participating devices or a part thereof, for at least one of storage unit, processor and cache memory which constitute I/O process-participating devices related to said I/O command processing, to another one or more I/O process-participating devices or a part thereof, and shifting the state of said one or more I/O process-participating devices or a part thereof to a power-saving state, wherein said processors exist in plurality, wherein the processors are constituent elements of a plurality of processor modules, wherein the processor modules are configured from one or more processors, wherein said one or more I/O process-participating devices or a part thereof are a processor module or a part thereof, wherein the part of said processor module is a processor or at least one of a plurality of processor cores from which the processor is configured wherein said plurality of processor modules are affiliated with two or more power supplies, and wherein said power-saving controller judging whether or not, when the state of said low load processor module is to be shifted to a power-saving state, non-power-saving state processor modules exists in a single power supply alone, and shifting the state of said low load processor module to a power-saving state if a judged result thereof indicates that the non-power-saving state processor module exists in two or more power supplies.

12. A storage system comprising:

a plurality of storage on which a plurality of logical volumes are based;

one or more processors for writing data to a logical volume, of said plurality of logical volumes, designated by an I/O command sent from a host device or reading data from this logical volume;

one or more cache memories for temporarily storing data to be written to a logical volume by said processor or data read from a logical volume by said processor; and a power-saving controller for redirecting a processing related to a state of one or more I/O process-participating devices or a part thereof, for at least one of storage unit, processor and cache memory which constitute I/O process-participating devices related to said I/O command processing, to another one or more I/O process-participating devices or a part thereof, and shifting the state of said one or more I/O process-participating devices or a part thereof to a power-saving state, wherein said processors exist in plurality, wherein the processors are constituent elements of a plurality of processor modules, wherein the processor modules are configured from one or more processors, wherein said one or more I/O process-participating devices or a part thereof are a processor module or a part thereof, wherein the part of said processor module is a processor or at least one of a plurality of processor cores from which the processor is configured, wherein said power-saving controller judges whether or not, when a state of said low load processor module is shifted to a power-saving state, only a single non-power-saving state processor module is formed, and shifts said low load processor module state to a power-saving state if a judged result thereof indicates that two or more non-power-saving state processor modules exist.

13. A storage system comprising:

a plurality of storage on which a plurality of logical volumes are based; one or more processors for writing data to a logical volume, of said plurality of logical volumes, designated by an I/O command sent from a host device or reading data from this logical volume;

one or more cache memories for temporarily storing data to be written to a logical volume by said processor or data read from a logical volume by said processor; and a power-saving controller for redirecting a processing related to a state of one or more I/O process-participating devices or a part thereof, for at least one of storage unit, processor and cache memory which constitute I/O process-participating devices related to said I/O command processing, to another one or more I/O process-participating devices or a part thereof, and shifting the state of said one or more I/O process-participating devices or a part thereof to a power-saving state, wherein said processors exist in plurality, wherein the processors are constituent elements of a plurality of processor modules, wherein the processor modules are configured from one or more processors, wherein said one or more I/O process-participating devices or a part thereof are a processor module or a part thereof, wherein the part of said processor module is a processor or at least one of a plurality of processor cores from which the processor is configured, wherein one or more logical volumes of the plurality of logical volumes are each assigned to said processor modules, wherein the storage system further comprising a host interface part for receiving an I/O command sent from said host device and transferring the I/O command to a processor module to which a logical volume designated by the I/O command is assigned, of said plurality of processor modules, wherein said power-saving controller assigning a logical volume assigned to a low load processor module of said plurality of processor modules to another processor module of said plurality of processor modules, and thereby shifting a state of said low load processor module to a power-saving state, wherein said processor modules each comprise a storage region in which I/O process control information referenced by a processor during execution of the I/O command process is stored, and wherein said power-saving controller storing the I/O process control information stored in the storage region of said low load processor module in a storage region of said other processor module, and thereby shifting a state of said low load processor module state to a power-saving state.

14. A storage system comprising:

a plurality of storage on which a plurality of logical volumes are based; one or more processors for writing data to a logical volume, of said plurality of logical volumes, designated by an I/O command sent from a host device or reading data from this logical volume;

one or more cache memories for temporarily storing data to be written to a logical volume by said processor or data read from a logical volume by said processor; and a power-saving controller for redirecting a processing related to a state of one or more I/O process-participating devices or a part thereof, for at least one of storage unit, processor and cache memory which constitute I/O process-participating devices related to said I/O command processing, to another one or more I/O process-participating devices or a part thereof, and shifting the state of said one or more I/O process-participating devices or a part thereof to a power-saving state, wherein said processors exist in plurality, wherein the processors are constituent elements of a plurality of processor modules, wherein the processor modules are configured from one or more processors, wherein said one or more I/O process-participating devices or a part thereof are a processor module or a part thereof, wherein the part of said processor module is a processor or at least one of a plurality of processor cores from which the processor is configured, wherein said power-saving controller, if a plurality of non-power-saving state processors exist in said low load processor module, shifts a state of a processor selected from these plurality of non-power-saving state processors or a processor core selected from a plurality of processor cores from which a processor is configured to a power-saving state while not shifting a state of the processor module itself.

15. The storage system as claimed in claim 14, wherein said power-saving controller, if a judged result indicates that performance is below a predetermined performance when a state of said selected processor state is shifted to a power-saving state, shifts a state of a processor core selected from a plurality of processor cores from which the processor is configured to a power-saving state, while not shifting a state of said selected processor.

16. A storage system comprising:

a plurality of storage on which a plurality of logical volumes are based; one or more processors for writing data to a logical volume, of said plurality of logical volumes, designated by an I/O command sent from a host device or reading data from this logical volume;

one or more cache memories for temporarily storing data to be written to a logical volume by said processor or data read from a logical volume by said processor; and a power-saving controller for redirecting a processing related to a state of one or more I/O process-participating devices or a part thereof, for at least one of storage unit, processor and cache memory which constitute I/O process-participating devices related to said I/O command processing, to another one or more I/O process-participating devices or a part thereof, and shifting the state of said one or more I/O process-participating devices or a part thereof to a power-saving state, wherein the cache memory is configured from a plurality of cache memory regions, wherein said one or more I/O process-participating devices or a part thereof constituting one or more cache memories or at least one of the plurality of cache memory regions from which the cache memory is configured, and wherein said power-saving controller, prior to shifting a state of the cache memory region to a power-saving state, evacuates data stored in the cache memory region to another non-power-saving state cache memory region or to at least one of said plurality of storage units.

17. The storage system as claimed in claim 16, wherein RAID Groups are configured from two or more storage units of said plurality of storage units, and wherein said power-saving controller being configured to be able to migrate all logical volumes formed on the basis of a low load RAID Group to one or more other RAID Groups, thereby shifting a state of the storage units from which the low load RAID Group is configured to a power-saving state and, if evacuation of the data stored in said cache memory region to a storage unit or migration of all logical volumes formed on the basis of the low load RAID Group to one or more other RAID Groups is to occur simultaneously or substantially simultaneously, said power-saving controller implementing either the evacuation or migration processing first and initiating the other processing subsequent to completion of the first processing.

18. A storage system comprising:

a plurality of storage on which a plurality of logical volumes are based; one or more processors for writing data to a logical volume, of said plurality of logical volumes, designated by an I/O command sent from a host device or reading data from this logical volume;

one or more cache memories for temporarily storing data to be written to a logical volume by said processor or data read from a logical volume by said processor;

a power-saving controller for redirecting a processing related to a state of one or more I/O process-participating devices or a part thereof, for at least one of storage unit, processor and cache memory which constitute I/O process-participating devices related to said I/O command processing, to another one or more I/O process-participating devices or a part thereof, and shifting the state of said one or more I/O process-participating devices or a part thereof to a power-saving state; and a storage region for storing information indicating one or more I/O process-participating devices or a part thereof desired by a storage administrator, wherein said power-saving controller maintains, even at low load, a non-power-saving state of an I/O process-participating device or a part thereof other than the one or more I/O process-participating devices or a part thereof indicated by said information.

19. A storage system comprising:

a plurality of storage on which a plurality of logical volumes are based; one or more processors for writing data to a logical volume, of said plurality of logical volumes, designated by an I/O command sent from a host device or reading data from this logical volume;

one or more cache memories for temporarily storing data to be written to a logical volume by said processor or data read from a logical volume by said processor;

a power-saving controller for redirecting a processing related to a state of one or more I/O process-participating devices or a part thereof, for at least one of storage unit, processor and cache memory which constitute I/O process-participating devices related to said I/O command processing, to another one or more I/O process-participating devices or a part thereof, and shifting the state of said one or more I/O process-participating devices or a part thereof to a power-saving state; and a storage region for storing information indicating whether or not permission from a storage administrator is required prior to conversion to a power-saving state, wherein said power-saving controller, if said information indicates that permission from a storage administrator is required prior to conversion to a power-saving state, outputting an inquiry as to whether a state of one or more I/O process-participating devices or a part thereof can be shifted to a power-saving state prior to a state of one or more I/O process-participating devices or a part thereof being shifted to a power-saving state and, if a reply to the effect that the state of one or more I/O process-participating devices or a part thereof can be shifted to a power-saving state is input in response to this inquiry, shifting the state of one or more I/O process-participating devices or a part thereof to a power-saving state.

20. A computer system comprising:
one or more storage systems; and
a power-saving controller, provided in said one or more storage systems or a computer for managing the same, for shifting a state of a storage system or a part thereof to a power-saving state,
wherein each of the one or more storage systems comprising:
a storage unit on which logical volumes are based; one or more processors for writing data to a logical volume designated by an I/O command sent from a host device or reading data from the logical volume; and
one or more cache memories for temporarily storing data to be written to a logical volume by said processor or data read from the logical volume by said processor,
wherein said power-saving controller, when a load on a storage system or a part thereof is a low load equal to or less than a predetermined threshold value, judging whether or not upon conversion of a state of the storage system or a part thereof to a power-saving state performance is below a predetermined performance, and when a judged result thereof indicates that the performance is not below the predetermined performance, shifting the state, at the low load, of the storage system or a part thereof to a power-saving state,
wherein the part of said storage system constituting at least one type of storage unit, processor and cache memory that are I/O process-participating devices related to I/O command processing,
wherein RAID Groups are configured from two or more storage units of said plurality of storage units, and
wherein said power-saving controller migrating all logical volumes from which a low load RAID Group is formed to one or more other low load RAID Groups, thereby shifting a state of the storage units from which the low load RAID Group is configured to a power-saving state.

21. The computer system as claimed in claim 20, wherein said power-saving controller, if a judged result thereof indicates that performance is below performance in predetermined requirements, migrates a plurality of logical volumes of said low load storage system to another one or more storage systems, thereby shifting a state of said low load storage system or a RAID Group that this storage system comprises to a power-saving state.

22. A power consumption control method comprising the steps of:
judging, for at least one type of storage unit, processor and cache memory which are I/O process-participating devices related to I/O command process in a storage system, whether or not, when a load on one or more I/O process-participating devices or a part thereof is a low load equal to or less than a predetermined threshold value, performance is below performance in predetermined requirements upon conversion of a state of said one or more I/O process-participating devices or a part thereof to a power-saving state; and
shifting, if a judged result thereof indicates that the performance is not below the performance in predetermined requirements, a state, at the low load, of one or more I/O process-participating devices or a part thereof to a power-saving state,
wherein RAID Groups are configured from two or more storage units of said plurality of storage units, and
wherein said power-saving controller migrating all logical volumes from which a low load RAID Group is formed to one or more other low load RAID Groups, thereby shifting a state of the storage units from which the low load RAID Group is configured to a power-saving state.

* * * * *